United States Patent
Bongaerts et al.

(10) Patent No.: US 11,479,679 B2
(45) Date of Patent: Oct. 25, 2022

(54) 2K THERMOSETTING POWDER COATING COMPOSITIONS

(71) Applicant: COVESTRO (NETHERLANDS) B.V., Geleen (NL)

(72) Inventors: Johannes Gertrudis Christianus Bongaerts, Echt (NL); Petrus Henricus Marinus Wellenberg, Echt (NL); Johan Franz Gradus Antonius Jansen, Echt (NL)

(73) Assignee: COVESTRO (NETHERLANDS) B.V., Geleen (NL)

( * ) Notice: Subject to any disclaimer, the term of this patent is extended or adjusted under 35 U.S.C. 154(b) by 0 days.

(21) Appl. No.: 15/304,354

(22) PCT Filed: Apr. 8, 2015

(86) PCT No.: PCT/EP2015/057587
§ 371 (c)(1),
(2) Date: Oct. 14, 2016

(87) PCT Pub. No.: WO2015/158587
PCT Pub. Date: Oct. 22, 2015

(65) Prior Publication Data
US 2017/0037256 A1   Feb. 9, 2017

(30) Foreign Application Priority Data
Apr. 16, 2014   (EP) .................................... 14164940

(51) Int. Cl.
| | | |
|---|---|---|
| C09D 5/03 | (2006.01) |
| C09D 167/06 | (2006.01) |
| C08K 3/11 | (2018.01) |
| C08K 3/10 | (2018.01) |
| B05D 3/06 | (2006.01) |
| C08K 5/14 | (2006.01) |
| C09D 15/00 | (2006.01) |
| C08K 5/00 | (2006.01) |

(52) U.S. Cl.
CPC .............. *C09D 5/033* (2013.01); *B05D 3/06* (2013.01); *C08K 3/10* (2013.01); *C08K 3/11* (2018.01); *C09D 15/00* (2013.01); *C09D 167/06* (2013.01); *C08K 5/0025* (2013.01); *C08K 5/14* (2013.01)

(58) Field of Classification Search
CPC ...... C09D 5/03–038; C09D 167/06–07; B01F 3/18–2292
See application file for complete search history.

(56) References Cited

U.S. PATENT DOCUMENTS 6,194,525 B1 * 2/2001 Ortiz ................... B29C 37/0032
428/482
2011/0274833 A1 * 11/2011 Jansen ................... C09D 5/033
427/180

FOREIGN PATENT DOCUMENTS

| | | | | |
|---|---|---|---|---|
| EP | 0 957 141 | 11/1999 | | |
| WO | WO-9519399 A1 * | 7/1995 | ............. | B05D 7/536 |
| WO | WO 2010/052295 | 5/2010 | | |
| WO | WO 2011/138432 | 11/2011 | | |
| WO | WO-2011138431 A1 * | 11/2011 | ............... | C08K 5/14 |

OTHER PUBLICATIONS

International Search Report for PCT/EP2015/057587, dated Jul. 30, 2015, 2 pages.

* cited by examiner

*Primary Examiner* — Stephen E Rieth
(74) *Attorney, Agent, or Firm* — Nixon & Vanderhye P.C.

(57) ABSTRACT

A thermosetting powder coating composition C (PCC C) includes a physical mixture of a thermosetting powder coating composition A (PCC A) with a separate, distinct thermosetting powder coating composition B (PCC B). Also provided are processes for making the thermosetting powder coating composition C and for coating an article with the thermosetting powder coating composition C. A cured thermosetting powder coating composition C (c-PCC C) is also provided so as to obtain articles having coated and cured thereon the thermosetting powder coating composition C. Heat-curing can occur at low temperatures. The cured c-PCC C is a powder coating having at least one desirable property such as excellent resistance to swelling, good smoothness, good chemical resistance, low gloss, and/or low yellowness.

27 Claims, No Drawings

2K THERMOSETTING POWDER COATING COMPOSITIONS

The invention relates to a thermosetting powder coating composition C (PCC C) comprising a physical mixture of a thermosetting powder coating composition A (PCC A) with a separate, distinct thermosetting powder coating composition B (PCC B). The invention further relates to a process for making said thermosetting powder coating composition C and processes for coating an article with said thermosetting powder coating composition C. The invention further relates to a cured thermosetting powder coating composition C (c-PCC C). The invention further relates to an article having coated thereon said thermosetting powder coating composition C as well as to an article having coated and cured thereon said thermosetting powder coating composition C. The invention further relates to the use of PCC C for heat-curing at low temperatures. The invention relates also to a use of PCC C for making a cured PCC C, preferably said cured PCC C is a powder coating having one or multiple of properties such as excellent resistance to swelling, good smoothness, good chemical resistance, low gloss, low yellowness, in any combination. The invention further relates to the use of said thermosetting powder coating composition C, to the use of an article having coated thereon said thermosetting powder coating composition C and to the use of an article having coated and cured thereon said thermosetting powder coating composition C.

Powder coating compositions (commonly referred to as powders) that are dry, finely divided, free flowing, solid materials at room temperature and at atmospheric pressure, have gained considerable popularity in recent years over liquid coating compositions for a number of reasons. For one powder coatings are user and environmentally friendly materials since they are virtually free of harmful volatile organic solvents carriers that are normally present in liquid coating compositions. Therefore, powder coatings give off little, if any, volatile materials to the environment when cured. This eliminates the solvent emission problems associated with liquid coating compositions such as air pollution and dangers to the health of workers employed in coating operations. Powder coating compositions are also convenient to use since they are applied in a clean manner over the substrate because they are in dry solid form. The powders are easily swept up in the event of a spill and do not require special cleaning and spill containment supplies, as do liquid coating compositions. Working hygiene is thus improved. Moreover, powder coating compositions are essentially 100% recyclable since the sprayed powders can be fully reclaimed and recombined with fresh powder feed. Recycling of liquid coatings during application is often not done, which leads to increased waste and hazardous waste disposal costs. In addition, powder coating compositions are ready to use, i.e., no thinning or dilution is required.

Powder coating compositions are typically applied on a substrate via an electrostatic spray process; the powder coating composition is dispersed in an air stream and passed through a corona discharge field where the particles acquire an electrostatic charge. The charged particles are attracted to and deposited on the grounded article to be coated. The article, usually at room temperature, is then placed in an oven where the powder melts and forms a powder coating. A hybrid process based on a combination of high voltage electrostatic charging and fluidized-bed application techniques (electrostatic fluidized bed) has evolved, as well as triboelectric spray application methods. Powder coating compositions and their process of application are the preferred coating compositions and process for coating many familiar items such as lawn and garden equipment, patio and other metal furniture, electrical cabinets, lighting, shelving and store fixtures, and many automotive components. Today, powder coating compositions are widely accepted, with thousands of installations in the factories of original equipment manufacturers (OEMS) and custom coating job shops.

Powder coating compositions can be thermosetting or thermoplastic. The invention relates to the field of thermosetting powder coating compositions (PCC) which may also be referred herein as "powders". The preparation of thermosetting powder coating compositions is described by Misev in "Powder Coatings, Chemistry and Technology" (pp. 224-300; 1991, John Wiley& Sons Ltd.).

Despite their many advantages, powder coatings are generally not employed in coating heat sensitive substrates, such as wood and plastics. Heat sensitive substrates demand curing at low temperatures for example heat curing at temperatures up to 130° C., to avoid significant substrate degradation and/or deformation. For instance when wood composites, e.g. particle board, fiber board and other substrates that comprise a significant amount of wood, are heated to the high curing temperatures required for traditional powders (typically temperatures higher than 140° C.), the residual moisture and resinous binders present in the wood composites for substrate integrity, evolve from the substrate. Outgassing of the volatiles during curing, results in severe blisters, craters, pinholes and other surface defects in the hardened film finish. Furthermore, overheating causes the wood composites to become brittle, friable, charred and otherwise deteriorated in physical and chemical properties. This is not acceptable from both a film quality and product viewpoint.

Low temperature curable powder coatings based on epoxy resins have been proposed, for example as taught in U.S. Pat. No. 5,714,206; however, copolymerizable resins used to achieve the low temperature curing are based on aliphatic amines which tend to yellow under heat; in addition, epoxy coatings generally do not provide the durability and weatherability that thermosetting powder coating compositions comprising unsaturated polyesters and thermal radical initiators such as peroxides and cured via heat and/or UV radiation, typically provide.

Low temperature UV curable thermosetting powder coating compositions were proposed for coating heat sensitive substrates. UV powders still require exposure to heat, which is above either the glass transition temperature ($T_g$) or melt temperature ($T_m$) to sufficiently melt and flow out the powders into a continuous molten film over the substrate prior to UV radiation curing which is accomplished by exposing the molten film to UV radiation to trigger crosslinking reactions rather than heat. Thus, powder coating heat sensitive substrates with UV radiation curable powders requires a two step process typically comprising the steps of: i) heating the powder coating composition to melt and flow it out onto the substrate in order to form a continuous film and ii) UV radiate the film formed in order to harden (cure) it. In principle, heat curing of heat sensitive substrates is still desirable and preferred over UV curing; the reason is that heat curing has the advantage that in only a one step process that of heating a powder coating composition without the use of additional equipment, for instance equipment that generates UV light or accelerated electrons, the powder coating composition can be melted and cured onto a substrate.

Heat curing of thermosetting powder coating compositions is further desirable over UV curing because UV curing fails when it comes to powder coat complex three-dimensional articles and in applications where thick coatings are required; heat curing is the only way that powder coating of complex three-dimensional articles and thick coatings can be accomplished.

One component thermosetting powder coating compositions utilizing unsaturated polyester resins and thermal radical initiators suffer from problems arising from the reactive nature of the ingredients, in particular problems of premature curing resulting also in poor storage stability. Generally, all ingredients required for curing the composition have to be contained and uniformly distributed in the thermosetting powder coating composition when it is applied to an article. In order to obtain a requisite uniform distribution of the ingredients, the powder must be thoroughly mixed. Melt-mixing, followed by granulation of the mixture has long been a preferred method of mixing. However, melt-mixing has had to be carefully carried out in order to avoid premature curing of unsaturated polyester resins and thermal radical initiators used in said compositions. As a result of efforts to avoid the problem of premature curing of said compositions, the mixing was frequently incomplete, resulting in non-uniform distribution of the ingredients and poor quality coatings.

In 1999 EP 0957 141 A1 (equivalent to U.S. Pat. No. 6,194,525 B1) proposed a solution to the problem of uniformly and completely mixing together the components of a thermosetting powder coating composition—comprising unsaturated polyester resins and thermal radical initiators—prior to actual use of the powder to form a coating while avoiding premature curing of the composition (cf. EP 0957 141 A1, [0008]). EP 0957 141 A1 proposed heat-curable two component thermosetting powder coating compositions. More specifically, EP 0957 141 A1 provided for powder coating compositions comprising a physical mixture of a powder (A) comprising a first unsaturated polyester resin and a free radical initiator, and a separate and distinct powder (B) comprising a polymerization promoter. EP 0957 141 A1 requires the presence of a crystalline unsaturated monomer from 1% to 25% by weight of the powder coating composition. The solution of EP 0957 141 A1 suffers a great number of problems that effectively render said solution unattractive for the market; it is not accidental that the solution of EP 0957 141 A1 has not really being commercialized with success as yet; some of the problems (list of problems is not exhaustive) associated with EP 0957 141 A1A are mentioned herein; for example, a skilled person in the art would appreciate that in order the solution of EP 0957 141 A1 to be applicable, each of the two powders need to survive melt-mixing so that they can later be physically mixed with each other; unfortunately and to the surprise of the inventors, this is not always the case for the two component compositions of EP 0957 141 A1; for example in certain two component compositions shown in EP 0957 141 A1, at least one, but in some cases both of the individual powders making up each of the two component compositions did not survive melt-mixing (extrusion); premature curing during melt-mixing lead to gelation in the extruder. In some other cases powder A or powder B or both are gooey; this causes partial or complete blocking of the funnel during extrusion and even when—somehow—the powder is obtained, further processing of it, for example milling and sieving is cumbersome, inconsistent, time consuming and expensive since typically the extrudate requires storage at low temperatures for example refrigeration at temperatures lower than −10° C.; in an effort to mitigate these adverse effects, the extrusion time may be prolonged; however this raises other problems; not only prolonged extrusion times are not desirable because they limit production output and increase production costs but also a prolonged residence time in the extrusion can lead to premature curing and/or decomposition of ingredients of the powder—which is one of the two components—for example decomposition of an inhibitor; either of the two aforementioned drawbacks ultimately results in at least a compromised physical storage stability of the powder and/or inferior performance of the coating derived upon curing of said powder. The poor physical storage stability of a powder is a significant drawback that apart from adding to the complexity of commercializing such a powder due to special requirements for storage, shipping, use and application, it is generally undesirable by the paint manufacturer and the end user alike, since poor physical storage stability of powder paints results in blocking or sintering during storage and/or producing an aesthetically undesirable orange peel finish where also lumps of powder are visible, when the powder is cured.

Thus, it would be desirable to have a thermosetting powder coating composition—comprising unsaturated polyester resins and thermal radical initiators that would address at least some of the problems of EP 0957 141 A1.

Ever since, thermosetting powder coating compositions comprising unsaturated polyester resins and thermal radical initiators—may be distinguished as being one component compositions (1K powders) or two component compositions (2K powders). With a "one component composition", is meant that all (reactive) components of the thermosetting powder coating composition form part of one powder. In a "two component composition", a thermosetting powder coating composition is composed of at least two separate, distinct powders with different chemical compositions, which keeps the reactive components physically separated. In a 2K composition, the at least two different powders are physically mixed for example via physical blending before the physical mixture of the two different powders is put in a storage container or may be mixed just before applying the 2K composition to a substrate to prepare a coated substrate which will then be cured.

Eleven years later, in 2010, heat-curable 2K thermosetting powder coating compositions utilizing unsaturated polyester resins and thermal radical initiation systems were proposed in WO 2010/052295 A1 and WO 2010/052296 A1.

WO 2010/052295 A1 provided for heat-curable powder coating compositions comprising a mixture of a powder (A) and a powder (B),
  wherein the powder (A) comprises
    a thermal radical initiator
  wherein the powder (B) comprises
    a catalyst for the thermal radical initiator
  wherein powder (A) does not comprise a catalyst for the thermal radical initiator and wherein powder (B) does not comprise a thermal radical initiator wherein a resin containing reactive unsaturations is present in powder (A) and/or powder (B)
  wherein a hydroquinone inhibitor is present in powder (A) and/or powder (B) wherein in case the reactive unsaturations in the resin are not able to react with each other after thermal radical initiation, a co-crosslinker, which co-crosslinker has the ability to react with the reactive unsaturations in the resin after radical initiation, is present in powder (A) and/or powder (B).

According to WO 2010/052295 A1, powder (B) must not comprise a thermal radical initiator.

WO 2010/052296 A1 provided for heat-curable powder coating compositions a physical mixture of a powder (A) and a powder (B), wherein the powder (A) comprises a thermal radical initiator selected from the group of peroxyesters, monoperoxycarbonates and mixtures thereof wherein the powder (B) comprises a catalyst for the thermal radical initiator, selected from the group of salts or complexes of Mn, Fe, Cu and mixtures thereof wherein powder (A) does not comprise a catalyst for the thermal radical initiator and wherein powder (B) does not comprise a thermal radical initiator wherein a resin containing reactive unsaturations is present in powder (A) and/or powder (B)

wherein in case the reactive unsaturations in the resin are not able to react with each other after thermal radical initiation, a co-crosslinker selected from the group of vinylethers, methacrylates, acrylates, vinylamides, itaconates, vinylesters, enamines, thiols and mixtures thereof, is present in powder (A) and/or in powder (B).

According to WO 2010/052296 A1, powder (B) must not comprise a thermal radical initiator.

Apart from the problems mentioned herein above, there are further problems rendering commercially unattractive 2K thermosetting powder coating compositions—comprising unsaturated polyester resins and thermal radical initiators; For example, swelling and cracking of the powder coating on heat-sensitive substrates, for example MDF, once the coated substrate is subjected to a swelling test as described herein, is undesirable since it compromises not only the aesthetics of a coated substrate but also the functional use for example protection of the substrate itself, of said coatings. Another drawback may be associated with the rather poor resistance of at least some of said powder coatings against chemicals such as acetone (chemical resistance). Further problems of at least some of said 2K thermosetting powder coating compositions relate to the rather low smoothness (known also as "flow"), high gloss and yellowness; for example low gloss (known also as matt finish) is particularly desired for a number of applications.

It would thus be desirable and it is, therefore, a primary object of the invention to provide a two component thermosetting powder coating composition (2K system) comprising a physical mixture of a thermosetting powder coating composition (2K-A) with a different, separate, distinct thermosetting powder coating composition (2K-B), that could provide for any one of the following properties alone or in any combination with each other:

i) each of 2K-A and 2K-B, is extrudable;
ii) the 2K system is heat curable, preferably heat curable at low temperatures;
iii) the 2K system has good physical storage stability (abbreviated herein as PSS);
iv) the 2K system provides powder coatings that have excellent resistance to swelling;
v) the 2K system provides powder coatings that have good smoothness;
vi) the 2K system provides powder coatings that have good chemical resistance;
vii) the 2K system provides powder coatings that have low gloss, preferably very low gloss;
viii) the 2K system provides powder coatings that have low yellowness, preferably very low yellowness.

It would be particularly desirable to provide a 2K system comprising a physical mixture of a thermosetting powder coating composition (2K-A) with a different, separate, distinct thermosetting powder coating composition (2K-B), that could provide for properties i)-ii), preferably properties i)-iii), more preferably properties i)-iv), even more preferably properties i)-v), most preferably properties i)-vi), especially properties i)-vii), more especially properties i)-viii).

Each of EP 0957 141 A1, WO 2010/052295 A1, and WO 2010/052296 A1 not only teaches away from the present invention for reasons explained in the previous pages of this application, not only each of them teaches strongly away from each other, but also neither EP 0957 141 A1, nor WO 2010/052295 A1, nor WO 2010/052296 A1 provide for thermosetting powder compositions which provide for properties i)-vi), let alone properties i)-vii) or properties i)-viii).

It is therefore an object of the invention to address some or all of the problems and/or to achieve some or all of the desired properties identified herein, preferably provide for properties i)-vi), more preferably properties i)-vii), most preferably properties i)-viii).

Therefore, broadly in accordance with the invention there is provided a thermosetting powder coating composition C (PCC C) as described herein and as defined by the claims. Accordingly, the invention provides for a thermosetting powder coating composition C (PCC C) comprising a physical mixture of two different, separate and distinct thermosetting powder coating compositions A (PCC A) and B (PCC B), wherein the weight ratio R=weight PCC N weight PCC B, is at least 0.01 and at most 99 and the total weight of the mixture of PCC A and PCC B in PCC C, is at least 10% w/w based on the total weight of PCC C, and wherein, i) PCC A comprises:

A1: an unsaturated resin comprising ethylenic unsaturations having a WPU of at least 250 and at most 2200 g/mol;

A2: a copolymerizable agent selected from the group consisting of:
  a) a crystalline copolymerizable resin (CCR) having a WPU of at least 190 and at most 1500 g/mol and a $M_n$ equal to or higher than 350 Da, and
  b) a mixture of a crystalline copolymerizable resin (CCR) with an amorphous copolymerizable resin (ACR) wherein each of the CCR and ACR has a WPU of at least 190 and at most 1500 g/mol and a $M_n$ equal to or higher than 350 Da and wherein said mixture the weight ratio M=weight ACR/weight CCR, is at most 1;

wherein the total weight of A1 and A2 in PCC A, is at least 10% w/w based on the total weight of PCC A;

A3: an unsaturated monomer, in an amount of 0-0.9% w/w based on the total weight of PCC A;

A4: a thermal radical initiator in an amount of at least 1 and at most 500 mmol thermally labile groups/Kg of total weight of A1 and A2, said thermal radical initiator comprising:

A4-1: a peroxide selected from the group consisting of peresters, alkylperoxy carbonates and mixtures thereof, said peroxide is present in an amount of at least 1 and at most 245 mmol peroxy groups/Kg of total weight of A1 and A2;

A5: a transition metal substance in an amount of 0-4.5 mmol metal/Kg of total weight of A1 and A2, said transition metal substance is selected from the group consisting of Co, Mn, Cu, Fe, V, Ti, transition metal compounds of Co, transition metal compounds of Mn, transition metal compounds of Cu, transition metal compounds of Fe, transition metal compounds of V, transition metal compounds of Ti and mixtures thereof;

A6: an inhibitor in an amount of at least 13 and at most 5000 mg inhibitor/Kg of total weight of A1 and A2; and wherein
ii) PCC B comprises:
B1: an unsaturated resin comprising ethylenic unsaturations having a WPU of at least 250 and at most 2200 g/mol;
B2: copolymerizable agent selected from the group consisting of:
  a) a crystalline copolymerizable resin (CCR) having a WPU of at least 190 and at most 1500 g/mol and a $M_n$ equal to or higher than 350 Da, and
  b) a mixture of a crystalline copolymerizable resin (CCR) with an amorphous copolymerizable resin (ACR) wherein each of the CCR and ACR has a WPU of at least 190 and at most 1500 g/mol and a $M_n$ equal to or higher than 350 Da and wherein said mixture the weight ratio M=weight ACR/weight CCR, is at most 1;
wherein the total weight of B1 and B2 in PCC B, is at least 10% w/w based on the total weight of PCC B;
B3: an unsaturated monomer, in an amount of 0-0.9% w/w based on the total weight of PCC B;
B4: a thermal radical initiator in an amount of at least 1 and at most 500 mmol thermally labile groups/Kg of total weight of B1 and B2, said thermal radical initiator comprising:
  B4-1: a peranhydride in an amount of at least 0.5 and at most 300 mmol peroxy groups/Kg of total weight of B1 and B2;
B5: a transition metal substance in an amount of at least 0.5 and at most 50 mmol metal/Kg of total weight of B1 and B2, said transition metal substance is selected from the group consisting of Co, Mn, Cu, Fe, V, Ti, transition metal compounds of Co, transition metal compounds of Mn, transition metal compounds of Cu, transition metal compounds of Fe, transition metal compounds of V, transition metal compounds of Ti and mixtures thereof;
B6: an inhibitor in an amount of at least 16 and at most 5000 mg inhibitor/Kg of total weight of B1 and B2;
and wherein
  iii) the total amount of unsaturated monomer in PCC C ranges from 0 up to 0.9% w/w based on the total weight of PCC C;
and wherein
  iv) the total amount of thermal radical initiator in PCC C is at least 22 and at most 500 mmol thermally labile groups/kg of total weight of unsaturated resins and copolymerizable agent in PCC C.

Preferably, the thermosetting powder coating composition C (PCC C) comprises a physical mixture of two different, separate and distinct thermosetting powder coating compositions A (PCC A) and B (PCC B), wherein the weight ratio R=weight PCC N weight PCC B, is at least 0.01 and at most 99 and the total weight of the mixture of PCC A and PCC B in PCC C, is at least 10% w/w based on the total weight of PCC C, and wherein,
  i) PCC A comprises:
A1: an unsaturated resin comprising ethylenic unsaturations having a WPU of at least 250 and at most 2200 g/mol;
A2: a copolymerizable agent selected from the group consisting of:
  a) a crystalline copolymerizable resin (CCR) having a WPU of at least 190 and at most 1500 g/mol and a $M_n$ equal to or higher than 350 Da, and
  b) a mixture of a crystalline copolymerizable resin (CCR) with an amorphous copolymerizable resin (ACR) wherein each of the CCR and ACR has a WPU of at least 190 and at most 1500 g/mol and a $M_n$ equal to or higher than 350 Da and wherein said mixture the weight ratio M=weight ACR/weight CCR, is at most 1;
wherein the CCR is selected from the group consisting of vinyl ether resin, vinyl ester resin, vinyl (ether-ester) resin, vinyl functionalized urethane resin and mixtures thereof, said resin having a WPU of at least 190 and at most 1500 and a $M_n$ equal to or higher than 350 Da;
wherein the total weight of A1 and A2 in PCC A, is at least 10% w/w based on the total weight of PCC A;
A3: an unsaturated monomer, in an amount of 0-0.9% w/w based on the total weight of PCC A;
A4: a thermal radical initiator in an amount of at least 1 and at most 500 mmol thermally labile groups/Kg of total weight of A1 and A2, said thermal radical initiator comprising:
  A4-1: a peroxide selected from the group consisting of peresters, alkylperoxy carbonates and mixtures thereof, said peroxide is present in an amount of at least 1 and at most 245 mmol peroxy groups/Kg of total weight of A1 and A2;
A5: a transition metal substance in an amount of 0-4.5 mmol metal/Kg of total weight of A1 and A2, said transition metal substance is selected from the group consisting of Co, Mn, Cu, Fe, V, Ti, transition metal compounds of Co, transition metal compounds of Mn, transition metal compounds of Cu, transition metal compounds of Fe, transition metal compounds of V, transition metal compounds of Ti and mixtures thereof;
A6: an inhibitor in an amount of at least 13 and at most 5000 mg inhibitor/Kg of total weight of A1 and A2; and wherein
ii) PCC B comprises:
B1: an unsaturated resin comprising ethylenic unsaturations having a WPU of at least 250 and at most 2200 g/mol;
B2: copolymerizable agent selected from the group consisting of:
  a) a crystalline copolymerizable resin (CCR) having a WPU of at least 190 and at most 1500 g/mol and a $M_n$ equal to or higher than 350 Da, and
  b) a mixture of a crystalline copolymerizable resin (CCR) with an amorphous copolymerizable resin (ACR) wherein each of the CCR and ACR has a WPU of at least 190 and at most 1500 g/mol and a $M_n$ equal to or higher than 350 Da and wherein said mixture the weight ratio M=weight ACR/weight CCR, is at most 1;
wherein the CCR is selected from the group consisting of vinyl ether resin, vinyl ester resin, vinyl (ether-ester) resin, vinyl functionalized urethane resin and mixtures thereof, said resin having a WPU of at least 190 and at most 1500 and a $M_n$ equal to or higher than 350 Da;
wherein the total weight of B1 and B2 in PCC B, is at least 10% w/w based on the total weight of PCC B;
B3: an unsaturated monomer, in an amount of 0-0.9% w/w based on the total weight of PCC B;
B4: a thermal radical initiator in an amount of at least 1 and at most 500 mmol thermally labile groups/Kg of total weight of B1 and B2, said thermal radical initiator comprising:
  B4-1: a peranhydride in an amount of at least 0.5 and at most 300 mmol peroxy groups/Kg of total weight of B1 and B2;
B5: a transition metal substance in an amount of at least 0.5 and at most 50 mmol metal/Kg of total weight of B1 and B2, said transition metal substance is selected from the group consisting of Co, Mn, Cu, Fe, V, Ti, transition metal compounds of Co, transition metal compounds of Mn, transition metal compounds of Cu, transition metal compounds of Fe, transition metal compounds of V, transition metal compounds of Ti and mixtures thereof;

B6: an inhibitor in an amount of at least 16 and at most 5000 mg inhibitor/Kg of total weight of B1 and B2;

and wherein iii) the total amount of unsaturated monomer in PCC C ranges from 0 up to 0.9% w/w based on the total weight of PCC C;

and wherein iv) the total amount of thermal radical initiator in PCC C is at least 22 and at most 500 mmol thermally labile groups/kg of total weight of unsaturated resins and copolymerizable agent in PCC C.

Preferably, the thermosetting powder coating composition C (PCC C) comprises a physical mixture of two different, separate and distinct thermosetting powder coating compositions A (PCC A) and B (PCC B), wherein the weight ratio R=weight PCC N weight PCC B, is at least 0.01 and at most 99 and the total weight of the mixture of PCC A and PCC B in PCC C, is at least 10% w/w based on the total weight of PCC C, and wherein, i) PCC A comprises:

A1: unsaturated polyester resin comprising ethylenic unsaturations having a WPU of at least 250 and at most 2200 g/mol;

A2: a copolymerizable agent selected from the group consisting of:
  a) a crystalline copolymerizable resin (CCR) having a WPU of at least 190 and at most 1500 g/mol and a $M_n$ equal to or higher than 350 Da, and
  b) a mixture of a crystalline copolymerizable resin (CCR) with an amorphous copolymerizable resin (ACR) wherein each of the CCR and ACR has a WPU of at least 190 and at most 1500 g/mol and a $M_n$ equal to or higher than 350 Da and wherein said mixture the weight ratio M=weight ACR/weight CCR, is at most 1;

wherein the total weight of A1 and A2 in PCC A, is at least 10% w/w based on the total weight of PCC A;

A3: an unsaturated monomer, in an amount of 0-0.9% w/w based on the total weight of PCC A;

A4: a thermal radical initiator in an amount of at least 1 and at most 500 mmol thermally labile groups/Kg of total weight of A1 and A2, said thermal radical initiator comprising:
  A4-1: a peroxide selected from the group consisting of peresters, alkylperoxy carbonates and mixtures thereof, said peroxide is present in an amount of at least 1 and at most 245 mmol peroxy groups/Kg of total weight of A1 and A2;

A5: a transition metal substance in an amount of 0-4.5 mmol metal/Kg of total weight of A1 and A2, said transition metal substance is selected from the group consisting of Co, Mn, Cu, Fe, V, Ti, transition metal compounds of Co, transition metal compounds of Mn, transition metal compounds of Cu, transition metal compounds of Fe, transition metal compounds of V, transition metal compounds of Ti and mixtures thereof;

A6: an inhibitor in an amount of at least 13 and at most 5000 mg inhibitor/Kg of total weight of A1 and A2; and wherein ii) PCC B comprises:

B1: unsaturated polyester resin comprising ethylenic unsaturations having a WPU of at least 250 and at most 2200 g/mol;

B2: copolymerizable agent selected from the group consisting of:
  a) a crystalline copolymerizable resin (CCR) having a WPU of at least 190 and at most 1500 g/mol and a $M_n$ equal to or higher than 350 Da, and
  b) a mixture of a crystalline copolymerizable resin (CCR) with an amorphous copolymerizable resin (ACR) wherein each of the CCR and ACR has a WPU of at least 190 and at most 1500 g/mol and a $M_n$ equal to or higher than 350 Da and wherein said mixture the weight ratio M=weight ACR/weight CCR, is at most 1;

wherein the total weight of B1 and B2 in PCC B, is at least 10% w/w based on the total weight of PCC B;

B3: an unsaturated monomer, in an amount of 0-0.9% w/w based on the total weight of PCC B;

B4: a thermal radical initiator in an amount of at least 1 and at most 500 mmol thermally labile groups/Kg of total weight of B1 and B2, said thermal radical initiator comprising:
  B4-1: a peranhydride in an amount of at least 0.5 and at most 300 mmol peroxy groups/Kg of total weight of B1 and B2;

B5: a transition metal substance in an amount of at least 0.5 and at most 50 mmol metal/Kg of total weight of B1 and B2, said transition metal substance is selected from the group consisting of Co, Mn, Cu, Fe, V, Ti, transition metal compounds of Co, transition metal compounds of Mn, transition metal compounds of Cu, transition metal compounds of Fe, transition metal compounds of V, transition metal compounds of Ti and mixtures thereof;

B6: an inhibitor in an amount of at least 16 and at most 5000 mg inhibitor/Kg of total weight of B1 and B2;

and wherein iii) the total amount of unsaturated monomer in PCC C ranges from 0 up to 0.9% w/w based on the total weight of PCC C;

and wherein iv) the total amount of thermal radical initiator in PCC C is at least 22 and at most 500 mmol thermally labile groups/kg of total weight of unsaturated resins and copolymerizable agent in PCC C.

Preferably, the thermosetting powder coating composition C (PCC C) comprises a physical mixture of two different, separate and distinct thermosetting powder coating compositions A (PCC A) and B (PCC B), wherein the weight ratio R=weight PCC N weight PCC B, is at least 0.01 and at most 99 and the total weight of the mixture of PCC A and PCC B in PCC C, is at least 10% w/w based on the total weight of PCC C, and wherein, i) PCC A comprises:

A1: unsaturated polyester resin comprising ethylenic unsaturations having a WPU of at least 250 and at most 2200 g/mol;

A2: a copolymerizable agent selected from the group consisting of:
  a) a crystalline copolymerizable resin (CCR) having a WPU of at least 190 and at most 1500 g/mol and a $M_n$ equal to or higher than 350 Da, and
  b) a mixture of a crystalline copolymerizable resin (CCR) with an amorphous copolymerizable resin (ACR) wherein each of the CCR and ACR has a WPU of at least 190 and at most 1500 g/mol and a $M_n$ equal to or higher than 350 Da and wherein said mixture the weight ratio M=weight ACR/weight CCR, is at most 1;

wherein the CCR is selected from the group consisting of vinyl ether resin, vinyl ester resin, vinyl (ether-ester) resin, vinyl functionalized urethane resin and mixtures thereof, said resin having a WPU of at least 190 and at most 1500 and a $M_n$ equal to or higher than 350 Da;

wherein the total weight of A1 and A2 in PCC A, is at least 10% w/w based on the total weight of PCC A;
A3: an unsaturated monomer, in an amount of 0-0.9% w/w based on the total weight of PCC A;
  A4: a thermal radical initiator in an amount of at least 1 and at most 500 mmol thermally labile groups/Kg of total weight of A1 and A2, said thermal radical initiator comprising:
    A4-1: a peroxide selected from the group consisting of peresters, alkylperoxy carbonates and mixtures thereof, said peroxide is present in an amount of at least 1 and at most 245 mmol peroxy groups/Kg of total weight of A1 and A2;
A5: a transition metal substance in an amount of 0-4.5 mmol metal/Kg of total weight of A1 and A2, said transition metal substance is selected from the group consisting of Co, Mn, Cu, Fe, V, Ti, transition metal compounds of Co, transition metal compounds of Mn, transition metal compounds of Cu, transition metal compounds of Fe, transition metal compounds of V, transition metal compounds of Ti and mixtures thereof; A6: an inhibitor in an amount of at least 13 and at most 5000 mg inhibitor/Kg of total weight of A1 and A2; and wherein
  ii) PCC B comprises:
B1: unsaturated polyester resin comprising ethylenic unsaturations having a WPU of at least 250 and at most 2200 g/mol;
B2: copolymerizable agent selected from the group consisting of:
  a) a crystalline copolymerizable resin (CCR) having a WPU of at least 190 and at most 1500 g/mol and a $M_n$ equal to or higher than 350 Da, and
  b) a mixture of a crystalline copolymerizable resin (CCR) with an amorphous copolymerizable resin (ACR) wherein each of the CCR and ACR has a WPU of at least 190 and at most 1500 g/mol and a $M_n$ equal to or higher than 350 Da and wherein said mixture the weight ratio M=weight ACR/weight CCR, is at most 1;
wherein the CCR is selected from the group consisting of vinyl ether resin, vinyl ester resin, vinyl (ether-ester) resin, vinyl functionalized urethane resin and mixtures thereof, said resin having a WPU of at least 190 and at most 1500 and a $M_n$ equal to or higher than 350 Da;
wherein the total weight of B1 and B2 in PCC B, is at least 10% w/w based on the total weight of PCC B;
B3: an unsaturated monomer, in an amount of 0-0.9% w/w based on the total weight of PCC B;
  B4: a thermal radical initiator in an amount of at least 1 and at most 500 mmol thermally labile groups/Kg of total weight of B1 and B2, said thermal radical initiator comprising:
    B4-1: a peranhydride in an amount of at least 0.5 and at most 300 mmol peroxy groups/Kg of total weight of B1 and B2;
B5: a transition metal substance in an amount of at least 0.5 and at most 50 mmol metal/Kg of total weight of B1 and B2, said transition metal substance is selected from the group consisting of Co, Mn, Cu, Fe, V, Ti, transition metal compounds of Co, transition metal compounds of Mn, transition metal compounds of Cu, transition metal compounds of Fe, transition metal compounds of V, transition metal compounds of Ti and mixtures thereof;
B6: an inhibitor in an amount of at least 16 and at most 5000 mg inhibitor/Kg of total weight of B1 and B2;
and wherein iii) the total amount of unsaturated monomer in PCC C ranges from 0 up to 0.9% w/w based on the total weight of PCC C;
and wherein
  iv) the total amount of thermal radical initiator in PCC C is at least 22 and at most 500 mmol thermally labile groups/kg of total weight of unsaturated resins and copolymerizable agent in PCC C.
Preferably, in the composition of the invention PCC A further comprises:
A7: a thiol in an amount of 0-5 mmol thiol groups/Kg of total weight of A1 and A2; and/or
A8: an acetoacetamide compound in an amount of 0-200 mmol acetoacetamide compound/Kg of total weight of A1 and A2; and/or
A9: a 1,2,3 trihydroxy aryl compound in an amount of 0-10 mmol 1,2,3 trihydroxy aryl compound/Kg of total weight of A1 and A2, if A5 comprises one or both of Cu and a transition metal compound of Cu.
Preferably, in the composition of the invention, PCC A further comprises:
  A10: a free amine in an amount such that ratio L=mmol thermally labile groups/mmol free amine, is at least 1.1.
Preferably, in the composition of the invention, PCC B further comprises:
B7: a thiol in an amount of 0-5 mmol thiol groups/Kg of total weight of B1 and B2; and/or
B8: an acetoacetamide compound in an amount of 0-5 mmol acetoacetamide compound/Kg of total weight of B1 and B2; and/or
B9: a 1,2,3 trihydroxy aryl compound in an amount of 0-5 mmol 1,2,3 trihydroxy aryl compound/Kg of total weight of B1 and B2, if B5 comprises one or both of Cu and a transition metal compound of Cu.
Preferably, in the composition of the invention, PCC B further comprises:
  B10: a free amine in an amount such that ratio L=mmol thermally liable groups/mmol free amine, is at least 1.1.
Preferably, in the composition of the invention B4 further comprises:
  B4-2a: a hydroperoxide in an amount of 0-5 mmol h-peroxy groups/Kg of total weight of B1 and B2; and/or
  B4-2b: a perester in an amount 0-25 mmol p-peroxy groups/Kg of total weight of B1 and B2; and/or
  B4-2c: an alkylperoxy carbonate in an amount of 0-25 mmol ac-peroxy groups/Kg of total weight of B1 and B2.
Preferably, in the composition of the invention:
  v) the total amount of transition metal substance in PCC C is at least 0.25 and at most 50 mmol metal/Kg of total weight of unsaturated resins and copolymerizable agent in PCC C.
  vi) the total amount of inhibitor in PCC C is at least 13 and at most 5000 mg inhibitor/Kg of total weight of unsaturated resins and copolymerizable agent in PCC C.
Preferably, in the composition of the invention R is at least 0.1 and at most 9.
Preferably, in the composition of the invention R is at least 0.2 and at most 4.
Preferably, in the composition of the invention R is at least 0.5 and at most 2.
Preferably PCC C essentially consists of PCC A and PCC B.
Preferably, R is at least 0.1 and at most 10.
Preferably, R is at least 0.1 and at most 9.
Preferably, R is at least 0.3 and at most 3.

Preferably, R is at least 0.1 and at most 3.
Preferably, R is at least 0.1 and at most 4.
Preferably, R is at least 0.2 and at most 4.
Preferably, R is at least 0.4 and at most 5.
Preferably, R is at least 0.5 and at most 2.
Preferably, R is at least 0.9 and at most 1.1.
Preferably, R is equal to 1.

Preferably, in the composition of the invention the molar ratio $K_A$ (=mol of the reactive unsaturations in A2/mol of the ethylenic unsaturations in A1), is at least 0.90 and at most 1.10.

Preferably, in the composition of the invention the molar ratio $K_B$ (=mol of the reactive unsaturations in B2/mol of the ethylenic unsaturations in B1), is at least 0.90 and at most 1.10.

Preferably, in the composition of the invention the unsaturated resin comprising ethylenic unsaturations in PCC A is an unsaturated polyester resin comprising ethylenic unsaturations.

Preferably, in the composition of the invention the unsaturated resin comprising ethylenic unsaturations in PCC A is an unsaturated polyester resin comprising 2-butenedioic acid ethylenic unsaturations.

Preferably, in the composition of the invention the unsaturated resin comprising ethylenic unsaturations in PCC B is an unsaturated polyester resin comprising ethylenic unsaturations.

Preferably, in the composition of the invention the unsaturated resin comprising ethylenic unsaturations in PCC B is an unsaturated polyester resin comprising 2-butenedioic acid ethylenic unsaturations.

Preferably, in the composition of the invention the crystalline copolymerizable resin in A2 is selected from the group consisting of vinyl ether resin, vinyl ester resin, vinyl(ether-ester) resin, vinyl functionalized urethane resin and mixtures thereof.

Preferably, in the composition of the invention the crystalline copolymerizable resin in B2 is selected from the group consisting of vinyl ether resin, vinyl ester resin, vinyl(ether-ester) resin, vinyl functionalized urethane resin and mixtures thereof.

Preferably, in the composition of the invention the ratio M is at most 0.3.

Preferably, PCC A does not comprise an unsaturated monomer.

Preferably, PCC B does not comprise an unsaturated monomer.

Preferably, PCC C does not comprise an unsaturated monomer.

Preferably, each of PCC A and PCC B and PCC C does not comprise an unsaturated monomer.

Preferably, the unsaturated resin comprising ethylenic unsaturations is selected from the group consisting of polyester resins, acrylic resins, polyurethanes, epoxy resins, polyamides, polyesteramides, polycarbonates, polyureas and mixtures thereof.

Preferably, the ethylenic unsaturations are di-acid ethylenic unsaturations.

Preferably, the ethylenic unsaturations are 2-butenedioic acid ethylenic unsaturations.

Preferably, the unsaturated resin comprising ethylenic unsaturations in PCC A, is an unsaturated polyester resin comprising ethylenic unsaturations.

Preferably, the unsaturated resin comprising ethylenic unsaturations in PCC A, is an unsaturated polyester resin comprising di-acid ethylenic unsaturations.

Preferably, the unsaturated resin comprising ethylenic unsaturations in PCC A, is an unsaturated polyester resin comprising 2-butenedioic acid ethylenic unsaturations.

Preferably, the unsaturated resin comprising ethylenic unsaturations in PCC B, is an unsaturated polyester resin comprising ethylenic unsaturations.

Preferably, the unsaturated resin comprising ethylenic unsaturations in PCC B, is an unsaturated polyester resin comprising di-acid ethylenic unsaturations.

Preferably, the unsaturated resin comprising ethylenic unsaturations in PCC B, is an unsaturated polyester resin comprising 2-butenedioic acid ethylenic unsaturations.

Preferably, the crystalline copolymerizable resin comprising ethylenic unsaturations in PCC A, is selected from the group consisting of vinyl ether resin, vinyl ester resin, vinyl (ether-ester) resin, vinyl functionalized urethane resin and mixtures thereof; more preferably the crystalline copolymerizable resin comprising ethylenic unsaturations in PCC A, is selected from the group consisting of vinyl ether resin, vinyl ester resin, vinyl functionalized urethane resin and mixtures thereof; most preferably the crystalline copolymerizable resin comprising ethylenic unsaturations in PCC A, is selected from the group consisting of vinyl ether resin, vinyl functionalized urethane resin and mixtures thereof; especially, the crystalline copolymerizable resin comprising ethylenic unsaturations in PCC A, is a vinyl functionalized urethane resin.

Preferably, the crystalline copolymerizable resin comprising ethylenic unsaturations in PCC B, is selected from the group consisting of vinyl ether resin, vinyl ester resin, vinyl (ether-ester) resin, vinyl functionalized urethane resin and mixtures thereof; more preferably the crystalline copolymerizable resin comprising ethylenic unsaturations PCC B, is selected from the group consisting of vinyl ether resin, vinyl ester resin, vinyl functionalized urethane resin and mixtures thereof; most preferably the crystalline copolymerizable resin comprising ethylenic unsaturations in PCC B, is selected from the group consisting of vinyl ether resin, vinyl functionalized urethane resin and mixtures thereof; especially, the crystalline copolymerizable resin comprising ethylenic unsaturations in PCC B, is a vinyl functionalized urethane resin.

It was surprisingly found that the compositions of the invention address some or all of the problems and/or to achieve some or all of the desired properties identified herein. More particularly, the compositions of the invention provide for properties i)-ii), preferably properties i)-iii), more preferably properties i)-iv), even more preferably properties i)-v), most preferably properties i)-vi), especially properties i)-vii), more especially properties i)-viii).

In another aspect, the invention provides for a process for making the thermosetting powder coating composition C (PCC C) of the invention comprising the steps of:
a. providing a thermosetting powder coating composition A (PPC A) as disclosed herein and as defined by the claims and a different, separate, distinct thermosetting powder coating composition B (PPC B) as disclosed herein and as defined by the claims; and
b. physically mixing PCC A with PCC B in a weight ratio R=weight PCC A/weight PCC B, that is at least 0.01 and at most 99, to obtain the PCC C.

In another aspect, the invention provides for a cured thermosetting powder coating composition of the invention; preferably the cured thermosetting powder coating composition of the invention is a powder coating; the cured thermosetting powder coating composition of the invention is derived upon curing of the thermosetting powder coating composition of the invention; said curing may be effected via heat- and/or radiation, preferably via heat.

Preferably, the invention provides for a powder coating derived upon curing of the thermosetting powder coating composition of the invention; said curing may be effected via heat- and/or radiation, preferably via heat.

In another aspect, the invention provides for an article having coated thereon the thermosetting powder coating composition of the invention; preferably the article is selected from the group consisting of heat-sensitive articles, non-heat-sensitive articles and combinations thereof; said article is preferably selected from the group consisting of wood, low density fibre board, medium density fibreboard, high density fibreboard, plastic, thermoplastic composite, thermoset composite, fibre reinforced composites, sandwich materials, metal and combinations thereof.

In another aspect, the invention provides for an article having coated and cured thereon the thermosetting powder coating composition of the invention; preferably the article is selected from the group consisting of heat-sensitive articles, non-heat-sensitive articles and combinations thereof; said article is preferably selected from the group consisting of wood, low density fibre board, medium density fibreboard, high density fibreboard, plastic, thermoplastic composite, thermoset composite, fibre reinforced composites, sandwich materials, metal and combinations thereof.

In another aspect, the invention provides for a process for making an article having coated and cured thereon the composition of the invention comprising the steps of:

a. applying the composition of the invention to an article;
b. heating and/or radiating the composition of the invention for enough time and at a suitable temperature to cure the composition of the to obtain the article having coated and cured thereon the composition of the invention.

In another aspect, the invention provides for the use of:
the thermosetting powder coating composition of the invention or
the cured thermosetting powder coating composition of the invention; or
an article having coated thereon the thermosetting powder coating composition of the invention; or
an article having coated and cured thereon the thermosetting powder coating composition of the invention in powder coatings, powder coatings for heat-sensitive articles, powder coatings for non-heat-sensitive articles, 3D-printing, automotive applications, marine applications, aerospace applications, medical applications, defense applications, sports/recreational applications, architectural applications, bottling application, household application, machinery applications, can applications, coil applications, energy applications, textile applications and electrical applications.

1. DEFINITIONS

By a thermosetting powder coating composition (PCC) being "heat curable at low temperatures" is meant herein that the PCC is heat curable, and once the PCC is cured at 130° C. for 10 minutes in an air-circulation oven, it affords a powder coating that has a chemical resistance of at least 3 or higher. A PCC being heat curable at low temperatures is thus suitable for coating heat-sensitive articles.

By a thermosetting powder coating composition being "extrudable" is meant herein that once the components of said composition are mixed together, said mixture can be processed via an extruder. If the thermosetting powder coating composition is gelled during extrusion, then it is not characterized as being "extrudable".

By a thermosetting powder coating composition being "heat curable" is meant herein that the curing of the thermosetting powder coating composition can be effected by using heat.

By "clearcoat compositions" is meant herein a non-pigmented thermosetting powder coating composition.

By "clearcoat" is meant herein a powder coating derived upon curing of a non-pigmented thermosetting powder coating composition.

By "good physical storage stability" is meant herein that the physical storage stability (as this is defined and measured in the Examples) of either a clearcoat composition or a white pigmented thermosetting powder coating composition is at least 5 or higher.

By "excellent resistance to swelling" is meant herein that the resistance to swelling (as this is defined and measured in the Examples) of either clearcoats or white powder coatings derived upon curing of their corresponding thermosetting powder coating compositions is 48.

By "good smoothness" is meant herein that the smoothness (as this is defined and measured in the Examples) of either clearcoats or white powder coatings derived upon curing of their corresponding thermosetting powder coating compositions is at least 3 or higher.

By "good chemical resistance" is meant herein that the chemical resistance (as this is defined and measured in the Examples) of either clearcoats or white powder coatings derived upon curing of their corresponding thermosetting powder coating compositions is at least 3 or higher.

By "low gloss" is meant herein that the gloss 60° (as this is defined and measured in the Examples) of either clearcoats or white powder coatings derived upon curing of their corresponding thermosetting powder coating compositions is equal to or lower than 45.

By "very low gloss" is meant herein that the gloss 60° (as this is defined and measured in the Examples) of either clearcoats or white powder coatings derived upon curing of their corresponding thermosetting powder coating compositions is equal to or lower than 40.

By "low yellowness" is meant herein that the b* (as this is defined and measured in the Examples) of white powder coatings derived upon curing of white pigmented thermosetting powder coating compositions is equal to or lower than 3.

By "very low yellowness" is meant herein that the b* (as this is defined and measured in the Examples) of white powder coatings derived upon curing of white pigmented thermosetting powder coating compositions is equal to or lower than 2.2.

By "curing" or "cure" is meant herein the process of becoming "set" that is to form an irreversibly crosslinked network (the so-called "cured form" or "cured composition"), a material that can no longer flow, be melted or dissolved. Herein, the terms "curing" "cure" and "crosslinking" are used interchangeably. Preferably, the curing of the thermosetting powder coating composition of the invention takes place using heat and in that case the curing can be called "heat curing". For clarity, the term heat curing does not include ultraviolet (UV) or electron beam induced curing. When the curing of the thermosetting powder coating composition of the invention takes place using radiation i.e. UV and/or electron beam, in that case the curing is called "radiation curing". Most preferably the curing of the thermosetting powder coating composition of the invention takes place using only heat or equally the curing of the thermosetting powder coating composition of the invention takes place via only heat curing. Optionally, a combination of heat and pressure can be used to cure the heat-curable thermosetting powder coating compositions of the invention. In the context of the invention, the term "heat curing" does not exclude the application of pressure along with heat in order to cure the heat-curable thermosetting powder coating compositions of the invention.

By "low temperatures" is meant herein temperatures in the range of 80-150° C., preferably 100-150° C., more preferably 110-150° C., even more preferably 120-150° C., most preferably 80-140° C., especially 80-130° C., more especially 80-120° C., most especially 80-110° C.

By "room temperature" is meant herein a temperature of 23° C.

A "resin" is herein understood to have the same meaning as it has to a skilled person in thermosetting polymer chemistry, namely as a low molecular weight organic monomer or polymer, comprising reactive moieties such as for example ethylenic unsaturations, said resin is able to crosslink; said reactive moieties via a chemical reaction preferably said chemical reaction is induced by means of heat and/or radiation, ultimately connect the polymer chains together through the formation of permanent covalent (crosslink) bonds, resulting to the cured resin. The term "low molecular weight" means a theoretical number average molecular weight ($M_n$) ranging between a few hundred Da, e.g. 350 Da, and a few thousand Da, e.g. 20000 Da. Preferably a resin has a $M_n$ of at least 355, more preferably of at least 360, even more preferably of at least 370, most preferably of at least 380, especially of at least 385, more especially of at least 390, most especially of at least 395, for example of at least 399, for example of at least 400. Preferably, a resin has a $M_n$ of at most 20000, more preferably of at most 10000, even more preferably of at most 9000, most preferably of at most 8000, especially of at most 7000, more especially of at most 6000, most especially of at most 5000, for example of at most 4000, for example of at most 3500, Da. A resin is classified as acid functional in case its hydroxyl value (OHV) is lower than its acid value (AV). A resin is classified as hydroxyl functional in case its acid value is lower than its hydroxyl value. In the context of the invention the acid value of a resin (AV in mg KOH/g of resin) is measured titrimetrically according to ISO 2114-2000, whereas the hydroxyl value of a resin (OHV in mg KOH/g of resin) is measured using ISO 4629-1978.

By "reactive unsaturations" as used herein means reactive carbon-carbon triple bond and cis- or trans-configured reactive carbon-carbon double bond unsaturation that does not include aromatic unsaturation, carbon-heteroatom unsaturation, and that are able to react with ethylenic unsaturations for example by copolymerizing with ethylenic unsaturations.

By "copolymerizable agent" or "curing agent" or "crosslinking agent" or "co-crosslinker" or "crosslinker" (abbreviated herein as CA) is meant herein a resin comprising reactive unsaturations that are able to react with the ethylenic unsaturations of the unsaturated resin comprising ethylenic unsaturations (UR) and said reactive unsaturations of the copolymerizable agent are different from those of the UR; for example a reactive carbon-carbon triple bond unsaturation is considered herein as being different from a cis- or trans-configured reactive carbon-carbon double bond unsaturation; for example in case the reactive unsaturations of the copolymerizable agent are cis- or trans-configured reactive carbon-carbon double bond unsaturations, these are considered as being different from the ethylenic unsaturations of the UR, in the sense that at least one substituent of the carbon-carbon double bond of the reactive unsaturations of the copolymerizable agent is different upon comparison to the substituents of the carbon-carbon double bonds of the ethylenic unsaturations. Preferably, the reactive unsaturations of the CA are ethylenic unsaturations different from the ethylenic unsaturations of the UR (different in the sense as explained just above); more preferably the reactive unsaturations of the CA are ethylenic unsaturations comprising at least a hydrogen which is covalently bonded to a carbon of the ethylenic unsaturation, said ethylenic unsaturations are different from the ethylenic unsaturations of the UR (different in the sense as explained just above). Preferably, the unsaturations of the CA are vinyl unsaturations. The copolymerizable agent is selected from the group consisting of:

a) a crystalline copolymerizable resin (CCR) having a WPU of at least 190 and at most 1500 g/mol and a $M_n$ equal to or higher than 350 Da, and b) a mixture of a crystalline copolymerizable resin (CCR) with an amorphous copolymerizable resin (ACR) wherein each of the CCR and ACR has a WPU of at least 190 and at most 1500 and a $M_n$ equal to or higher than 350 Da and wherein said mixture the weight ratio M=weight ACR/weight CCR, is at most 1.

By "crystalline copolymerizable resin" is meant herein a resin that is crystalline and said resin has reactive unsaturations that are able to react with the ethylenic unsaturations of the unsaturated resin comprising ethylenic unsaturations (UR) and said reactive unsaturations of the crystalline copolymerizable resin are different from those of the UR; for example a reactive carbon-carbon triple bond unsaturation is considered herein as being different from a cis- or trans-configured reactive carbon-carbon double bond unsaturation; for example in case the reactive unsaturations of the copolymerizable agent are cis- or trans-configured reactive carbon-carbon double bond unsaturations, these are considered as being different from the ethylenic unsaturations of the UR, in the sense that at least one substituent of the carbon-carbon double bond of the reactive unsaturations of the crystalline copolymerizable resin is different upon comparison to the substituents of the carbon-carbon double bonds of the ethylenic unsaturations.

By "amorphous copolymerizable resin" is meant herein a resin that is amorphous and said resin has reactive unsaturations that are able to react with the ethylenic unsaturations of the unsaturated resin comprising ethylenic unsaturations (UR) and said reactive unsaturations of the amorphous copolymerizable resin are different from those of the UR; for example a reactive carbon-carbon triple bond unsaturation is considered herein as being different from a cis- or trans-configured reactive carbon-carbon double bond unsaturation; for example in case the reactive unsaturations of the copolymerizable agent are cis- or trans-configured reactive carbon-carbon double bond unsaturations, these are considered as being different from the ethylenic unsaturations of the UR, in the sense that at least one substituent of the carbon-carbon double bond of the reactive unsaturations of the amorphous copolymerizable resin is different upon comparison to the substituents of the carbon-carbon double bonds of the ethylenic unsaturations.

By "weight ratio M" or equally "ratio M" or equally "M" is meant herein, M=weight ACR/weight CCR.

By "unsaturated monomer" is meant herein a monomeric compound comprising ethylenic unsaturations for example a vinyl compound, an allyl compound, and having a $M_n$ equal to or lower than 349 Da said monomeric compound being amorphous or crystalline, as well as any compound selected from the group consisting of diacetone acrylamide (monomer or dimer), triallyl cyanurate, N,N'-methylene bisacrylamide, N,N'-diallylmelamine, acrylamide, triallylisocyanurate, neopentyl glycol diacrylate, copolymers of maleic anhydride and alkylene oxides, for example, propylene oxide, ethylene oxide, and others, maleinimide, pentaerythritol tetraacrylate, pentaerythritol triacrylate and mixtures thereof. This group of compounds was mentioned in paragraph [0022] of EP 0957 141 A1 (equivalent to U.S. Pat. No. 6,194,525 B1). As unsaturated monomer is also considered any mixture of: i) a monomeric compound comprising ethylenic unsaturations and having a $M_n$ equal to or lower than 349 Da said monomeric compound being amorphous or crystalline, with ii) any compound selected from the aforementioned group of compounds mentioned in this paragraph.

By "urethane resin" is meant herein a resin comprising urethane moieties . . . —NH—(C=O)—O— . . . .

By "composition" is meant herein the combining and/or mixture of distinct chemical substances and/or components to form a whole.

By "vinyl functionalized urethane resin" (VFUR) is meant herein a urethane resin comprising vinyl groups . . . —CH=CH$_2$.

The term "vinyl groups" is used herein interchangeably with the term "vinyl unsaturations".

The term "vinyl" is used herein interchangeably with the term "ethenyl".

By "vinyl ether functionalized urethane resin" (VEFUR) is meant herein a urethane resin comprising vinyl ether groups (see chemical structure 1;

indicates the points of attachment of the vinyl ether group).

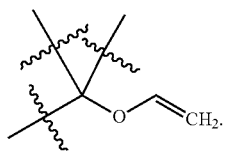

(1)

By "vinyl ester functionalized urethane resin" (VESFUR) is meant herein a urethane resin comprising vinyl ester groups (see chemical structure 2;

indicates the points of attachment of the vinyl ester group).

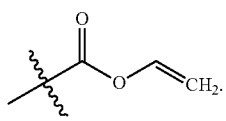

(2)

By "vinyl (ether-ester) functionalized urethane resin" (VEESFUR) is meant herein a urethane resin comprising vinyl ether groups (see chemical structure 1) and vinyl ester groups (see chemical structure 2).

Vinyl ether functionalized urethane resins, vinyl ester functionalized urethane resins and vinyl (ether-ester) functionalized urethane resins as well as their preferred embodiments are each a vinyl functionalized urethane resin.

By "powder" is meant herein, a substantially dry solid substance at room temperature and at atmospheric pressure reduced to a state of fine, loose particles wherein the individual particles have preferably a maximum particle size of at most 200, more preferably of at most 180, even more preferably of at most 160, most preferably of at most 150, especially of at most 140, more especially of at most 130, most especially of at most 120, for example of at most 110, for example of at most 100, for example of at most 90 μm at 23° C. and at atmospheric pressure; the individual particles have preferably a minimum particle size of at least 10, more preferably of at least 15, even more preferably of at least 20, most preferably of at least 25, especially of at least 30, more especially of at least 35, most especially of at least 40, for example of at least 45, for example of at least 50, for example of at least 60, for example of at least 70 μm at 23° C. and at atmospheric pressure. A particle is defined as a small object that: a) has mean linear dimensions as described herein after and b) behaves as a whole unit in terms of its transport and properties. The particle size distribution (PSD) of a powder is a list of values or a mathematical function that defines the relative amounts of particles present, sorted according to size. The terms "particle size" and "particle size distribution" will be used interchangeably in the context of the invention when used in relation to a powder. The method used to measure the particle size of the thermosetting powder coating compositions of the invention is sieve analysis. According to it, the powder is separated on sieves of different sizes. Thus, the PSD is defined in terms of discrete size ranges: e.g. "weight % of sample powder has particle size in the range of 75 microns to 90 microns", when sieves of these sizes are used. Preferably, 90 weight % of the thermosetting powder coating composition of the invention has a particle size in the range of 20 to 200 micron. The PSD can be determined for example by the following method: a certain amount of thermosetting powder coating composition, for example 100 g, is brought onto a Fritsch Analysette Spartan sieving apparatus equipped with a 200 micron sieve. The sample is sieved for 15 minutes at a 2.5 mm amplitude. The fraction of the sample which remained on the sieve was weighed after sieving. The fraction of the sample that went through the sieve (sieved fraction) is collected and is placed on a 160 micron sieve and is sieved as mentioned herein above. Once the same measurements (weighing) are performed as mentioned herein above, the same procedure is repeated using sequentially a 140, a 125, a 112, a 100, a 90, a 75, a 50 and a 20 micron sieve; the last sieved fraction with a size smaller than 20 micron is also weighed. Summing up the various weight fractions, this should yield the initial amount of sample, in this example 100 g. The various weight fractions represent the PSD as a list of values representing the relative amounts of particles present, sorted according to sieves used.

By "substantially dry" is meant herein that the powder e.g. a thermosetting powder composition, does not comprise any deliberately added water or moisture but the powder may comprise moisture absorbed from the atmosphere or water present as a stabilizer of the peroxides in an amount of up to 30, preferably up to 20, more preferably up to 10, even more preferably up to 5, most preferably up to 3, especially up to 2, more especially up to 1% w/w based on the total weight of the powder.

By "thermosetting powder coating compositions" or "powders" is meant herein, compositions in the form of a powder that have the ability to form an irreversible cross-linked network (the so-called "cured form" or "cured composition") upon curing, preferably via heat and/or radiation curing, more preferably via heat curing.

By "physical mixture" is meant herein what a skilled person in the art of thermosetting powder coatings would understand, that is the elements of the mixture are brought and mixed together without: i) a substantial physical transformation and/or process that involves for example substantial melting, use of any liquid media e.g. organic solvent, water, able to solubilize or disperse the powders, and/or ii) chemical transformation and/or process that involves for example a chemical reaction, taking place. For example the physical blending of the elements of a mixture e.g. PCC A and PCC B are elements of PCC C, with a blender (mechanical mixing/blending) is viewed as a physical mixture according to the invention, whilst the melt-extrusion of the elements of a mixture e.g. PCC A and PCC B are elements of PCC C, (known also as co-extrusion), is viewed as a non-physical mixture.

By "physically mixing" is meant herein, what a skilled person in the art of thermosetting powder coatings would understand, that is any mixing process in which the elements of the mixture are brought and mixed together without any: i) physical transformation that involves for example melting, use of any liquid media e.g. organic solvent, water, able to solubilize or disperse the powders, and/or ii) chemical transformation that involves for example a chemical reaction, taking place. For example the physical blending of the elements of a mixture with a blender is viewed as a physical mixing according to the invention whilst the melt-extrusion of the elements of a mixture is viewed as a non-physical mixing.

By "one component thermosetting powder coating composition" or "1K thermosetting powder coating composition" or "1K system" is herein meant that all components of the thermosetting powder coating composition are melt-mixed e.g. via extrusion, and form part of one homogeneous powder.

By "two component thermosetting powder coating composition" or "2K thermosetting powder coating composition" or "2K system" is herein meant a thermosetting powder coating composition that comprises at least two separate, distinct thermosetting powder coating compositions of different chemical compositions; the at least two separate, distinct and different thermosetting powder coating compositions are each typically prepared via melt-mixing. The at least two separate, distinct and different powders are physically mixed via for example physical blending to afford the 2K thermosetting powder coating composition, before the latter either being stored or applied and cured onto an article. The compositions of the invention (PCC C) are two component thermosetting powder coating compositions.

By "components of the thermosetting powder coating compositions of the invention" is meant herein constituent elements, their preferred embodiments and combinations thereof, that constitute part of the thermosetting powder coating composition of the invention; said components, their preferred embodiments and combinations thereof, should be construed in view of the whole disclosure; exemplary components include but are not limited to A1-A10, B1-B10 as each is defined herein; The letter A represents components that are found in PCC A whilst the letter B represents components that are found in PCC B; any further indication of a number or a combination of a number and small letter, next to the symbols denoting components A1-A10, B1-1310, denotes a further particular component contained in any one of the corresponding aforementioned components A1-A10, B1-1310. For example, component B4-2a is a specific class of peroxides (peresters) that form part of component B4 (thermal radical initiator) present in PCC B. Unless otherwise stated, disclosures in this application related to specific components are to be construed as applicable only for these components and within the boundaries of PCC A, or PCC B or PCC C that these components relate to.

By "weight ratio R" or equally "ratio R" or equally "R" is meant herein, R=weight PCC N weight PCC B.

By "weight of A1" is meant herein the total weight of all UR contained in A1.

By "weight of A2" is meant herein the total weight of all the copolymerizable resins contained in A2.

By "weight of B1" is meant herein the total weight of all UR contained in B1.

By "weight of B2" is meant herein the total weight of all the copolymerizable resins contained in B2.

By "heat-curable thermosetting powder coating composition" is meant herein a thermosetting powder coating composition, said composition has the ability to cure upon heating. For clarity, the thermosetting powder coating composition of the invention is heat-curable.

By "radiation-curable thermosetting powder coating composition" is meant herein a thermosetting powder coating composition, said composition has the ability to cure upon radiation i.e. UV and/or electron beam radiation. The thermosetting powder coating composition of the invention may be radiation curable.

By "heat- and/or radiation-curable thermosetting powder coating composition" is meant herein a thermosetting powder coating composition, said composition has the ability to cure upon heat- and/or radiation i.e. UV and/or electron beam radiation. The thermosetting powder coating composition of the invention may be heat- and/or radiation curable; preferably the thermosetting powder coating composition of the invention is heat-curable.

The terms amorphous and crystalline used to characterize a resin or a resin composition or a compound or a composition are informal terms used in the art to indicate the predominant character of the relevant resin or resin composition or compound or composition in respect to its degree of crystallinity but these terms are defined more precisely herein by melting enthalpy ($\Delta H_m$) values. The term "crystalline" denotes both crystalline and semicrystalline.

By "amorphous" is meant herein that a resin for example a vinyl functionalized urethane resin or a resin composition or a compound or a composition has a melting enthalpy ($\Delta H_m$) lower than 35 J/g. Preferably the amorphous resin or amorphous resin composition or amorphous compound or amorphous composition, does not have a melting temperature ($T_m$).

By "crystalline" is meant herein that a resin for example a vinyl functionalized urethane resin or a resin composition or a compound or a composition has a melting enthalpy ($\Delta H_m$) of at least 35, more preferably of at least 38, even more preferably of at least 40, most preferably of at least 50, especially of at least 60 J/g.

By "$T_g$" is meant herein the glass transition temperature. The $T_g$ is measured using DSC (Differential Scanning calorimetry) as described herein (see Examples, "DSC Method").

By "$T_c$" is meant herein the crystallization temperature; in case a resin or a resin composition or a compound or a composition has multiple crystallization peaks, then the peak temperature of the crystallization peak with the largest crystallization enthalpy ($\Delta H_c$) is mentioned herein as $T_c$. The $T_c$ is measured using DSC as described herein (see Examples, "DSC Method").

By "$T_m$" is meant herein the melting temperature; in case a resin or a resin composition or a compound or a composition has multiple meltings then the $T_m$ of the melting with the largest melting enthalpy is mentioned herein as $T_m$. The $T_m$ is measured using DSC as described herein (see Examples, "DSC Method").

By "$\Delta H_m$" is meant herein the melting enthalpy. In case a resin or a resin composition or a compound or a composition has more than one melting peaks then the melting enthalpy ($\Delta H_m$) values mentioned herein, refer to the total of the melting enthalpy ($\Delta H_m$) said total obtained by summing up the $\Delta H_m$ values of each of the melting peaks. The ($\Delta H_m$) is measured using DSC as described herein (see Examples, "DSC Method").

By "$\Delta H_c$" is meant herein the crystallization enthalpy. In case a resin or a resin composition or a compound or a composition has more than one crystallization peaks then the crystallization enthalpy ($\Delta H_c$) values mentioned herein, refer to the total of the crystallization enthalpy ($\Delta H_c$) said total obtained by summing up the $\Delta H_c$ values of each of the crystallization peaks. The ($\Delta H_c$) is measured using DSC as described herein (see Examples, "DSC Method").

The glass transition temperature ($T_g$), melting temperature ($T_m$), crystallization temperature ($T_c$), melting enthalpy ($\Delta H_m$) crystallization enthalpy ($\Delta H_c$), measurements of any resin, resin composition, compound or composition in connection with this application are carried out via DSC on a TA instruments DSC Q2000, in $N_2$ atmosphere as described herein (see Examples, "DSC Method").

By "cured thermosetting powder coating composition" is meant herein an object that is derived upon, and/or obtainable by and/or obtained by partial or full curing of a thermosetting powder coating composition; said curing may be effected via heat and/or radiation, preferably via heat; said object may have any shape, size or form and it can for example be a film, coating; preferably the cured thermosetting powder coating composition is a powder coating. For example, by "cured thermosetting powder coating composition C" (or "c-PCC C") is meant herein an object that is derived upon, and/or obtainable by and/or obtained by partial or full curing of a thermosetting powder coating composition C; said curing may be effected via heat and/or radiation, preferably via heat; said object may have any shape, size or form and it can for example be a film, coating; preferably the cured thermosetting powder coating composition C is a powder coating.

By "powder coating" is meant herein a cured thermosetting powder coating composition in the form of a coating. A powder coating is obtainable by and/or obtained by curing a thermosetting powder coating composition; a powder coating is derived upon curing of a thermosetting powder coating composition.

By "article" is meant herein an individual object or item or element of a class designed to serve a purpose or perform a special function and can stand alone. A substrate is an example of an article.

By "di-acid" as used herein means a dicarboxylic acid or anhydride or diester or other derivatives of a dicarboxylic acid such as for examples dicarboxylic acid salts; preferably "di-acid" is a dicarboxylic acid or anhydride, more preferably "di-acid" is a dicarboxylic acid.

By "ethylenic unsaturation" as used herein means cis- or trans-configured reactive carbon-carbon double bond unsaturation and does not include aromatic unsaturation, carbon-carbon triple bond, carbon-heteroatom unsaturation. Preferably, the ethylenic unsaturation comprises at least a hydrogen which is covalently bonded to a carbon of the ethylenic unsaturation.

The term 'di-acid ethylenic unsaturations' as used herein means ethylenic unsaturations obtainable from any isomer of an unsaturated di-acid and/or derivatives thereof, such as for example ethylenic unsaturations obtainable from a di-acid chosen from the group of 2-butenedioic acid, 2-methyl-2-butenedioic acid, itaconic acid and mixtures thereof. Derivatives of any isomer of unsaturated di-acids include esters, anhydrides, acid salts. Fumaric acid and maleic acid are isomers of 2-butenedioic acid, whereas citraconic acid and mesaconic acid are isomers of 2-methyl-2-butenedioic acid. For example "di-acid ethylenic unsaturations" may be obtainable from one or multiple of: fumaric acid, maleic acid, itaconic acid, citraconic, mesaconic acid, derivatives thereof, and mixtures thereof, in any combination. Fumaric acid based unsaturation is an informal term used to denote unsaturation derived from one or multiple of: fumaric acid, its isomers e.g. maleic acid, and derivatives thereof, in any combination.

By "2-butenedioic acid ethylenic unsaturations" as used herein means di-acid ethylenic unsaturations obtainable from one or multiple of: any isomer of 2-butenedioic acid and derivatives thereof, in any combination. Fumaric acid and maleic acid are isomers of 2-butenedioic acid. Maleic acid is the cis-isomer of 2-butenedioic acid, whereas fumaric acid is the trans-isomer of 2-butenedioic acid. Derivatives of any isomer of 2-butenedioic acid include esters, anhydrides, acid salts.

By "unsaturated resin comprising ethylenic unsaturations" (abbreviated herein as UR), is meant herein an unsaturated low molecular weight polymer comprising ethylenic unsaturations. For example an unsaturated polyester resin comprising 2-butenedioic acid ethylenic unsaturations, an acrylated polyester resin, a methacrylated polyester resin, a (meth)acrylated polyester resin, are each an unsaturated resin comprising ethylenic unsaturations.

By "unsaturated resin comprising di-acid ethylenic unsaturations" is meant herein an unsaturated low molecular weight polymer comprising di-acid ethylenic unsaturations; said resin is a sub-class of an unsaturated resin comprising ethylenic unsaturations. For example an unsaturated polyester resin comprising di-acid ethylenic unsaturations is an unsaturated resin comprising di-acid ethylenic unsaturations.

By "unsaturated resin comprising 2-butenedioic acid ethylenic unsaturations" is meant herein an unsaturated low molecular weight polymer comprising 2-butenedioic acid ethylenic unsaturations; said resin is a sub-class of an unsaturated resin comprising di-acid ethylenic unsaturations and thus a further sub-class of an unsaturated resin comprising ethylenic unsaturations. For example an unsaturated polyester resin comprising 2-butenedioic acid ethylenic unsaturations is an unsaturated resin comprising 2-butenedioic acid ethylenic unsaturations.

By "unsaturated polyester resin comprising ethylenic unsaturations" or equally "unsaturated polyester resin having ethylenic unsaturations" is meant herein, an unsaturated low molecular weight polyester comprising ethylenic unsaturations.

By "unsaturated polyester resin comprising di-acid ethylenic unsaturations" or equally "unsaturated polyester resin having di-acid ethylenic unsaturations" is meant herein, an unsaturated low molecular weight polyester comprising di-acid ethylenic unsaturations; said polyester resin is a subclass of an unsaturated polyester resin comprising ethylenic unsaturations.

By "unsaturated polyester resin comprising 2-butenedioic acid ethylenic unsaturations" or equally "unsaturated polyester resin having 2-butenedioic acid ethylenic unsaturations" is meant herein, an unsaturated low molecular weight polyester comprising 2-butenedioic acid ethylenic unsaturations. The "unsaturated polyester resin comprising 2-butenedioic acid ethylenic unsaturations" may for example be prepared from one or multiple of: any isomer of 2-butenedioic acid and derivatives thereof, in any combination. Fumaric acid and maleic acid are isomers of 2-butenedioic acid. Maleic acid is the cis-isomer of 2-butenedioic acid, whereas fumaric acid is the trans-isomer of 2-butenedioic acid. Derivatives of any isomer of 2-butenedioic acid include esters, anhydrides, acid salts. Maleic acid and maleic acid anhydride partly isomerize to fumaric acid when used in the synthesis of a polyester resin comprising 2-butenedioic acid ethylenic unsaturations.

By "unsaturated resins and copolymerizable agent in PCC C" or equally "unsaturated resins and copolymerizable agent of PCC C" is meant herein the total of: i) components A1, B1 and any other unsaturated resin present in PCC C that reads on the disclosure for components A1 and/or B1 presented in this application; and ii) components A2, B2 and any other copolymerizable agent present in PCC C that reads on the disclosure for components A2 and/or B2 presented in this application.

By "total weight of unsaturated resins and copolymerizable agent in PCC C" is meant herein the total amount of components A1, A2, B1, B2 and any other unsaturated resin C that reads on the disclosure for components A1 and/or B1 presented in this application and any other copolymerizable agent present in PCC C. that reads on the disclosure for components A2 and/or B2 presented in this application.

By "the total amount of unsaturated monomer in PCC C" is meant herein the total amount of components A3, B3 and any other unsaturated monomer present in PCC C that reads on the disclosure for components A3 and/or B3 presented in this application.

By "the total amount of thermal radical initiator in PCC C" is meant herein the total amount of A4, components of A4, B4, components of B4 and any other thermal radical initiator present in PCC C that reads on the disclosure for components A4, components of A4, B4, components of B4 presented in this application.

By "the total amount of transition metal substance in PCC C" is meant herein the total amount of components A5, B5 and any other transition metal substance present in PCC C that reads on the disclosure for components A5 and/or B5 presented in this application.

By "the total amount of inhibitor in PCC C" is meant herein the total amount of components A6, B6 and any other inhibitor present in PCC C that reads on the disclosure for components A6 and/or B6 presented in this application.

By "peroxy group" is meant herein the group . . . —O—O— . . . .

By "pa-peroxy group" is meant herein peroxy groups associated to peranhydrides.

By "h-peroxy group" is meant herein peroxy groups associated to hydroperoxides.

By "p-peroxy group" is meant herein peroxy groups associated to peresters.

By "ac-peroxy group" is meant herein peroxy groups associated to alkylperoxy carbonates.

By "A4-1-peroxy group" is meant herein the peroxy groups associated to component A4-1 of PCC A as said component is disclosed herein.

It is to be understood that pa-peroxy, h-peroxy, p-peroxy, ac-peroxy and A4-1 peroxy groups are encompassed by the term peroxy groups, since they (pa-peroxy, h-peroxy, p-peroxy, ac-peroxy and A4-1 peroxy groups) are subclasses of the class of peroxy groups; consequently, each of pa-peroxy, h-peroxy, p-peroxy, ac-peroxy and A4-1 peroxy groups are considered thermally labile groups as well.

By "azo group" is meant herein the group . . . C—N=N—C . . . , wherein C may be primary (one neighbouring C), secondary (two neighbouring C) or tertiary (three neighbouring C).

By "thermally labile group" is meant herein a peroxy group and an azo group.

By "mmol peroxy groups" is meant herein the amount of peroxy groups in mmol.

By "mmol thermally labile groups" is meant herein the amount of thermally labile groups in mmol.

By "thermal radical initiator" is meant herein any organic or inorganic compound that has thermally labile groups. Examples of thermal radical initiators include, but are not limited to azo compounds such as for example azo isobutyronitrile (AIBN), 1,1'-azobis(cyclohexanenitrile), 1,1'-azobis(2,4,4-trimethylpentane), peroxides and mixtures thereof. For clarity, any reference herein to a thermal radical initiator refers to the chemical substance per se and not to mixtures with other chemical substances for example carrier material, as the latter is explained herein. For example when amounts regarding a thermal radical initiator are mentioned herein these amounts are associated to the chemical substance per se and not to its mixture with any carrier material for example water, if they happen to be provided in a mixture form with a carrier material (as carrier material is disclosed herein). For clarity, any reference herein to components A4 and B4 (thermal radical initiators) and their components refers to the thermal radical initiator (chemical substance) per se and not to their mixtures with other chemical substances for example carrier material, as the latter is explained herein. When amounts regarding A4 and B4 or any particular thermal radical initiator are mentioned herein these amounts are associated to the thermal radical initiator per se and not to their mixtures with any carrier material for example water, if they happen to be provided in a mixture form with a carrier material (as carrier material is disclosed herein). The thermal radical initiators present in PCC A and PCC B are preferably mixed with a carrier material; the carrier material can be solid or liquid, for example water; the mixture of a thermal radical initiator with the carrier material (herein mentioned as "TRI-mixture") enhances the safety in handling said thermal radical initiator. Preferably, the amount of the thermal radical initiator in the TRI-mixture can be in the range of 1-99.9% w/w on the TRI-mixture; preferably the amount of the thermal radical initiator is at least 10, more preferably at least 20, even more preferably at least 30, most preferably at least 40, especially at least 50, more especially at least 60, even more especially at least 70, most especially at least 75, for example at least 90, for example at least 95% w/w on the TRI-mixture.

By "transition metal substance" is meant herein: i) a transition metal with atomic number from and including 21 up to and including 79 and ii) a transition metal compound. By "transition metal compound" is meant herein a compound comprising in its chemical structure, one or both of: iia) either a transition metal with atomic number from and including 21 up to and including 79, and iib) a cation of a transition metal with atomic number from and including 21 up to and including 79. In chemistry and physics, the atomic number (also known as the proton number) is the number of protons found in the nucleus of an atom. It is traditionally represented by the symbol Z. The atomic number uniquely identifies a chemical element. In an atom of neutral charge, the atomic number is equal to the number of electrons. Examples of transition metals are Sc, Ti, V, Cr, Mn, Fe, Co, Ni, Cu, Zn, Mo, W. Examples of transition metal compounds are transition metal compounds of Sc, transition metal compounds of Ti, transition metal compounds of V, transition metal compounds of Cr, transition metal compounds of Mn, transition metal compounds of Fe, transition metal compounds of Co, transition metal compounds of Ni, transition metal compounds of Cu, transition metal compounds of Zn, transition metal compounds of Mo, transition metal compounds of W.

By "mmol metal" is meant herein the amount of a transition metal or transition metal cation in a transition metal substance, in mmol.

By "thiol" is meant herein an organosulphur compound that contain a sulfhydryl group bonded to a carbon atom.

By "sulfhydryl group" or equally "thiol group" is meant herein the monovalent group . . . —SH.

By "mmol thiol groups" is meant herein the amount of thiol groups in mmol.

By "aryl" is meant herein any functional group or substituent derived from an aromatic ring, be it phenyl, naphthyl, thienyl, indolyl, etc. A simple aryl group is phenyl, $C_6H_5$; it is derived from benzene. the tolyl group, $CH_3C_6H_4$, is derived from toluene (methylbenzene); the xylyl group, $(CH_3)_2C_6H_3$, is derived from xylene (dimethylbenzene), while the naphthyl group, $C_{10}H_7$, is derived from naphthalene.

By "1,2,3 trihydroxy aryl compound" is meant herein any organic compound according to formula AC:

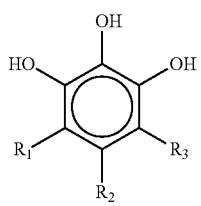

(AC)

wherein any one of $R_1$, $R_2$, $R_3$ can be independently selected from H, alkyl, substituted alkyl, aryl, substituted aryl, OH, $OR_4$, $COOR_5$ wherein any one of $R_4$, $R_5$ can be independently selected from H, alkyl, substituted alkyl, aryl, substituted aryl.

By "acetoacetamide compound" is meant herein any organic compound according to formula AA:

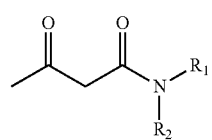

(AA)

wherein any one of $R_1$, $R_2$ can be independently selected from H, alkyl, substituted alkyl, aryl, substituted aryl. Acetoacetamide ($R_1$ and $R_2$ are each H) is an example of an acetoacetamide compound.

By "free amines" is meant herein any primary, secondary, tertiary amine and their corresponding ammonium salts present in a composition without being chemically bonded to any other element or component of the composition.

By "mmol free amine" is meant herein the amount of a free amine in mmol.

By "ratio L" is meant herein:
L=mmol thermally labile groups/mmol free amine, wherein the mmol of thermally labile groups and the mmol free amine each refers to 1 Kg of the total weight of:
wherein the mmol of thermally liable groups and the mmol free amine each refers to 1 Kg of the total weight of:
  A1 and A2 for PCC A (if reference is made to PCC A); or
  B1 and B2 for PCC B (if reference is made to PCC B); or
  unsaturated resins and copolymerizable agent for PCC C (if reference is made to PCC C).

By "photoinitiators" is meant herein any organic or inorganic compound that upon radiation is able to generate free radicals for example via decomposition and initiate radical crosslinking in the thermosetting powder coating composition of the invention; preferably the photoinitiators are able to generate free radicals for example via decomposition, upon being radiated for example in the range of from 300 to 500 nm.

The terms "thermosetting powder coating composition C", "thermosetting powder coating composition of the invention", "two component thermosetting powder coating composition C", "2K thermosetting powder coating composition C", "PCC C" "composition of the invention" are used interchangeably herein.

Certain moieties, species, groups, repeat units, compounds, oligomers, polymers, materials, mixtures, compositions and/or formulations which comprise and/or are used in some or all of the invention as described herein may exist as one or more different forms such as any of those in the following non exhaustive list: stereoisomers [such as enantiomers (e.g. E and/or Z forms), diastereoisomers and/or geometric isomers]; tautomers (e.g. keto and/or enol forms). The invention comprises and/or uses all such forms which are effective as defined herein.

By "$M_n$" is meant herein the theoretical number average molecular weight and it is calculated as shown in the Examples unless stated otherwise. For example, in case $M_n$ refers to the UR, then the "$M_n$" is calculated as disclosed in the Examples; in case $M_n$ refers to the copolymerizable agent such as a VFUR, then the "$M_n$" is calculated as disclosed in the relevant Examples; in case $M_n$ refers to a monomer then "$M_n$" corresponds to molecular weight values calculated on the basis of the molecular formula of said monomer, as such calculation is known to one skilled in the art.

By "WPU" is meant herein the measured weight per ethylenic unsaturation, unless otherwise stated; the WPU is measured using $^1$H-NMR spectroscopy as described in the Examples [see Examples, $^1$H-NMR method for the measurement of the WPU ("$^1$H-NMR Method WPU")].

By "theoretical WPU" or equally "T-WPU" is meant herein the calculated WPU which is being calculated by dividing the weight (g) of a resin produced by the number of moles (mol) of reactive unsaturations for example ethylenic unsaturations, in said resin. The weight (g) of a resin produced is the total weight (g) of the individual monomers added during the synthesis of said resin subtracting the weight (g) of the water or other volatile by-product which is formed during the synthesis of said resin (see Examples, Tables 1 and 2).

By "theoretical functionality" or equally "targeted functionality" or equally "f", is meant the theoretical average number of unreacted functional groups, typically found on the ends of a monomers or resins. Unreacted groups are chemical groups on monomers or resins, which groups are not covalently bonded to another monomer or resin, and thus are available for participation in a desired chemical polymerisation reaction; said unreacted groups are typically known in the art as "end-groups". For example in polyester resins the theoretical functionality is determined by the theoretical number of hydroxyl groups plus the theoretical number of carboxyl groups divided by the total theoretical number of resin chains.

By "viscosity" or equally "n" is meant herein the melt viscosity (in Pa·s) at 160° C. Viscosity measurements were carried out at 160° C., on a Brookfield CAP 2000+H Viscometer. The applied shear-rate was 70 s$^{-1}$ and a 19.05 mm spindle (cone spindle CAP-S-05 (19.05 mm, 1.8°) was used.

By "(N)IR lamp" denotes herein both a near-IR lamp and an IR lamp.

By the term "lower than" is meant herein that the relevant maximum boundary value is not included in the range.

By the term "higher than" is meant herein that the relevant minimum boundary value is not included in the range.

The value "0" (zero) in any one of the ranges mentioned herein regarding amounts of components and/or compounds and/or ingredients of a composition denotes that the relevant component and/or compound and/or ingredient does not need to be present in the relevant composition.

For all upper and lower boundaries of any parameters given herein, the boundary value is included in each range for each parameter. All combinations of minimum and maximum values of the parameters described herein may be used to define the parameter ranges for various embodiments and preferences of the invention.

In the context of the invention unless stated to the contrary, the disclosure of alternative values for the upper or lower limit of the permitted range of a parameter, coupled with an indication that one of said values is more highly preferred than the other, is to be construed as an implied statement that each intermediate value of said parameter, lying in between the more preferred and the less preferred of said alternatives, is itself preferred to said less preferred value and also to each value lying between said less preferred value and said intermediate value.

The term "comprising" as used herein means that the list that immediately follows is non-exhaustive and may or may not include any other additional suitable items, for example one or more further feature(s), component(s) and/or substituent(s) as appropriate. The term "comprising" will be used interchangeably with the term "containing". "Substantially comprising" or "essentially consisting of" as used herein means a component or list of component(s) is present in a given material in an amount greater than or equal to about 90% w/w, preferably greater than or equal to 95% w/w, more preferably greater than or equal to 98% w/w, even more preferably greater than or equal to 99% w/w of the total amount of the given material. The term "consisting of" as used herein mean that the list that follows is exhaustive and does not include additional items.

It will be understood that the total sum of any quantities expressed herein as percentages cannot (allowing for rounding errors) exceed 100%. For example the sum of all components of which the composition of the invention (or part(s) thereof) comprises may, when expressed as a weight (or other) percentage of the composition (or the same part(s) thereof), total 100% allowing for rounding errors. However where a list of components is non-exhaustive the sum of the percentage for each of such components may be less than 100% to allow a certain percentage for additional amount(s) of any additional component(s) that may not be explicitly described herein.

Unless the context clearly indicates otherwise, as used herein plural forms of the terms herein (for example composition, component, resin, polymer, minute) are to be construed as including the singular form and vice versa.

2. THERMOSETTING POWDER COATING COMPOSITION C (PCC C)

The thermosetting powder coating composition C (PCC C) are as described in the entire application and as claimed herein.

The thermosetting powder coating composition C (PCC C) comprises a physical mixture of two different, separate and distinct thermosetting powder coating compositions A (PCC A) and B (PCC B), as PCC C is described herein and as defined by the claims.

The thermosetting powder coating compositions C(PCC C) are two component thermosetting powder coating compositions.

Preferably, PCC C does not comprise an unsaturated monomer.

Preferably, PCC A does not comprise an unsaturated monomer.

Preferably, PCC B does not comprise an unsaturated monomer.

Preferably, each of PCC A and PCC B and PCC C does not comprise an unsaturated monomer.

Preferably R is at least 0.02, even more preferably at least 0.05, most preferably at least 0.1, especially at least 0.2, more especially at least 0.3, most especially at least 0.4, for example at least 0.5, for example at least 0.6, for example at least 0.7, for example at least 0.8, for example at least 0.9, for example at least 0.95, for example at least 0.98, for example at least 0.99. Preferably R is at most 99, more preferably at most 90, even more preferably at most 80, most preferably at most 70, especially at most 60, more especially at most 50, most especially at most 40, for example at most 30, for example at most 20, for example at most 15, for example at most 12, for example at most 10, for example at most 9, for example at most 8, for example at most 7.5, for example at most 7, for example at most 6.5, for example at most 6, for example at most 5.5, for example at most 5, for example at most 4.5, for example at most 4, for example at most 3.5, for example at most 3, for example at most 2.5, for example at most 2, for example at most 1.5, for example at most 1.4, for example at most 1.3, for example at most 1.2, for example at most 1.1, for example at most 1.05, for example at most 1.02, for example at most 1.01.

Preferably, in the composition of the invention R is at least 0.1 and at most 9.

Preferably, in the composition of the invention R is at least 0.2 and at most 4.

Preferably, in the composition of the invention R is at least 0.5 and at most 2.

Preferably, R is at least 0.1 and at most 10.
Preferably, R is at least 0.1 and at most 9.
Preferably, R is at least 0.3 and at most 3.
Preferably, R is at least 0.1 and at most 3.
Preferably, R is at least 0.1 and at most 4.
Preferably, R is at least 0.2 and at most 4.
Preferably, R is at least 0.4 and at most 5.
Preferably, R is at least 0.5 and at most 2.
Preferably, R is at least 0.7 and at most 1.5.
Preferably, R is at least 0.9 and at most 1.1.
Preferably, R is equal to 1.

PCC C may further comprise thermosetting powder coating compositions other than PCC A and PCC B; preferably PCC C essentially consists of PCC A and PCC B; most preferably PCC C consists of PCC A and PCC B.

The total weight of the mixture of PCC A and PCC B in PCC C is at least 10, preferably at least 15, more preferably at least 20, even more preferably at least 25, most preferably at least 30, especially at least 35, more especially at least 40, most especially at least 45, for example at least 50, for example at least 55, for example at least 60, for example at least 65, for example at least 70, for example at least 75, for example at least 80, for example at least 85, for example at least 90, for example at least 95, for example at least 97, for example at least 98, for example at least 99, for example at least 99.5, for example at least 99.9% w/w based on the total weight of PCC C.

The total weight of A1 and A2 in PCC A, is at least 10, preferably at least 15, more preferably at least 18, even more preferably at least 20, most preferably at least 22, especially at least 25, more especially at least 28, most especially at least 30, for example at least 35, for example at least 40, for example at least 45, for example at least 50, for example at least 55, for example at least 60, for example at least 65, for example at least 70, for example at least 80, for example at least 85, for example at least 90, for example at least 95, for example at least 97, for example at least 98, for example at least 99% w/w based on the total weight of PCC A.

The total of weight B1 and B2 in PCC B, is at least 10, preferably at least 15, more preferably at least 18, even more preferably at least 20, most preferably at least 22, especially at least 25, more especially at least 28, most especially at least 30, for example at least 35, for example at least 40, for example at least 45, for example at least 50, for example at least 55, for example at least 60, for example at least 65, for example at least 70, for example at least 80, for example at least 85, for example at least 90, for example at least 95, for example at least 97, for example at least 98, for example at least 99% w/w based on the total weight of PCC B.

The total amount of unsaturated monomer in PCC C ranges from 0 up to 0.9% w/w based on the total weight of PCC C; preferably, the total amount of unsaturated monomer in PCC C ranges from 0 up to 0.8, more preferably from 0-0.7, most preferably from 0-0.6, especially from 0-0.5, more especially from 0-0.4, most especially from 0-0.3, for example from 0-0.2, for example from 0-0.1, for example from 0-0.05, for example from 0-0.02% w/w based on the total weight of PCC C, for example PCC C does not comprise an unsaturated monomer. Preferably, PCC C comprises a unsaturated monomer in an amount of at most 0.9, preferably of at most 0.8, more preferably of at most 0.7, most preferably of at most 0.6, especially of at most 0.5, more especially of at most 0.4, most especially of at most 0.3, for example of at most 0.2, for example of at most 0.1, for example of at most 0.05, for example of at most 0.02% w/w based on the total weight of PCC C.

The total amount of thermal radical initiator in PCC C is at least 22 and at most 500 mmol thermally labile groups/kg of total weight of unsaturated resins and copolymerizable agent in PCC C. Preferably, the total amount of thermal radical initiator in PCC C is at least 24, more preferably at least 25, most preferably at least 26, especially at least 28, more especially at least 30, most especially at least 32 mmol thermally labile groups/Kg of total weight of unsaturated resins and copolymerizable agent in PCC C. Preferably, the total amount of thermal radical initiator in PCC C is at most 450, more preferably at most 400, most preferably at most 350, especially at most 300, more especially at most 250, most especially at most 200, for example at most 180, for example at most 170, for example at most 160 mmol thermally labile groups/Kg of total weight of unsaturated resins and copolymerizable agent in PCC C.

The total amount of transition metal substance in PCC C is preferably at least 0.25 and at most 50 mmol metal/Kg of total weight of unsaturated resins and copolymerizable agent in PCC C; more preferably, the total amount of transition metal substance in PCC C is at least 0.5, even more preferably at least 1, most preferably at least 1.5, especially at least 2, more especially at least 2.2, most especially at least 2.4 mmol metal groups/Kg of total weight of unsaturated resins and copolymerizable agent in PCC C. Preferably, the total amount of transition metal substance in PCC C is at most 50, more preferably at most 45, even more preferably at most 40, most preferably at most 35, especially at most 30, more especially at most 29, even more especially at most 28, most especially at most 27, for example at most 26, for example at most 25 mmol metal groups/Kg of total weight of unsaturated resins and copolymerizable agent in PCC C.

The total amount of inhibitor in PCC C is preferably at least 13 and at most 5000 mg inhibitor/Kg of total weight of unsaturated resins and copolymerizable agent in PCC C. The total amount of inhibitor in PCC C is preferably at least 14, more preferably at least 15, even more preferably at least 16, most preferably at least 17, especially at least 18, more especially at least 19, even more especially at least 20, most especially at least 22, more preferably at least 25, most preferably at least 30, especially at least 40, more especially at least 60, most especially at least 80, for example at least 100, for example at least 110, for example at least 120, for example at least 130, for example at least 135, for example at least 140, for example at least 150, for example at least 160, for example at least 170, for example at least 180, for example at least 190, for example at least 200, for example at least 210, for example at least 220 mg inhibitor/Kg of total weight of unsaturated resins and copolymerizable agent in PCC C. Preferably, the total amount of inhibitor in PCC C is at most 4500, more preferably at most 4000, most preferably at most 3500, especially at most 3000, more especially at most 2900, most especially at most 2800, for example at most 2800, for example at most 2700, for example at most 2600, for example at most 2500, for example at most 2400, for example at most 2300, for example at most 2200, for example at most 2100, for example at most 2000, for example at most 1800 for example at most 1700 for example at most 1600, for example at most 1400 for example at most 1200 for example at most 1000 mg inhibitor/Kg of total weight of unsaturated resins and copolymerizable agent in PCC C.

Unless otherwise stated, any and all elements, preferred elements, embodiments, features or preferred combination of features or preferred combination of ranges disclosed in this application with respect to: i) PCC A, ii) processes in connection with PCC A, iii) uses in connection with PCC A, can be combined with each other.

Unless otherwise stated, any and all elements, preferred elements, embodiments, features or preferred combination of features or preferred combination of ranges disclosed in this application with respect to: i) PCC B, ii) processes in connection with PCC B, iii) uses in connection with PCC B, can be combined with each other.

Any PCC A as disclosed in this application and any PCC B as disclosed in this application can be combined with each other.

Any process and any use in connection with any PCC A, as disclosed in this application and any process and any use in connection with any PCC B, as disclosed in this application, can be combined with each other.

Unless otherwise stated, any and all elements, preferred elements, embodiments, features or preferred combination of features or preferred combination of ranges disclosed in this application with respect to: i) PCC C, ii) processes in connection with PCC C, iii) uses in connection with PCC C, iv) cured PCC C, v) articles in connection with PCC C, can be combined with each other.

Any PCC A as disclosed in this application and any PCC B as disclosed in this application and any PCC C as disclosed in this application can be combined with each other.

Any process and any use in connection with any PCC A, as disclosed in this application and any process and any use in connection with any PCC B, as disclosed in this application, and any process and any use in connection with any PCC C, can be combined with each other.

2.1 Process for Making the PCC C

In another aspect, the invention provides for a process for making the thermosetting powder coating composition C comprising the steps of:
  a. providing a thermosetting powder coating composition A (PPC A) as disclosed herein and a separate, distinct thermosetting powder coating composition B (PPC B) as disclosed herein; and
  b. physically mixing PCC A with PCC B in a weight ratio R=weight PCC A1 weight PCC B, that is at least 0.01 and at most 99, to obtain the PCC C.

Each of PCC A and PCC B are prepared separately from each other and each of them may be prepared as explained herein.

PCC A may be prepared by mixing the separately weighed-out components in a premixer, heat the obtained premix, for example in a kneader, preferably in an extruder to obtain an extrudate, cool down the obtained extrudate until it solidifies and grind it into granules or flakes that are further ground to reduce the particle size followed by appropriate classification to obtain a powder coating composition of the desired particle size.

Alternatively, PCC A may be prepared by mixing the separately weighed-out component A2 with component A1 in a premixer, heat the obtained premix, for example in a kneader, preferably in an extruder to obtain an extrudate, cool down the obtained extrudate until it solidifies and grind it into granules or flakes that are further ground to reduce the particle size. Subsequently, mixing the rest of the separately weighed-out components and the extrudate of A1 with A2, in a premixer, heat the obtained premix, for example in a kneader, preferably in an extruder to obtain an extrudate, cool down the obtained extrudate until it solidifies and grind it into granules or flakes that are further ground to reduce the particle size followed by appropriate classification to obtain a powder coating composition of the desired particle size.

Preferably, PCC A is prepared by a process comprising the steps of:
  a. mixing the components of the thermosetting powder coating composition according to the invention to obtain a premix;
  b. heating the premix, preferably in an extruder, to obtain an extrudate;
  c. cooling down the extrudate to obtain a solidified extrudate; and
  d. grinding the solidified extrudate into smaller particles and subsequently sieving these particles to obtain the thermosetting powder coating composition.

Preferably, the premix is heated to a temperature at least 5, more preferably at least 10, even more preferably at least 20, most preferably at least 30° C. below the temperature at which it is intended to cure the powder coating composition. If the premix is heated in an extruder, it is preferred to use a temperature control in order to avoid too high temperatures that could lead to curing of the composition of the invention in the extruder.

Preferably, PCC A is prepared by a process comprising the steps of:
  a. mixing the copolymerizable resin with the UR to obtain a premix 1;
  b. heating the premix 1, preferably in an extruder, to obtain an extrudate of copolymerizable resin with the UR, namely extrudate 1;
  c. cooling down the extrudate 1 to obtain a solidified extrudate 1; and
  d. grinding the solidified extrudate 1 into smaller particles to obtain a mixture of copolymerizable resin with the UR, namely mixture 1; and
  e. mixing the rest of the components of the thermosetting powder coating composition of the invention with the mixture 1, to obtain a premix 2;
  f. heating the premix 2, preferably in an extruder, to obtain an extrudate 2;
  g. cooling down the extrudate 2 to obtain a solidified extrudate 2; and
  h. grinding the solidified extrudate 2 into smaller particles and subsequently sieving these particles to obtain the thermosetting powder coating composition.

Preferably, one or both of the premix 1 and premix 2, is/are heated preferably to a temperature at least 5, more preferably at least 10, even more preferably at least 20, most preferably at least 30° C. below the temperature at which it is intended to cure the thermosetting powder coating composition. If one or both of the premix 1 and 2, is/are heated in an extruder, it is preferred to use a temperature control in order to avoid too high temperatures that could lead to curing of the thermosetting powder coating composition of the invention in the extruder.

PCC B may be prepared in analogous ways as those explained herein for the preparation of the PCC A.

Once separately prepared, PCC A and PCC B are physically mixed together in a weight ratio R that is at least 0.01 and at most 99, in order to obtain PCC C. Preferably R is at least 0.02, even more preferably at least 0.05, most preferably at least 0.1, especially at least 0.2, more especially at least 0.3, most especially at least 0.4, for example at least 0.5, for example at least 0.6, for example at least 0.7, for example at least 0.8, for example at least 0.9, for example at least 0.95, for example at least 0.98, for example at least 0.99. Preferably R is at most 99, more preferably at most 90, even more preferably at most 80, most preferably at most 70, especially at most 60, more especially at most 50, most especially at most 40, for example at most 30, for example at most 20, for example at most 15, for example at most 12, for example at most 10, for example at most 9, for example at most 8, for example at most 7.5, for example at most 7, for example at most 6.5, for example at most 6, for example at most 5.5, for example at most 5, for example at most 4.5, for example at most 4, for example at most 3.5, for example at most 3, for example at most 2.5, for example at most 2, for example at most 1.5, for example at most 1.4, for example at most 1.3, for example at most 1.2, for example at most 1.1, for example at most 1.05, for example at most 1.02, for example at most 1.01.

Preferably, in the composition of the invention R is at least 0.1 and at most 9.

Preferably, in the composition of the invention R is at least 0.2 and at most 4.

Preferably, in the composition of the invention R is at least 0.5 and at most 2.

Preferably, R is at least 0.1 and at most 10.
Preferably, R is at least 0.1 and at most 9.
Preferably, R is at least 0.3 and at most 3.
Preferably, R is at least 0.1 and at most 3.
Preferably, R is at least 0.1 and at most 4.
Preferably, R is at least 0.2 and at most 4.
Preferably, R is at least 0.4 and at most 5.
Preferably, R is at least 0.5 and at most 2.
Preferably, R is at least 0.7 and at most 1.5.
Preferably, R is at least 0.9 and at most 1.1.
Preferably, R is equal to 1.

The thermosetting powder coating composition of the invention can be cured via heat (heat-curable thermosetting powder coating composition) and/or radiation (radiation curable thermosetting powder coating composition). Preferably, the thermosetting powder coating composition of the invention is heat-curable without being necessary to use radiation for curing. Heat curing has the advantage that it does not require the use of additional and rather expensive equipment, for instance equipment that generates UV light or accelerated electrons and in only one step involving heating of the thermosetting powder coating composition the latter is melted and cured onto a substrate. In contrast to that, a thermosetting powder coating composition that requires radiation curing, the curing of said composition requires two steps, one to melt (heating step) and one to cure (radiation cure typically induced via UV light or electron beam irradiation) the composition. Heat curing is especially desirable for coating 3D objects.

2.2 Process for Curing the PCC C and Object Obtainable by and/or Obtained by Said Process The thermosetting powder coating composition of the invention is a heat- and/or radiation-curable thermosetting powder coating composition; preferably the thermosetting powder coating composition of the invention is heat-curable, more preferably the thermosetting powder coating composition of the invention is heat-curable at low temperatures. The invention relates also to a process for curing the thermosetting powder coating composition of the invention comprising the steps of:
 a. providing the thermosetting powder coating composition of the invention; and
 b. heating and/or radiating the thermosetting powder coating composition of the invention to partially or fully cure it.

Preferably, the invention provides for a process for curing the thermosetting powder coating composition of the invention, comprising the steps of:
 a. providing the thermosetting powder coating composition of the invention; and
 b. heating the thermosetting powder coating composition of the invention to partially or fully cure it.

The invention also relates to an object obtainable by and/or obtained by the aforementioned processes for curing the thermosetting powder coating composition of the invention; said object is the cured thermosetting powder coating composition of the invention and said cured thermosetting powder coating composition of the invention is preferably a powder coating.

In case of radiating the thermosetting powder coating composition of the invention in order to cure it, one skilled in the art can easily determine the time and radiation dosage to effect curing of the thermosetting powder composition of the invention; thus the radiation of the thermosetting powder coating composition of the invention can be carried out at a radiation dosage and for a time suitable to cure the thermosetting powder coating composition of the invention.

In case of heating the thermosetting powder coating composition of the invention in order to cure it, the heating of the thermosetting powder coating composition of the invention can be carried out at a temperature and for a time suitable to cure the thermosetting powder coating composition of the invention.

Heating of the thermosetting powder coating composition of the invention may be done using conventional methods, such as with a convection oven and/or with an (N)IR lamp and/or infrared laser and/or microwave equipment may be used to heat the thermosetting powder coating composition of the invention.

The temperature, at which the thermosetting powder coating compositions of the invention are cured, is preferably in the range of 80 to 225° C., more preferably in the range 80 to 150° C., even more preferably from 80 to 14000 most preferably from 80 to 130° C., especially from 90 to 130° C., more especially from 100 to 130° C. Preferably, the temperature at which the thermosetting powder coating compositions of the invention are cured, is preferably at most 160, more preferably at most 150, even more preferably at most 140, most preferably at most 130, most preferably at most 120, especially at most 110, more especially at most 100° C. Preferably, the temperature at which the thermosetting powder coating compositions of the invention are cured, is preferably at least 60, more preferably at least 70, even more preferably at least 75, most preferably at least 80, most preferably at least 85, especially at least 90, more especially at least 100° C.

The curing time of the thermosetting powder coating compositions of the invention is at most 60, more preferably is at most 45, even more preferably is at most 30, most preferably is at most 20, especially is at most 10, more especially is at most 5, most especially is at most 3, for example is at most 1 minutes.

Preferably the thermosetting powder coating compositions of the invention are heat-cured at a temperature in the range of 80-150° C. for a time in the range of 1-30, more preferably in the range of 5-30 minutes.

Any and all elements, preferred elements, embodiments, features or preferred combination of features or preferred combination of ranges disclosed in this paragraph with respect to the process for curing the compositions of the invention and curing conditions e.g. radiation dosage, radiation time, temperature for the heat curing and time for the heat curing can be combined with each other.

2.3 Process for Coating an Article with the PCC C and Process for Coating and Curing an Article Having the PCC C Coated and Cured Thereon The composition of the invention may be applied onto an article using the techniques known to the person skilled in the art, for example using electrostatic spray or electrostatic fluidized bed or flame spray. The invention relates also to a process for making an article having coated thereon the thermosetting powder coating composition of the invention, comprising the step of applying the thermosetting powder coating composition of the invention to an article to obtain the article having coated thereon the thermosetting powder coating composition of the invention.

The invention further relates to a process for making an article having coated and cured thereon the thermosetting powder coating composition of the invention, comprising the steps of:

a. applying the thermosetting powder coating composition of the invention to an article; and
b. heating and/or radiating the thermosetting powder coating composition of the invention for enough time and at a suitable temperature to cure the thermosetting powder coating composition of the invention to obtain the article having coated and cured thereon a thermosetting powder coating composition of the invention.

Heating of the coated substrate may be done using conventional methods, such as with a convection oven and/or with an (N)IR lamp. Even microwave equipment may be used to heat the substrate.

Any and all elements, preferred elements, embodiments, features or preferred combination of features or preferred combination of ranges presented in paragraph § 2.2, with respect to the process for curing the compositions of the invention and curing conditions e.g. radiation dosage, radiation time, temperature for the heat curing and time for the heat curing are equally applicable for the process for making an article having coated and cured thereon the thermosetting powder coating composition of the invention. Equally, any and all elements, preferred elements, embodiments, features or preferred combination of features or preferred combination of ranges disclosed in § 2.2 may be combined with each other when applied for the process for making an article having coated and cured thereon the thermosetting powder coating composition of the invention.

3. COMPONENT A1 OF PCC A AND COMPONENT 131 OF PCC B

Unsaturated Resins Comprising Ethylenic Unsaturations

Unless otherwise stated, the disclosure of unsaturated resins comprising ethylenic unsaturations presented herein applies equally for component A1 of PCC A and for component B1 of PCC B. Component A1 and component B1 may have the same or different unsaturated resins comprising ethylenic unsaturations and may have the same or different amounts of said resins, as said resins and their amounts are disclosed herein.

The unsaturated resins comprising ethylenic unsaturations may be linear or branched. Linear UR have a theoretical (targeted) functionality (f) equal to 2, whilst branched UR have a theoretical (targeted) functionality (f) higher than 2.

When the UR is branched, then the UR's theoretical functionality (f) is preferably at least 2.01, more preferably at least 2.05, even more preferably at least 2.10, most preferably at least 2.12, especially at least 2.15, more especially at least 2.20, even more especially at least 2.30, most especially at least 2.35, for example at least 2.40. When the UR is branched, then the theoretical functionality (f) is preferably at most 10, more preferably at most 9, even more preferably at most 8, most preferably at most 7, especially at most 6, more especially at most 5, even more especially at most 5.50, most especially at most 5, for example at most 4.50, for example at most 4, for example at most 3.80, for example at most 3.50. When the UR is branched, then the UR's theoretical functionality (f) is at least 2.01 and at most 4.5, more preferably is at least 2.01 and at most 4, even more preferably is at least 2.01 and at most 3.5, most preferably is at least 2.01 and at most 3.

Preferably, the UR has a theoretical functionality (f) of at least 2 and at most 4.5.

Preferably, when the UR is amorphous then said UR has a theoretical functionality (f) of at least 2 and at most 5.

Preferably, when the UR is crystalline then said UR has a theoretical functionality (f) of at least 2 and at most 3.

The preferences for the theoretical functionality (f) of the UR apply equally to any one of the unsaturated resins encompassed by the definition of UR and these preferences can be combined with any one of the preferred elements and embodiments presented herein for the UR and/or for any one of the resins encompassed by the definition of the UR.

Preferably, the ethylenic unsaturations of the unsaturated resin comprising ethylenic unsaturations are di-acid ethylenic unsaturations.

Preferably, the ethylenic unsaturations of the unsaturated resin comprising ethylenic unsaturations are 2-butenedioic acid ethylenic unsaturations.

Preferably, the unsaturated resin comprising ethylenic unsaturations is an unsaturated polyester resin comprising 2-butenedioic acid ethylenic unsaturations.

Preferably, the unsaturated resin comprising ethylenic unsaturations is selected from the group consisting of polyester resins, acrylic resins, polyurethanes, epoxy resins, polyamides, polyesteramides, polycarbonates, polyureas and mixtures thereof.

The amount of the unsaturated resin comprising ethylenic unsaturations (UR) in PCC A is preferably at least 40, more preferably at least 50, most preferably at least 55, most preferably at least 60, especially at least 65, more especially at least 69, most especially at least 70, for example at least 71, for example at least 72% w/w on total amount of A1 and A2. The amount of the unsaturated resin comprising ethylenic unsaturations in PCC A is preferably at most 99, more preferably at most 95, most preferably at most 90, most preferably at most 88, especially at most 86, more especially at most 84, most especially at most 82, for example at most 81, for example at most 80% w/w on total amount of A1 and A2. Preferably the amount of the unsaturated resin comprising ethylenic unsaturations in PCC A ranges from 69 to 91% w/w on total amount of A1 and A2.

The amount of the unsaturated resin comprising ethylenic unsaturations (UR) in PCC B is preferably at least 40, more preferably at least 50, most preferably at least 55, most preferably at least 60, especially at least 65, more especially at least 69, most especially at least 70, for example at least 71, for example at least 72% w/w on total amount of B1 and B2. The amount of the unsaturated resin comprising ethylenic unsaturations in PCC B is preferably at most 99, more preferably at most 95, most preferably at most 90, most preferably at most 88, especially at most 86, more especially at most 84, most especially at most 82, for example at most 81, for example at most 80% w/w on total amount of B1 and B2. Preferably the amount of the unsaturated resin comprising ethylenic unsaturations in PCC B ranges from 69 to 91% w/w on total amount of B1 and B2.

Preferably, the unsaturated resin comprising ethylenic unsaturations (UR) has a $M_n$ of at least 800, more preferably of at least 1000, even more preferably of at least 1500, most preferably of at least 1800, especially of at least 2000, more especially of at least 2300 Da. Preferably, the unsaturated resin comprising ethylenic unsaturations (UR) has a $M_n$ of at most 20000, more preferably of at most 10000, even more preferably of at most 9000, most preferably of at most 8000, especially of at most 7000, more especially of at most 6000, most especially of at most 5000 Da. Preferably, the unsaturated resin comprising ethylenic unsaturations (UR) has a $M_n$ of at least 2000 and of at most 8000 Da.

Preferably, the unsaturated resin comprising ethylenic unsaturations (UR) has a T-WPU of at least 250, more preferably of at least 300, even more preferably of at least 350, most preferably of at least 400, most preferably of at least 450, especially of at least 500 g/mol. Preferably, the unsaturated resin comprising ethylenic unsaturations (UR) has a T-WPU of at most 2000, more preferably of at most 1500, even more preferably of at most 1300, most preferably of at most 1200, especially of at most 1100, more especially of at most 1000, most especially of at most 900, for example of at most 850, for example of at most 800 g/mol. Preferably the T-WPU of the unsaturated resin comprising ethylenic unsaturations ranges from 450 to 1200 g/mol.

Preferably, the unsaturated resin comprising ethylenic unsaturations (UR) has a WPU of at least 250, more preferably of at least 300, even more preferably of at least 350, most preferably of at least 400, most preferably of at least 450, especially of at least 500 g/mol. The unsaturated resin comprising ethylenic unsaturations has a WPU of at most 2200, more preferably of at most 1650, even more preferably of at most 1450, most preferably of at most 1350, especially of at most 1100, more especially of at most 1000, most especially of at most 950, for example of at most 900 g/mol. Preferably the WPU of the the unsaturated resin comprising ethylenic unsaturations ranges from 450 to 1350 g/mol.

In case in which the unsaturated resin comprising ethylenic unsaturations has also acid functional groups e.g. carboxyl groups, then the acid value (AV) of the unsaturated resin comprising ethylenic unsaturations is preferably at most 250, more preferably at most 200, even more preferably at most 150, most preferably at most 100, especially at most 90, more especially at most 80, most especially at most 70, for example at most 65, for example at most 60, for example at most 50, for example at most 40, for example at most 30, for example at most 20, for example at most 10, for example at most 7, for example at most 5, for example at most 4 mgKOH/g unsaturated resin comprising ethylenic unsaturations. In case in which the unsaturated resin comprising ethylenic unsaturations has also acid functional groups e.g. carboxyl groups, then the acid value (AV) of the unsaturated resin comprising ethylenic unsaturations is preferably at least 0, more preferably at least 0.001, even more preferably at least 0.01, most preferably at least 0.1, especially at least 0.5, more especially at least 1, most especially at least 2, for example at least 2.5, for example at least 3, for example at least 4, for example at least 5 for example at least 10, for example at least 15 mg KOH/g unsaturated resin comprising ethylenic unsaturations. Preferably the acid value (AV) of the unsaturated resin comprising ethylenic unsaturations ranges from 0.1 to 60, more preferably ranges from 0.1 to 50, even more preferably ranges from 0.1 to 10 mg KOH/g unsaturated resin comprising ethylenic unsaturations.

In case in which the unsaturated resin comprising ethylenic unsaturations has also hydroxyl groups, then the hydroxyl value (OHV) of the unsaturated resin comprising ethylenic unsaturations is preferably at most 250, more preferably at most 200, even more preferably at most 150, most preferably at most 100, especially at most 90, more especially at most 80, most especially at most 70, for example at most 65, for example at most 60, for example at most 50 mg KOH/g unsaturated resin comprising ethylenic unsaturations. The hydroxyl value (OHV) of the unsaturated resin comprising ethylenic unsaturations is preferably at least 0.1, more preferably at least 0.5, even more preferably at least 1, most preferably at least 2, especially at least 2.5, more especially at least 3, most especially at least 4, for example at least 5, for example at least 8, for example at least 10, for example at least 15 mg KOH/g unsaturated resin comprising ethylenic unsaturations. Preferably the hydroxyl value (OHV) of the unsaturated resin comprising ethylenic unsaturations is from 0.1 to 70, more preferably from 10 to 70, even more preferably from 12 to 60 mg KOH/g unsaturated resin comprising ethylenic unsaturations. The unsaturated resin comprising ethylenic unsaturations may be amorphous or crystalline.

In case in which the unsaturated resin comprising ethylenic unsaturations is amorphous, said resin has preferably a $M_n$ of at least 800, more preferably of at least 1000, even more preferably of at least 1500, most preferably of at least 1800, especially of at least 2000 Da. In case in which the unsaturated resin comprising ethylenic unsaturations is amorphous, said resin has preferably a $M_n$ of at most 20000, more preferably of at most 10000, even more preferably of at most 9000, most preferably of at most 8000, especially of at most 7000, more especially of at most 6000, most especially of at most 5000, for example of at most 4500 Da. Preferably, in case in which the the unsaturated resin comprising ethylenic unsaturations is amorphous, said resin has preferably a $M_n$ of at least 2000 and of at most 8000 Da, more preferably of at least 2000 and of at most 5000 Da.

In case in which the unsaturated resin comprising ethylenic unsaturations is amorphous, said resin has preferably a T-WPU of at least 250, more preferably at least 350, for example at least 400, for example at least 450, for example at least 500 g/mol. In case in which the unsaturated resin comprising ethylenic unsaturations is amorphous, said resin has preferably a T-WPU of at most 2000, more preferably of at most 1500, even more preferably of at most 1300, most preferably of at most 1200, especially of at most 1100, more especially of at most 1000, most especially of at most 900, for example of at most 850, for example of at most 800 g/mol. Preferably the T-WPU of an amorphous unsaturated resin comprising ethylenic unsaturations ranges from 450 to 1200 g/mol.

In case in which the unsaturated resin comprising ethylenic unsaturations is amorphous, said resin has preferably a WPU of at least 250, more preferably at least 350, for example at least 400, for example at least 450, for example at least 500 g/mol. In case in which the unsaturated resin comprising ethylenic unsaturations is amorphous, said resin has preferably a WPU of at most 2200, more preferably of at most 1650, even more preferably of at most 1450, most preferably of at most 1350, especially of at most 1100, more especially of at most 1000, most especially of at most 950, for example of at most 900 g/mol. Preferably the WPU of the amorphous unsaturated resin comprising ethylenic unsaturations ranges from 450 to 1350 g/mol.

In case in which the unsaturated resin comprising ethylenic unsaturations is amorphous, said resin has preferably a glass transition temperature ($T_g$) of at least 20, more preferably of at least 25, even more preferably of at least 30, most preferably of at least 40, especially of at least 45, more especially of at least 50. In case in which the unsaturated resin comprising ethylenic unsaturations is amorphous, said resin has preferably a glass transition temperature ($T_g$) of at most 120, more preferably of at most 110, even more preferably of at most 100, most preferably of at most 90, especially of at most 80, more especially of at most 75, most especially of at most 70, for example of at most 65, for example of at most 60° C. Preferably, the amorphous unsaturated resin comprising ethylenic unsaturations has a glass transition temperature ($T_g$) of at least 20 and of at most 70° C., more preferably of at least 20 and of at most 65° C., most preferably of at least 40 and of at most 70° C., especially of at least 40 and of at most 65° C.

In case in which the unsaturated resin comprising ethylenic unsaturations is amorphous, said resin has preferably a viscosity of at least 1, more preferably of at least 2, even more preferably of at least 5, most preferably of at least 10, especially of at least 15 Pa·s. In case in which the unsaturated resin comprising ethylenic unsaturations is amorphous, said resin has preferably a viscosity of at most 400, more preferably of at most 300, even more preferably of at most 200, most preferably of at most 150, especially of at most 100, more especially of at most 80, most especially of at most 50 Pa·s. In case in which the unsaturated resin comprising ethylenic unsaturations is amorphous, said resin has preferably a viscosity in the range of from 2 to 80 Pa·s.

In case in which the unsaturated resin comprising ethylenic unsaturations is crystalline, said resin has preferably a $M_n$ of at least 800, more preferably of at least 1000, even more preferably of at least 1500, most preferably of at least 1800, especially of at least 2000, more especially of at least 2300 Da. In case in which the unsaturated resin comprising ethylenic unsaturations is crystalline, said resin has preferably a $M_n$ of at most 20000, more preferably of at most 10000, even more preferably of at most 9000, most preferably of at most 8000, especially of at most 7000 Da. In case in which the unsaturated resin comprising ethylenic unsaturations is crystalline, said resin has preferably a $M_n$ of at least 2000 and of at most 8000 Da, more preferably of at least 2300 and of at most 8000 Da.

In case in which the unsaturated resin comprising ethylenic unsaturations is crystalline, said resin has preferably a T-WPU of at least 250, more preferably at least 350, for example at least 400, for example at least 450, for example at least 500 g/mol. In case in which the unsaturated resin comprising ethylenic unsaturations is crystalline, said resin has preferably a T-WPU of at most 2800, more preferably at most 2500, even more preferably at most 2000, most preferably at most 1600, especially at most 1400, more especially at most 1200, even more especially at most 1100, most especially at most 1000, for example at most 980, for example at most 950 g/mol.

In case in which the unsaturated resin comprising ethylenic unsaturations is crystalline, said resin has preferably a WPU of at least 250, more preferably at least 350, for example at least 400, for example at least 450, for example at least 500 g/mol. In case in which the unsaturated resin comprising ethylenic unsaturations is crystalline, said resin has preferably a WPU of at most 3000, more preferably of at most 2900, even more preferably of at most 2600, most preferably of at most 2000, especially of at most 1800, more especially of at most 1600, most especially of at most 1400, for example of at most 1350, for example of at most 1200, for example of at most 1100 g/mol. Preferably the WPU of the crystalline unsaturated resin comprising ethylenic unsaturations ranges from 450 to 3000, more preferably from 450 to 2600 g/mol.

In case in which the unsaturated resin comprising ethylenic unsaturations is crystalline, said resin has preferably a glass transition temperature ($T_g$) of at least −70, more preferably of at least −50, even more preferably of at least −40, even more preferably of at least −35, most preferably of at least −20, especially of at least −10, more especially of at least 0, even more especially of at least 10, most especially of at least 20° C. In case in which the unsaturated resin comprising ethylenic unsaturations is crystalline, said resin has preferably a glass transition temperature ($T_g$) of at most 120, more preferably of at most 110, even more preferably of at most 100, most preferably of at most 90, especially of at most 80, more especially of at most 75, most especially of at most 70, for example of at most 60, for example of at most 50° C.

In case in which the unsaturated resin comprising ethylenic unsaturations is crystalline, said resin has preferably a melting temperature ($T_m$) of at least 30, more preferably of at least 40, more preferably of at least 50, most preferably of at least 60° C. In case in which the unsaturated resin comprising ethylenic unsaturations is crystalline, said resin has preferably a melting temperature ($T_m$) of at most 200, more preferably at most 180, even more preferably at most 160, even more preferably at most 140, most preferably at most 130, especially at most 120, more especially at most 110, most especially at most 100° C.

In case in which the unsaturated resin comprising ethylenic unsaturations is crystalline, said resin has preferably a crystallization temperature ($T_c$) of at least 30, more preferably of at least 40° C. In case in which the unsaturated resin comprising ethylenic unsaturations is crystalline, said resin has preferably a crystallization temperature ($T_c$) of at most 200, more preferably of at most 180, even more preferably of at most 160, even more preferably of at most 140, most preferably at most 120, especially at most 100° C.

In case in which the unsaturated resin comprising ethylenic unsaturations is crystalline, said resin has preferably a melting enthalpy ($\Delta H_m$) of at least 35, more preferably of at least 38, even more preferably of at least 40, most preferably of at least 50, especially of at least 60 J/g. In case in which the unsaturated resin comprising ethylenic unsaturations is crystalline, said resin has preferably a melting enthalpy ($\Delta H_m$) of at most 400, more preferably of at most 300, most preferably of at most 260, especially of at most 240, more especially of at most 220, most especially of at most 200, for example of at most 180, for example of at most 160, for example of at most 140, for example of at most 130, for example at most 120 J/g. The melting enthalpy ($\Delta H_m$) is measured using DSC as described herein (see Examples, "DSC Method").

In case in which the unsaturated resin comprising ethylenic unsaturations is crystalline, said resin has preferably a viscosity of at least 0.001, more preferably of at least 0.01, even more preferably of at least 0.1, Pa·s. In case in which the unsaturated resin comprising ethylenic unsaturations is crystalline, said resin has preferably a viscosity of at most 100, more preferably of at most 50, even more preferably of at most 30, most preferably of at most 25, especially of at most 15, more especially of at most 10, most especially of at most 5, for example of at most 3 Pa·s. In case in which the unsaturated resin comprising ethylenic unsaturations is crystalline, said resin has preferably a viscosity in the range of from 0.01 to 5 Pa·s.

Preferably, the unsaturated resin comprising ethylenic unsaturations (UR) is selected from the group consisting of polyester resins, acrylic resins (polyacrylates), polyurethanes, epoxy resins, polyamides, polyesteramides, polycarbonates, polyureas and mixtures thereof; more preferably the UR is selected from the group consisting of polyester resins, polyurethanes, polyamides, polyesteramides, polyureas; most preferably the UR is selected from the group consisting of unsaturated polyester resins, acrylic resins (polyacrylates), unsaturated polyurethanes, unsaturated epoxy resins, unsaturated polyamides, unsaturated polyesteramides, unsaturated polycarbonates, unsaturated polyureas and mixtures thereof; especially the UR is selected from the group consisting of unsaturated polyester resins, unsaturated polyurethanes, unsaturated polyamides, unsaturated polyesteramides, unsaturated polyureas and mixtures thereof. For example the UR is a polyester resin; most preferably the UR is an unsaturated polyester resin; most preferably the UR is an unsaturated polyester resin comprising ethylenic unsaturations such as acrylated polyester resins, unsaturated polyester resins comprising di-acid ethylenic unsaturations, unsaturated polyester resins comprising 2-butenedioic acid ethylenic unsaturations; especially the UR is an unsaturated polyester resin comprising di-acid ethylenic unsaturations; more especially the UR is an unsaturated polyester resin comprising 2-butenedioic acid ethylenic unsaturations.

The UR may be a polyacrylate, also known as acrylic resin. Generally, an acrylic resin is based on alkyl esters of acrylic acid or methacrylic acid, optionally in combination with styrene. These alkyl esters of acrylic or methacrylic acid may be replaced by hydroxyl or glycidyl functional acrylic or methacrylic acids. Exemplary alkyl esters of acrylic or methacrylic acids include but are not limited to ethyl methacrylate, ethyl acrylate, isopropyl methacrylate, isopropyl acrylate, n-butyl methacrylate, n-butyl acrylate, n-propyl methacrylate, n-propyl acrylate, isobutyl methacrylate, isobutyl acrylate, ethylhexyl acrylate, cyclohexyl methacrylate, cyclohexyl acrylate and mixtures thereof. To obtain an acrylic resin having a hydroxyl functionality, the acrylic resin contains a hydroxyl functional (meth)acrylic acid [by the term "(meth)acrylic" is meant herein "methacrylic or acrylic"], preferably in combination with alkyl esters of (meth)acrylic acid. Examples of hydroxyl functional (meth)acrylic acid esters include hydroxyethyl (meth)acrylate, and hydroxypropyl (meth)acrylate etc. To obtain an acrylic resin comprising a glycidyl functionality, the acrylic resin contains a glycidyl functional (meth)acrylic acid esters, preferably in combination with alkyl esters of (meth)acrylic acid. Examples of glycidyl functional (meth)acrylic acid esters include glycidyl methacrylate, etc. It is also possible to synthesize acrylic resins with both hydroxyl and glycidyl functionality. The introduction of ethylenic unsaturations to an acrylic resin may be carried out by reacting the hydroxyl and/or glycidyl moieties on the acrylic resin with an unsaturated organic acid such as acrylic acid, methacrylic acid, 2-butenedioic acid.

The UR may be a polyurethane. Polyurethanes can for example be prepared using customary, generally known polyaddition reaction of a (poly)isocyanate with a (poly) alcohol in the presence of, if needed a catalyst and other additives. For example, if needed, customary catalysts such as, for example tertiary amines or organometallic compounds, such as for example monobutyltin, tris(2-ethylhexanoate), tetrabutyl titanate or dibutyl tin dilaurate can be used. Examples of amounts of these catalysts used are usually around 0.01% w/w based on the total weight of the resin. Examples of the (poly)alcohols that may be used in the preparation of polyurethanes are the same as those that can be used in the preparation of a polyester resin. Examples of isocyanates that may be used in the preparation of polyurethanes include but are not limited to those mentioned herein for the preparation of the VFUR. The introduction of ethylenic unsaturations to a polyurethane resin may be carried out by reacting the isocyanate moieties on the polyurethane resin with an unsaturated hydroxyl functional ester such as hydroxyl propyl methacrylate or hydroxyl ethyl acrylate or hydroxyl ethyl methacrylate; alternatively the introduction of ethylenic unsaturations to a polyurethane resin may be carried out by reacting the hydroxyl moieties on the polyurethane with an unsaturated organic acid such as acrylic acid, methacrylic acid, 2-butenedioic acid.

The UR may be an epoxy resin. Epoxy resins may for example be prepared from phenolic compounds in combination with epichlorohydrins resulting in epoxy resins like for example a bisphenol A diglycidyl ether such as is commercially available as Epicote 1001 or a Novolac epoxide. The introduction of ethylenic unsaturations to an epoxy resin may be carried out by reacting the epoxy moieities on the epoxy resin with an unsaturated organic acid such as acrylic acid, methacrylic acid, 2-butenedioic acid.

The UR may be a polyamide. Polyamides can for example be prepared by a polycondensation reaction of a diamine and a dicarboxylic acid. The dicarboxylic acids may be branched, non-linear or linear. Exemplary dicarboxylic acids include but are not limited to phthalic acid, isophthalic acid, terephthalic acid, 1,4-cyclohexanedicarboxylic acid, naphthalene-2,6-dicarboxylic acid, cyclohexanediacetic acid, diphenyl-4,4'-dicarboxylic acid, phenylenedi (oxyacetic acid), sebacic acid, succinic acid, adipic acid, glutaric acid and/or azelaic acid. Exemplary diamines include but are not limited to isophorondiamine, 1,2-ethylenediamine, 1,3-propylenediamine, 1,6-hexamethylenediamine, 1,12-dodecylenediamine, 1,4 cyclohexanebismethylamine, piperazine, p-xylylenediamine and/or m-xylylenediamine. The polyamide may also be branched using branching agents. Exemplary branching agents include but are not limited to amines for example di-alkylene-triamines, such as for example di-ethylene-triamine or di-hexamethylene-triamine; di-alkylene-tetramines or di-alkylene-pentamines; acids, for example 1,3,5-benzene tricarboxylic acid, trimellitic anhydride or pyromelitic anhydride; and poly-functional amino acids, such as for example aspartic acid or glutamic acid. The introduction of ethylenic unsaturations may be carried out by reacting the carboxyl moieities on a polyamide resin with an unsaturated organic alcohol, such as hydroxyethylacrylate, hydroxyethylmethacrylate.

The UR may be a polyesteramide. Polyesteramides are resins comprising both ester bonds (as in a polyester) and amide bonds (as in a polyamide) and may for example be prepared from mono-, di-, tri- or polyfunctional monomers, such as monomers with carboxylic acid functionality, monomers with hydroxyl functionality, monomers with amine functionality and/or monomers comprising a combination of any of these functionalities. The introduction of ethylenic unsaturations may be carried out by reacting the carboxyl moieities on a polyesteramide resin with an unsaturated organic alcohol, such as hydroxyethyl(meth)acrylate. The UR may be a polycarbonate. The introduction of ethylenic unsaturations to a polycarbonate may be carried out by reacting the hydroxyl moieities on the polycarbonate with an unsaturated organic acid such as acrylic acid, methacrylic acid, 2-butenedioic acid.

The UR may be a polyurea. Polyureas can for example be prepared using customary, generally known polyaddition reactions of a (poly)isocyanate with a (poly)amine in the presence of, if needed a catalyst and other additives similar to what is described above for polyurethanes. Suitable (poly)amines for the preparation of polyureas include those as are exemplified above for the polyamides. Suitable (poly)isocyanates for the preparation of polyureas include those as are exemplified above for the polyurethanes. The introduction of ethylenic unsaturations to a polyuria may be carried out by reacting the amine and/or isocyanate moieties in the polyurea with an unsaturated organic acid such as acrylic acid, methacrylic acid, 2-butenedioic acid.

Unless otherwise stated, any and all preferred elements, features, preferred ranges and embodiments presented herein for the UR apply equally for any low molecular weight polymer encompassed by the definition of the UR.

3.1 Unsaturated Polyester Resin Comprising Ethylenic Unsaturations

The UR may be an unsaturated polyester resin such as an acrylated polyester resin or a polyester comprising ethylenic unsaturations in its backbone; preferably the UR is an unsaturated polyester resin comprising ethylenic unsaturations such as acrylated polyester resins, unsaturated polyester resins comprising di-acid ethylenic unsaturations, unsaturated polyester resins comprising 2-butenedioic acid ethylenic unsaturations; especially the UR is an unsaturated polyester resin comprising di-acid ethylenic unsaturations; more especially the UR is an unsaturated polyester resin comprising 2-butenedioic acid ethylenic unsaturations. The unsaturated polyester resins comprising ethylenic unsaturations may be amorphous or crystalline. The unsaturated polyester resin comprising di-acid ethylenic unsaturations may be amorphous or crystalline. The unsaturated polyester resins comprising 2-butenedioic acid ethylenic unsaturations may be amorphous or crystalline.

Polyesters (or commonly known in the art as polyester resins) are generally polycondensation products of polyols and polycarboxylic acids. According to the invention a polyester resin is preferably the polycondensation product of polyols and polycarboxylic acids, more preferably a polyester resin is the polycondensation product of dicarboxylic acids, di-alcohols (diols) and/or trifunctional alcohols and/or trifunctional carboxylic acids.

Examples of polycarboxylic acids, especially dicarboxylic acids which may be used in the preparation of a polyester resin include isophthalic acid, terephthalic acid, hexahydroterephthalic acid, 2,6-naphthalenedicarboxylic acid and 4,4'-oxybisbenzoic acid, 3,6-dichlorophthalic acid, tetrachlorophthalic acid, tetrahydrophthalic acid, hexahydroterephthalic acid, hexachloroendomethylenetetrahydrophthalic acid, endomethylenetetrahydrophthalic acid, phthalic acid, azelaic acid, sebacic acid, decanedicarboxylic acid, adipic acid, succinic acid and trimellitic acid. These illustrative polycarboxylic acids can be used in their acid form or where available, in the form of their anhydrides, acyl chlorides or lower alkyl esters. Mixtures of polycarboxylic acids can also be used. In addition hydroxycarboxylic acids and lactones can be used. Examples include hydroxypivalic acid and ε-caprolactone.

Polyols, in particular diols, can be reacted with the carboxylic acids or their analogues as described above to prepare the polyester resin. Examples of polyalcohols include aliphatic diols, for example, ethylene glycol, propane-1,2-diol, propane-1,3-diol, butane-1,2-diol, butane-1,4-diol, butane-1,3-diol, 2,2-dimethylpropane-1,3-diol (neopentyl glycol), hexane-2,5-diol, hexane-1,6-diol, 2,2-bis-(4-hydroxycyclohexyl)-propane (hydrogenated bisphenol-A), 1,4-dimethylolcyclohexane, diethylene glycol, dipropylene glycol and 2,2-bis[4-(2-hydroxyethoxy)-phenyl]propane, the hydroxypivalic ester of neopentylglycol and 4,8-bis-(hydroxymethyl)tricyclo[5,2,1,0]decane (=tricyclodecane dimethylol) and 2,3-butenediol.

Monofunctional carboxylic acids, for example para-t-butyl benzoic acid, benzoic acid, methyl benzoic acid, cinnamic acid, crotonic acid may be used to block the polymer chain.

Trifunctional or more functional alcohols or carboxylic acids can be used to obtain branched polyester resins. Examples of suitable trifunctional or more functional alcohols or carboxylic acids include but not limited to glycerol, hexanetriol, trimethylol ethane, trimethylol propane, pentaerythritol and sorbitol, trimellitic acid, trimellitic acid anhydride, pyromellitic acid dimethylolpropionic acid (DMPA). To obtain branched polyester resins trifunctional monomers such as trimethylolpropane may be used.

The polyester resins can be prepared via customary, generally known polymerization methods by conventional esterification and/or transesterification or by esterification and/or transesterification via the use of an enzyme. For example, if needed, customary esterification catalysts such as, for example, butylchlorotindihydroxide, dibutyltin oxide, tetrabutyl titanate or butyl stannoic acid can be used. Examples of amounts of these esterification catalysts used are usually around 0.1% w/w based on the total weight of the polyester resin.

The conditions for preparing a polyester resin and the 000H/OH ratio can be chosen such that end products are obtained which have an acid value or hydroxyl value which is within the intended range of values.

The polyester resins used in the thermosetting powder coating compositions of the invention are unsaturated polyester resins comprising ethylenic unsaturations, preferably comprising di-acid ethylenic unsaturations, more preferably comprising 2-butenedioic acid ethylenic unsaturations; said ethylenic unsaturations may be present in the backbone of the polyester resin and/or pendant to the backbone of the polyester resin and/or at the terminus of the polyester resin. Preferably, said ethylenic unsaturations are in the backbone of the polyester resin and/or pendant to the backbone of the polyester resin, more preferably said ethylenic unsaturations are in the backbone of the polyester resin; said ethylenic unsaturations may be built into the polyester resin backbone, for instance by reacting a hydroxyl functional monomer (such as the polyalcohols mentioned before) with an unsaturated di-acid monomer as mentioned above. It is also possible to connect the di-acid ethylenic unsaturation to the terminus (or termini) of the polyester resin, for example by reacting a hydroxyl functional terminal group of the polyester resin with an unsaturated di-acid monomer or its corresponding anhydride as mentioned above.

Acrylated polyester resins are unsaturated polyester resins comprising ethylenic unsaturations said ethylenic unsaturations being derived from methacrylic acid, acrylic acid, ethylenically unsaturated glycidyl functional monomer, such as for example glycidyl methacrylate or glycidyl acrylate; in the acrylated polyester resins said ethylenic unsaturations are typically at the terminus (or termini) of the unsaturated polyester resin. Acrylated polyester resins may be prepared by reacting for example a hydroxyl or an epoxy or an amine functional (preferably also terminal) group of a polyester resin with methacrylic acid, acrylic acid, ethylenically unsaturated glycidyl functional monomer, such as for example glycidyl methacrylate or glycidyl acrylate. Alternatively, an acrylated polyester resin may be prepared by reacting a carboxyl functional (preferably also terminal) group of a polyester resin with an ethylenically unsaturated glycidyl functional monomer, such as for example glycidyl methacrylate or glycidyl acrylate.

Preferably polyester resins comprising di-acid ethylenic unsaturations have di-acids chosen from the group consisting of any isomer of 2-butenedioic acid, 2-methyl-2-butenedioic acid, itaconic acid and mixtures thereof. Derivatives of any isomer of unsaturated di-acids include esters, anhydrides, acid salts. Fumaric acid and maleic acid are isomers of 2-butenedioic acid, whereas citraconic acid and mesaconic acid are isomers of 2-methyl-2-butenedioic acid. For example "di-acid ethylenic unsaturations" may be obtainable from one or multiple of the following: fumaric, maleic, itaconic, citraconic and/or mesaconic acids, derivatives thereof and mixtures thereof, in any combination. Fumaric acid based unsaturation is an informal term used herein to denote unsaturation derived from fumaric acid, its isomers e.g. maleic acid and/or derivatives thereof. More preferably the di-acids are chosen from the group consisting of any isomer of 2-butenedioc acid, itaconic acid and mixtures thereof, even more the di-acids are chosen from the group consisting of any isomer of 2-butenedioc acid. Besides 2-butenedioic acid ethylenic unsaturations, the unsaturated polyester resin may of course also have other di-acid ethylenic unsaturations.

Preferably, the unsaturated polyester resin comprising ethylenic unsaturations such as di-acid ethylenic unsaturations such as 2-butenedioic acid ethylenic unsaturations is obtainable from at least the following monomers: i) terephthalic acid, ii) one or both of neopentylglycol and propylene glycol, iii) unsaturated di-acid for example any isomer of 2-butenedioic acid, 2-methyl-2-butenedioic acid, itaconic acid, derivatives thereof and mixtures thereof. Trifunctional monomers such as trimethylolpropane may be used in order to obtain branched unsaturated polyester resin comprising ethylenic unsaturations such as di-acid ethylenic unsaturations such as 2-butenedioic acid ethylenic unsaturations.

The amount of the unsaturated polyester resin comprising ethylenic unsaturations such as di-acid ethylenic unsaturations such as 2-butenedioic acid ethylenic unsaturations in PCC A is preferably at least 40, more preferably at least 50, most preferably at least 55, most preferably at least 60, especially at least 65, more especially at least 69, most especially at least 70, for example at least 71, for example at least 72% w/w on total amount of A1 and A2. The amount of the unsaturated polyester resin comprising ethylenic unsaturations such as di-acid ethylenic unsaturations such as 2-butenedioic acid ethylenic unsaturations in PCC A is preferably at most 99, more preferably at most 95, most preferably at most 90, most preferably at most 88, especially at most 86, more especially at most 84, most especially at most 82, for example at most 81, for example at most 80% w/w on total amount of A1 and A2. Preferably the amount of the unsaturated polyester resin comprising ethylenic unsaturations such as di-acid ethylenic unsaturations such as 2-butenedioic acid ethylenic in PCC A composition ranges from 69 to 84% w/w on total amount of A1 and A2.

The amount of the unsaturated polyester resin comprising ethylenic unsaturations such as di-acid ethylenic unsaturations such as 2-butenedioic acid ethylenic unsaturations in PCC B is preferably at least 40, more preferably at least 50, most preferably at least 55, most preferably at least 60, especially at least 65, more especially at least 69, most especially at least 70, for example at least 71, for example at least 72% w/w on total amount of B1 and B2. The amount of the unsaturated polyester resin comprising ethylenic unsaturations such as di-acid ethylenic unsaturations such as 2-butenedioic acid ethylenic unsaturations in PCC B is preferably at most 99, more preferably at most 95, most preferably at most 90, most preferably at most 88, especially at most 86, more especially at most 84, most especially at most 82, for example at most 81, for example at most 80% w/w on total amount of B1 and B2. Preferably the amount of the unsaturated polyester resin comprising ethylenic unsaturations such as di-acid ethylenic unsaturations such as 2-butenedioic acid ethylenic in PCC B composition ranges from 69 to 84% w/w on total amount of B1 and B2.

The $M_n$ of the unsaturated polyester resin comprising ethylenic unsaturations such as di-acid ethylenic unsaturations such as 2-butenedioic acid ethylenic unsaturations is preferably at least 800, more preferably of at least 1000, even more preferably of at least 1500, most preferably of at least 1800, especially of at least 2000, more especially of at least 2300 Da. The $M_n$ of the unsaturated polyester resin comprising ethylenic unsaturations such as di-acid ethylenic unsaturations such as 2-butenedioic acid ethylenic unsaturations is preferably at most 20000, more preferably at most 10000, even more preferably at most 9000, most preferably at most 8000, especially at most 7000, more especially at most 6000, most especially at most 5000 Da. Preferably, the unsaturated polyester resin comprising ethylenic unsaturations such as di-acid ethylenic unsaturations such as 2-butenedioic acid ethylenic unsaturations has a $M_n$ of at least 2000 and of at most 8000 Da.

The T-WPU of the unsaturated polyester resin comprising ethylenic unsaturations such as di-acid ethylenic unsaturations such as 2-butenedioic acid ethylenic unsaturations is preferably at least 250, more preferably at least 300, even more preferably at least 350, most preferably at least 400, most preferably at least 450, especially at least 500 g/mol. Preferably, the T-WPU of the unsaturated polyester resin comprising ethylenic unsaturations such as di-acid ethylenic unsaturations such as 2-butenedioic acid ethylenic unsaturations is at most 2000, more preferably at most 1500, even more preferably at most 1300, most preferably at most 1200, especially of at most 1100, more especially of at most 1000, most especially of at most 900, for example of at most 850, for example of at most 800 g/mol. Preferably the T-WPU of the unsaturated polyester resin comprising ethylenic unsaturations such as di-acid ethylenic unsaturations such as 2-butenedioic acid ethylenic unsaturations ranges from 450 to 1200 g/mol.

The WPU of the unsaturated polyester resin comprising ethylenic unsaturations such as di-acid ethylenic unsaturations such as 2-butenedioic acid ethylenic unsaturations is preferably at least 250, more preferably at least 300, even more preferably at least 350, most preferably at least 400, most preferably at least 450, especially at least 500 g/mol. Preferably, the WPU of the unsaturated polyester resin comprising ethylenic unsaturations such as di-acid ethylenic unsaturations such as 2-butenedioic acid ethylenic unsaturations is at most 2200, more preferably of at most 1650, even more preferably of at most 1450, most preferably of at most 1350, especially of at most 1100, more especially of at most 1000, most especially of at most 950, for example of at most 900 g/mol. Preferably the WPU of the unsaturated polyester resin comprising ethylenic unsaturations such as di-acid ethylenic unsaturations such as 2-butenedioic acid ethylenic unsaturations ranges from 450 to 1350 g/mol.

The acid value (AV) of the unsaturated polyester resin comprising ethylenic unsaturations such as di-acid ethylenic unsaturations such as 2-butenedioic acid ethylenic unsaturations is preferably at most 250, more preferably at most 200, even more preferably at most 150, most preferably at most 100, especially at most 90, more especially at most 80, most especially at most 70, for example at most 65, for example at most 60, for example at most 50, for example at most 40, for example at most 30, for example at most 20, for example at most 10, for example at most 7, for example at most 5, for example at most 4 mgKOH/g unsaturated polyester resin comprising ethylenic unsaturations such as di-acid ethylenic unsaturations such as 2-butenedioic acid ethylenic unsaturations. The acid value (AV) of the unsaturated polyester resin comprising ethylenic unsaturations such as di-acid ethylenic unsaturations such as 2-butenedioic acid ethylenic unsaturations is preferably at least 0, more preferably at least 0.001, even more preferably at least 0.01, most preferably at least 0.1, especially at least 0.5, more especially at least 1, most especially at least 2, for example at least 2.5, for example at least 3, for example at least 4, for example at least 5 for example at least 10, for example at least 15 mg KOH/g unsaturated polyester resin comprising ethylenic unsaturations such as di-acid ethylenic unsaturations such as 2-butenedioic acid ethylenic unsaturations. Preferably, the acid value (AV) of an unsaturated polyester resin comprising ethylenic unsaturations such as di-acid ethylenic unsaturations such as 2-butenedioic acid ethylenic unsaturations from 0.1 to 60, more preferably ranges from 0.1 to 50, even more preferably ranges from 0.1 to 10 mg KOH/g unsaturated polyester resin comprising ethylenic unsaturations such as di-acid ethylenic unsaturations such as 2-butenedioic acid ethylenic unsaturations.

The hydroxyl value (OHV) of the unsaturated polyester resin comprising ethylenic unsaturations such as di-acid ethylenic unsaturations such as 2-butenedioic acid ethylenic unsaturations is preferably at most 250, more preferably at most 200, even more preferably at most 150, most preferably at most 100, especially at most 90, more especially at most 80, most especially at most 70, for example at most 65, for example at most 60, for example at most 50 mg KOH/g unsaturated polyester resin comprising ethylenic unsaturations such as di-acid ethylenic unsaturations such as 2-butenedioic acid ethylenic unsaturations. The hydroxyl value (OHV) of the unsaturated polyester resin comprising ethylenic unsaturations such as di-acid ethylenic unsaturations such as 2-butenedioic acid ethylenic unsaturations is preferably at least 0.1, more preferably at least 0.5, even more preferably at least 1, most preferably at least 2, especially at least 2.5, more especially at least 3, most especially at least 4, for example at least 5, for example at least 8, for example at least 10, for example at least 15 mg KOH/g unsaturated polyester resin comprising ethylenic unsaturations such as di-acid ethylenic unsaturations such as 2-butenedioic acid ethylenic unsaturations. Preferably the hydroxyl value (OHV) of the unsaturated polyester resin comprising ethylenic unsaturations such as di-acid ethylenic unsaturations such as 2-butenedioic acid ethylenic unsaturations is from 0.1 to 70, more preferably from 10 to 70, even more preferably from 12 to 60 mg KOH/g unsaturated polyester resin comprising ethylenic unsaturations such as di-acid ethylenic unsaturations such as 2-butenedioic acid ethylenic unsaturations.

The acid value of a polyester resin is a measure for the amount of acid groups in the polyester resin whereas the hydroxyl value of a polyester resin is a measure for the amount of hydroxyl groups in the polyester resin.

The unsaturated polyester resins comprising ethylenic unsaturations may be amorphous or crystalline.

The unsaturated polyester resin comprising di-acid ethylenic unsaturations may be amorphous or crystalline.

The unsaturated polyester resins comprising 2-butenedioic acid ethylenic unsaturations may be amorphous or crystalline.

In case in which the unsaturated polyester resin comprising ethylenic unsaturations such as di-acid ethylenic unsaturations such as 2-butenedioic acid ethylenic unsaturations, is amorphous, said polyester resin has preferably a T-WPU of at least 250, more preferably at least 350, for example at least 400, for example at least 450, for example at least 500 g/mol. In case in which the unsaturated polyester resin comprising ethylenic unsaturations such as di-acid ethylenic unsaturations such as 2-butenedioic acid ethylenic unsaturations, is amorphous, said polyester resin has preferably a T-WPU of at most 2000, more preferably of at most 1500, even more preferably of at most 1300, most preferably of at most 1200, especially of at most 1100, more especially of at most 1000, most especially of at most 900, for example of at most 850, for example of at most 800 g/mol. Preferably the T-WPU of an amorphous unsaturated polyester resin comprising ethylenic unsaturations such as di-acid ethylenic unsaturations such as 2-butenedioic acid ethylenic unsaturations, ranges from 450 to 1200 g/mol.

In case in which the unsaturated polyester resin comprising ethylenic unsaturations such as di-acid ethylenic unsaturations such as 2-butenedioic acid ethylenic unsaturations, is amorphous, said polyester resin has preferably a WPU of at least 250, more preferably at least 350, for example at least 400, for example at least 450, for example at least 500 g/mol. In case in which the unsaturated polyester resin comprising ethylenic unsaturations such as di-acid ethylenic unsaturations such as 2-butenedioic acid ethylenic unsaturations, is amorphous, said polyester resin has preferably a WPU of at most 2200, more preferably of at most 1650, even more preferably of at most 1450, most preferably of at most 1350, especially of at most 1100, more especially of at most 1000, most especially of at most 950, for example of at most 900 g/mol. Preferably the WPU of the unsaturated polyester resin comprising ethylenic unsaturations such as di-acid ethylenic unsaturations such as 2-butenedioic acid ethylenic unsaturations, ranges from 450 to 1350 g/mol.

In case in which the unsaturated polyester resin comprising ethylenic unsaturations such as di-acid ethylenic unsaturations such as 2-butenedioic acid ethylenic unsaturations, is amorphous, said polyester resin has preferably a glass transition temperature ($T_g$) of at least 20, more preferably of at least 25, even more preferably of at least 30, most preferably of at least 40, especially of at least 45, more especially of at least 50° C. In case in which the unsaturated polyester resin comprising ethylenic unsaturations such as di-acid ethylenic unsaturations such as 2-butenedioic acid ethylenic unsaturations, is amorphous, said polyester resin has preferably a glass transition temperature ($T_g$) of at most 120, more preferably of at most 110, even more preferably of at most 100, most preferably of at most 90, especially of at most 80, more especially of at most 75, most especially of at most 70, for example of at most 65, for example of at most 60° C. Preferably, the amorphous unsaturated polyester resin comprising ethylenic unsaturations such as di-acid ethylenic unsaturations such as 2-butenedioic acid ethylenic unsaturations has a glass transition temperature ($T_g$) of at least 20 and of at most 70° C., more preferably of at least 20 and of at most 65° C., most preferably of at least 40 and of at most 70° C., especially of at least 40 and of at most 65° C.

The acid value (AV) of the amorphous unsaturated polyester resin comprising ethylenic unsaturations such as di-acid ethylenic unsaturations such as 2-butenedioic acid ethylenic unsaturations is preferably at most 250, more preferably at most 200, even more preferably at most 150, most preferably at most 100, especially at most 90, more especially at most 80, most especially at most 70, for example at most 65, for example at most 60, for example at most 50, for example at most 40, for example at most 30, for example at most 20, for example at most 10, for example at most 7, for example at most 5, for example at most 4 mg KOH/g amorphous unsaturated polyester resin comprising ethylenic unsaturations such as di-acid ethylenic unsaturations such as 2-butenedioic acid ethylenic unsaturations. The acid value (AV) of the amorphous unsaturated polyester resin comprising ethylenic unsaturations such as di-acid ethylenic unsaturations such as 2-butenedioic acid ethylenic unsaturations is preferably at least 0, more preferably at least 0.001, even more preferably at least 0.01, most preferably at least 0.1, especially at least 0.5, more especially at least 1, most especially at least 2, for example at least 2.5, for example at least 3, for example at least 4, for example at least 5 for example at least 10, for example at least 15 mg KOH/g amorphous unsaturated polyester resin comprising ethylenic unsaturations such as di-acid ethylenic unsaturations such as 2-butenedioic acid ethylenic unsaturations. Preferably, the acid value (AV) of the amorphous unsaturated polyester resin comprising ethylenic unsaturations such as di-acid ethylenic unsaturations such as 2-butenedioic acid ethylenic unsaturations from 0.1 to 60, more preferably ranges from 0.1 to 50, even more preferably ranges from 0.1 to 10 mg KOH/g amorphous unsaturated polyester resin comprising ethylenic unsaturations such as di-acid ethylenic unsaturations such as 2-butenedioic acid ethylenic unsaturations.

The hydroxyl value (OHV) of the amorphous unsaturated polyester resin comprising ethylenic unsaturations such as di-acid ethylenic unsaturations such as 2-butenedioic acid ethylenic unsaturations is preferably at most 250, more preferably at most 200, even more preferably at most 150, most preferably at most 100, especially at most 90, more especially at most 80, most especially at most 70, for example at most 65, for example at most 60, for example at most 50 mg KOH/g amorphous unsaturated polyester resin comprising ethylenic unsaturations such as di-acid ethylenic unsaturations such as 2-butenedioic acid ethylenic unsaturations. The hydroxyl value (OHV) of the amorphous unsaturated polyester resin comprising ethylenic unsaturations such as di-acid ethylenic unsaturations such as 2-butenedioic acid ethylenic unsaturations is preferably at least 0.1, more preferably at least 0.5, even more preferably at least 1, most preferably at least 2, especially at least 2.5, more especially at least 3, most especially at least 4, for example at least 5, for example at least 8, for example at least 10, for example at least 15 mg KOH/g amorphous unsaturated polyester resin comprising ethylenic unsaturations such as di-acid ethylenic unsaturations such as 2-butenedioic acid ethylenic unsaturations. Preferably the hydroxyl value (OHV) of the amorphous unsaturated polyester resin comprising ethylenic unsaturations such as di-acid ethylenic unsaturations such as 2-butenedioic acid ethylenic unsaturations is from 0.1 to 70, more preferably from 10 to 70, even more preferably from 12 to 60 mg KOH/g amorphous unsaturated polyester resin comprising ethylenic unsaturations such as di-acid ethylenic unsaturations such as 2-butenedioic acid ethylenic unsaturations.

In case in which the unsaturated polyester resin comprising ethylenic unsaturations such as di-acid ethylenic unsaturations such as 2-butenedioic acid ethylenic unsaturations, is amorphous, said polyester resin has preferably a glass transition temperature ($T_g$) of at least 20, more preferably of at least 25, even more preferably of at least 30, most preferably of at least 40, especially of at least 45, more especially of at least 50. In case in which the unsaturated polyester resin comprising ethylenic unsaturations such as di-acid ethylenic unsaturations such as 2-butenedioic acid ethylenic unsaturations, is amorphous, said polyester resin has preferably a glass transition temperature ($T_g$) of at most 120, more preferably of at most 110, even more preferably of at most 100, most preferably of at most 90, especially of at most 80, more especially of at most 75, most especially of at most 70, for example of at most 65, for example of at most 60° C. Preferably, the amorphous unsaturated polyester resin comprising ethylenic unsaturations such as di-acid ethylenic unsaturations such as 2-butenedioic acid ethylenic unsaturations has a glass transition temperature ($T_g$) of at least 20 and of at most 70° C., more preferably of at least 20 and of at most 65° C., most preferably of at least 40 and of at most 70° C., especially of at least 40 and of at most 65° C.

In case in which the unsaturated polyester resin comprising ethylenic unsaturations such as di-acid ethylenic unsaturations such as 2-butenedioic acid ethylenic unsaturations, is amorphous, said polyester resin has preferably a viscosity of at least 1, more preferably of at least 2, even more preferably of at least 5, most preferably of at least 10, especially of at least 15 Pa·s. In case in which the unsaturated polyester resin comprising ethylenic unsaturations such as di-acid ethylenic unsaturations such as 2-butenedioic acid ethylenic unsaturations, is amorphous, said polyester resin has preferably a viscosity of at most 400, more preferably of at most 300, even more preferably of at most 200, most preferably of at most 150, especially of at most 100, more especially of at most 80, most especially of at most 50 Pa·s. In case in which the unsaturated polyester resin comprising ethylenic unsaturations such as di-acid ethylenic unsaturations such as 2-butenedioic acid ethylenic unsaturations, is amorphous, said polyester resin has preferably a viscosity in the range of from 2 to 50 Pa·s.

In case in which the unsaturated polyester resin comprising ethylenic unsaturations such as di-acid ethylenic unsaturations such as 2-butenedioic acid ethylenic unsaturations, is amorphous said polyester resin has preferably a $M_n$ of at least 800, more preferably of at least 1000, even more preferably of at least 1500, most preferably of at least 1800, especially of at least 2000, more especially of at least 2300 Da. In case in which the unsaturated polyester resin comprising ethylenic unsaturations such as di-acid ethylenic unsaturations such as 2-butenedioic acid ethylenic unsaturations, is amorphous said polyester resin has preferably a $M_n$ of at most 20000, more preferably of at most 10000, even more preferably of at most 9000, most preferably of at most 8000, especially of at most 7000, more especially of at most 6000 Da, most especially of at most 5000 Da. In case in which the unsaturated polyester resin comprising ethylenic unsaturations such as di-acid ethylenic unsaturations such as 2-butenedioic acid ethylenic unsaturations, is amorphous, said polyester resin has preferably a $M_n$ of at least 2000 and of at most 8000 Da, more preferably of at least 2000 and of at most 5000 Da.

In case in which the unsaturated polyester resin comprising ethylenic unsaturations such as di-acid ethylenic unsaturations such as 2-butenedioic acid ethylenic unsaturations, is crystalline, said polyester resin has preferably a T-WPU of at least 250, more preferably at least 350, for example at least 400, for example at least 450, for example at least 500 g/mol. In case in which the unsaturated polyester resin comprising ethylenic unsaturations such as di-acid ethylenic unsaturations such as 2-butenedioic acid ethylenic unsaturations, is crystalline, said polyester resin has preferably a T-WPU of at most 2800, more preferably at most 2500, even more preferably at most 2000, most preferably at most 1600, especially at most 1400, more especially at most 1200, even more especially at most 1100, most especially at most 1000, for example at most 980, for example at most 950 g/mol.

In case in which the unsaturated polyester resin comprising ethylenic unsaturations such as di-acid ethylenic unsaturations such as 2-butenedioic acid ethylenic unsaturations, is crystalline, said polyester resin has preferably a WPU of at least 250, more preferably at least 350, for example at least 400, for example at least 450, for example at least 500 g/mol. In case in which the unsaturated polyester resin comprising ethylenic unsaturations such as di-acid ethylenic unsaturations such as 2-butenedioic acid ethylenic unsaturations, is crystalline, said polyester resin has preferably a WPU of at most 3000, more preferably of at most 2900, even more preferably of at most 2600, most preferably of at most 2000, especially of at most 1800, more especially of at most 1600, most especially of at most 1400, for example of at most 1350, for example of at most 1200, for example of at most 1100 g/mol. Preferably the WPU of the crystalline unsaturated polyester resin comprising ethylenic unsaturations ranges from 450 to 3000, more preferably from 450 to 2600 g/mol.

In case in which the unsaturated polyester resin comprising ethylenic unsaturations such as di-acid ethylenic unsaturations such as 2-butenedioic acid ethylenic unsaturations, is crystalline, said polyester resin has preferably a glass transition temperature ($T_g$) of at least −70, more preferably of at least −50, even more preferably of at least −40, even more preferably of at least −35, most preferably of at least −20, especially of at least −10, more especially of at least 0, even more especially of at least 10, most especially of at least 20° C. In case in which the unsaturated polyester resin comprising ethylenic unsaturations such as di-acid ethylenic unsaturations such as 2-butenedioic acid ethylenic unsaturations, is crystalline, said polyester resin has preferably a glass transition temperature ($T_g$) of at most 120, more preferably of at most 110, even more preferably of at most 100, most preferably of at most 90, especially of at most 80, more especially of at most 75, most especially of at most 70, for example of at most 65, for example of at most 60° C. Preferably, the crystalline unsaturated polyester resin comprising ethylenic unsaturations has a glass transition of at least 20 and of at most 70° C., more preferably of at least 20 and of at most 65° C., most preferably of at least 40 and of at most 70° C., especially of at least 40 and of at most 65° C.

In case in which the unsaturated polyester resin comprising ethylenic unsaturations such as di-acid ethylenic unsaturations such as 2-butenedioic acid ethylenic unsaturations, is crystalline, said polyester resin has preferably a melting temperature ($T_m$) of at least 30, more preferably of at least 40, more preferably of at least 50, most preferably of at least 60° C. In case in which the unsaturated polyester resin comprising ethylenic unsaturations such as di-acid ethylenic unsaturations such as 2-butenedioic acid ethylenic unsaturations, is crystalline, said polyester resin has preferably a melting temperature ($T_m$) of at most 200, more preferably at most 180, even more preferably at most 160, even more preferably at most 140, most preferably at most 130, especially at most 120, more especially at most 110, most especially at most 100° C.

In case in which the unsaturated polyester resin comprising ethylenic unsaturations such as di-acid ethylenic unsaturations such as 2-butenedioic acid ethylenic unsaturations, is crystalline, said polyester resin has preferably a crystallization temperature ($T_c$) of at least 30, more preferably of at least 40° C. In case in which the unsaturated polyester resin comprising ethylenic unsaturations such as di-acid ethylenic unsaturations such as 2-butenedioic acid ethylenic unsaturations, is crystalline, said polyester resin has preferably a crystallization temperature ($T_c$) of at most 200, more preferably of at most 180, even more preferably of at most 160, even more preferably of at most 140, most preferably at most 120, especially at most 100° C.

In case in which the unsaturated polyester resin comprising ethylenic unsaturations such as di-acid ethylenic unsaturations such as 2-butenedioic acid ethylenic unsaturations, is crystalline, said polyester resin has preferably a melting enthalpy ($\Delta H_m$) of at least 35, more preferably of at least 38, even more preferably of at least 40, most preferably of at least 50, especially of at least 60 J/g. In case in which the unsaturated polyester resin comprising ethylenic unsaturations such as di-acid ethylenic unsaturations such as 2-butenedioic acid ethylenic unsaturations, is crystalline, said polyester resin has preferably a melting enthalpy ($\Delta H_m$) of at most 400, more preferably of at most 300, most preferably of at most 260, especially of at most 240, more especially of at most 220, most especially of at most 200, for example of at most 180, for example of at most 160, for example of at most 140, for example of at most 130, for example at most 120 J/g. The melting enthalpy ($\Delta H_m$) is measured using DSC as described herein (see Examples, "DSC Method").

The acid value (AV) of the crystalline unsaturated polyester resin comprising ethylenic unsaturations such as di-acid ethylenic unsaturations such as 2-butenedioic acid ethylenic unsaturations is preferably at most 250, more preferably at most 200, even more preferably at most 150, most preferably at most 100, especially at most 90, more especially at most 80, most especially at most 70, for example at most 65, for example at most 60, for example at most 50, for example at most 40, for example at most 30, for example at most 20, for example at most 10, for example at most 7, for example at most 5, for example at most 4 mg KOH/g crystalline unsaturated resin comprising ethylenic unsaturations such as di-acid ethylenic unsaturations such as 2-butenedioic acid ethylenic unsaturations. The acid value (AV) of the crystalline unsaturated polyester resin comprising ethylenic unsaturations such as di-acid ethylenic unsaturations such as 2-butenedioic acid ethylenic unsaturations is preferably at least 0, more preferably at least 0.001, even more preferably at least 0.01, most preferably at least 0.1, especially at least 0.5, more especially at least 1, most especially at least 2, for example at least 2.5, for example at least 3, for example at least 4, for example at least 5 for example at least 10, for example at least 15 mg KOH/g crystalline unsaturated polyester resin comprising ethylenic unsaturations such as di-acid ethylenic unsaturations such as 2-butenedioic acid ethylenic unsaturations. Preferably, the acid value (AV) of the crystalline unsaturated polyester resin comprising ethylenic unsaturations such as di-acid ethylenic unsaturations such as 2-butenedioic acid ethylenic unsaturations from 0.1 to 60, more preferably ranges from 0.1 to 50, even more preferably ranges from 0.1 to 10 mg KOH/g crystalline unsaturated polyester resin comprising ethylenic unsaturations such as di-acid ethylenic unsaturations such as 2-butenedioic acid ethylenic unsaturations.

The hydroxyl value (OHV) of the crystalline unsaturated polyester resin comprising ethylenic unsaturations such as di-acid ethylenic unsaturations such as 2-butenedioic acid ethylenic unsaturations is preferably at most 250, more preferably at most 200, even more preferably at most 150, most preferably at most 100, especially at most 90, more especially at most 80, most especially at most 70, for example at most 65, for example at most 60, for example at most 50 mg KOH/g crystalline unsaturated polyester resin comprising ethylenic unsaturations such as di-acid ethylenic unsaturations such as 2-butenedioic acid ethylenic unsaturations. The hydroxyl value (OHV) of the crystalline unsaturated polyester resin comprising ethylenic unsaturations such as di-acid ethylenic unsaturations such as 2-butenedioic acid ethylenic unsaturations is preferably at least 0.1, more preferably at least 0.5, even more preferably at least 1, most preferably at least 2, especially at least 2.5, more especially at least 3, most especially at least 4, for example at least 5, for example at least 8, for example at least 10, for example at least 15 mg KOH/g crystalline unsaturated polyester resin comprising ethylenic unsaturations such as di-acid ethylenic unsaturations such as 2-butenedioic acid ethylenic unsaturations. Preferably the hydroxyl value (OHV) of the crystalline unsaturated polyester resin comprising ethylenic unsaturations such as di-acid ethylenic unsaturations such as 2-butenedioic acid ethylenic unsaturations is from 0.1 to 70, more preferably from 10 to 70, even more preferably from 12 to 60 mg KOH/g crystalline unsaturated polyester resin comprising ethylenic unsaturations such as di-acid ethylenic unsaturations such as 2-butenedioic acid ethylenic unsaturations.

In case in which the unsaturated polyester resin comprising ethylenic unsaturations such as di-acid ethylenic unsaturations such as 2-butenedioic acid ethylenic unsaturations, is crystalline, said polyester resin has preferably a viscosity of at least 0.001, more preferably of at least 0.01, even more preferably of at least 0.1, Pa·s. In case in which the unsaturated polyester resin comprising ethylenic unsaturations such as di-acid ethylenic unsaturations such as 2-butenedioic acid ethylenic unsaturations, is crystalline, said polyester resin has preferably a viscosity of at most 100, more preferably of at most 50, even more preferably of at most 30, most preferably of at most 25, especially of at most 15, more especially of at most 10, most especially of at most 5, for example of at most 3 Pa·s. In case in which the unsaturated polyester resin comprising ethylenic unsaturations such as di-acid ethylenic unsaturations such as 2-butenedioic acid ethylenic unsaturations, is crystalline, said polyester resin has preferably a viscosity in the range of from 0.01 to 5 Pa·s.

In case in which the unsaturated polyester resin comprising ethylenic unsaturations such as di-acid ethylenic unsaturations such as 2-butenedioic acid ethylenic unsaturations, is crystalline, said polyester resin has preferably a $M_n$ of at least 800, more preferably of at least 1000, even more preferably of at least 1500, most preferably of at least 1800, especially of at least 2000, more especially of at least 2300 Da. In case in which the unsaturated polyester resin comprising ethylenic unsaturations such as di-acid ethylenic unsaturations such as 2-butenedioic acid ethylenic unsaturations, is crystalline, said polyester resin has preferably a $M_n$ of at most 20000, more preferably of at most 10000, even more preferably of at most 9000, most preferably of at most 8000, especially of at most 7000 Da. In case in which the unsaturated polyester resin comprising ethylenic unsaturations such as di-acid ethylenic unsaturations such as 2-butenedioic acid ethylenic unsaturations, is crystalline, said polyester resin has preferably a $M_n$ of at least 2000 and of at most 8000 Da, more preferably of at least 2300 and of at most 8000 Da.

The crystallinity of the unsaturated polyester resin comprising ethylenic unsaturations such as di-acid ethylenic unsaturations such as 2-butenedioic acid ethylenic unsaturations, may be introduced by using one or more of the following diacids: succinic acid, adipic acid, sebasic acid or dodecanedioc acid, and/or one or more of the following diols: ethyleneglycol, hexanediol, butanediol in the synthesis of said unsaturated polyester resin resins.

4. COMPONENT A2 OF PCC A, COMPONENT B2 OF PCC B

Copolymerizable Agent

Unless otherwise stated, the disclosure of copolymerizable agent presented herein applies equally for component A2 of PCC A and component B2 of PCC B. Component A2 and component B2 may have the same or different copolymerizing agent (consequently M may be the same or different in A2 and B2), and may have the same or different amounts of said copolymerizing agents, as said copolymerizing agents and their amounts are disclosed herein.

The copolymerizable agent is solid at room temperature and at atmospheric pressure; more preferably the copolymerizable agent is non-volatile at the temperatures and pressures used when processing, applying and storing the powder coating composition.

The copolymerizable agent is selected from the group consisting of:

a) a crystalline copolymerizable resin (CCR) having a WPU of at least 190 and at most 1500 g/mol and a $M_n$ equal to or higher than 350 Da, and b) a mixture of a crystalline copolymerizable resin (CCR) with an amorphous copolymerizable resin (ACR) wherein each of the CCR and ACR has a WPU of at least 190 and at most 1500 g/mol and a $M_n$ equal to or higher than 350 Da and wherein said mixture the weight ratio M=weight ACR/weight CCR, is at most 1.

Preferably, M is at most 0.9, more preferably at most 0.8, even more preferably at most 0.7, most preferably at most 0.6, especially at most 0.5, more especially at most 0.4, even more especially at most 0.3, most especially at most 0.25, for example at most 0.2, for example at most 0.15, for example at most 0.1, for example at most 0.05, for example at most 0.03, for example at most 0.02, for example at most 0.01.

For convenience, the M related to component A2 may be specifically denoted as $M_A$; analogously, the M related to component B2 may be specifically denoted as $M_B$.

Preferably, the copolymerizable agent is a crystalline copolymerizable resin (CCR) having a WPU of at least 190 and at most 1500 g/mol and a $M_n$ equal to or higher than 350 Da; more preferably the copolymerizable agent is a crystalline copolymerizable resin selected from the group consisting of vinyl ether resins, vinyl ester resins, vinyl(ether-ester) resins, vinyl functionalized urethane resins, acrylate resins, methacrylate resins, vinyl amide resins, alkyne ethers resins, alkyne ester resins, alkyne amide resins, alkyne amine resins, propargyl ether resins, allyl resins, propargyl ester resins, itaconate resins and mixtures thereof; even more preferably the copolymerizable agent is a crystalline copolymerizable resin selected from the group consisting of vinyl ether resins, vinyl ester resins, vinyl(ether-ester) resins, vinyl functionalized urethane resins, acrylate resins, methacrylate resins, vinyl amide resins, alkyne ethers resins, alkyne ester resins, alkyne amide resins, alkyne amine resins, propargyl ether resins, propargyl ester resins, itaconate resins and mixtures thereof; most preferably the copolymerizable agent is a crystalline copolymerizable resin selected from the group consisting of vinyl ether resins, vinyl ester resins, vinyl(ether-ester) resins, vinyl functionalized urethane resins and mixtures thereof; especially the copolymerizable agent is a crystalline copolymerizable resin selected from the group consisting of vinyl ether resins, vinyl ester resins, vinyl functionalized urethane resins and mixtures thereof; more especially the copolymerizable agent is a crystalline copolymerizable resin selected from the group consisting of vinyl ether resins, vinyl functionalized urethane resins and mixtures thereof; most especially the copolymerizable agent is a vinyl functionalized urethane resin.

Examples of CCR include but are not limited to URACROSS® P3307 and VFUR1-VFUR3 (see Examples, Table 2).

The crystalline copolymerizable resin has preferably a melting enthalpy ($\Delta H_m$) of at least 35, more preferably of at least 38, even more preferably of at least 40, most preferably of at least 50, especially of at least 60 J/g. The crystalline copolymerizable resin has preferably a melting enthalpy ($\Delta H_m$) of at most 400, more preferably of at most 300, even more preferably of at most 260, most preferably of at most 240, especially of at most 220, more especially of at most 210, most especially of at most 200, for example of at most 180, for example of at most 170 J/g.

The crystalline copolymerizable resin has an $M_n$ ranging from at least 350 to at most 20000 Da. Preferably the crystalline copolymerizable resin has a $M_n$ of at least 355, more preferably of at least 360, even more preferably of at least 370, most preferably of at least 380, especially of at least 385, more especially of at least 390, most especially of at least 395, for example of at least 399, for example of at least 400. Preferably, the crystalline copolymerizable resin has a $M_n$ of at most 20000, more preferably of at most 10000, even more preferably of at most 9000, most preferably of at most 8000, especially of at most 7000, more especially of at most 6000, most especially of at most 5000, for example of at most 4000, for example of at most 3500, for example of at most 3000, for example of at most 2500, for example of at most 2200 Da, for example of at most 2180, for example of at most 2000, for example of at most 1800, for example of at most 1600, for example of at most 1500, for example of at most 1300, for example of at most 1200 Da.

Preferably, the T-WPU of the crystalline copolymerizable resin is at least 190, more preferably at least 195, even more preferably at least 200 g/mol. Preferably the T-WPU of the crystalline copolymerizable resin is at most 1500, more preferably at most 1400, even more preferably at most 1200, most preferably at most 1100, especially at most 1000, more especially at most 900, most especially at most 800, for example at most 700, for example at most 680, for example at most 650, for example at most 630, for example at most 600, for example at most 500, for example at most 400 for example at most 350 g/mol.

Preferably, the WPU of the crystalline copolymerizable resin is at least 190, more preferably at least 195, even preferably at least 200 g/mol. Preferably the WPU of the crystalline copolymerizable resin is at most 1500, more preferably at most 1400, even more preferably at most 1200, most preferably at most 1100, especially at most 1000, more especially at most 900, most especially at most 800, for example at most 700, for example at most 680, for example at most 650, for example at most 630, for example at most 600, for example at most 500, for example at most 400 for example at most 350 g/mol.

Preferably, the crystalline copolymerizable resin has a viscosity of at least 0.0001, more preferably at least 0.001, even more preferably at least 0.005, most preferably at least 0.008, especially at least 0.009, more especially at least 0.01 Pa·s. Preferably, the crystalline copolymerizable resin has a viscosity of at most 30, more preferably at most 25, even more preferably at most 20, most preferably at most 15, especially at most 10, more especially at most 8, most especially at most 6, for example at most 5, for example at most 4, for example at most 3, for example at most 2 Pa·s. Preferably, the crystalline copolymerizable resin has a viscosity in the range of from 0.1 to 30 Pa·s, more preferably, in the range of from 0.01 to 2 Pa·s.

Preferably, the amorphous copolymerizable resin has a glass transition temperature ($T_g$) of at least 20, more preferably of at least 25, even more preferably of at least 30, most preferably of at least 40, especially of at least 45, more especially of at least 50. Preferably, the amorphous copolymerizable resin has a glass transition temperature ($T_g$) of at most 120, more preferably of at most 110, even more preferably of at most 100, most preferably of at most 90, especially of at most 80, more especially of at most 75, most especially of at most 70, for example of at most 65, for example of at most 60° C.

Preferably, the amorphous copolymerizable resin has a viscosity of at least 1, more preferably of at least 5, even more preferably of at least 10, most preferably of at least 15 Pa·s. Preferably, the amorphous copolymerizable resin has a viscosity of at most 400, more preferably of at most 300, even more preferably of at most 200, most preferably of at most 150, especially of at most 100, more especially of at most 80, most especially of at most 50 Pa·s. Preferably, the amorphous copolymerizable resin has a viscosity in the range of from 1 to 30 Pa·s.

The amorphous copolymerizable resin has a $M_n$ ranging from at least 350 to at most 20000 Da. Preferably the amorphous copolymerizable resin has a $M_n$ of at least 355, more preferably of at least 360, even more preferably of at least 370, most preferably of at least 380, especially of at least 385, more especially of at least 390, most especially of at least 395, for example of at least 399, for example of at least 400. Preferably, the amorphous copolymerizable resin has a $M_n$ of at most 20000, more preferably of at most 10000, even more preferably of at most 9000, most preferably of at most 8000, especially of at most 7000, more especially of at most 6000, most especially of at most 5000, for example of at most 4000, for example of at most 3500, for example of at most 3000, for example of at most 2500, for example of at most 2200 Da, for example of at most 2180, for example of at most 2000, for example of at most 1800, for example of at most 1600, for example of at most 1500, for example of at most 1300, for example of at most 1200 Da.

Preferably, the T-WPU of the amorphous copolymerizable resin is at least 190, more preferably at least 195, even more preferably at least 200 g/mol. Preferably the T-WPU of the amorphous copolymerizable resin is at most 1500, more preferably at most 1400, even more preferably at most 1200, most preferably at most 1100, especially at most 1000, more especially at most 900, most especially at most 800, for example at most 700, for example at most 680, for example at most 650, for example at most 630, for example at most 600, for example at most 500, for example at most 400 for example at most 350 g/mol.

Preferably, the WPU of the amorphous copolymerizable resin is at least 190, more preferably at least 195, even more preferably at least 200 g/mol. Preferably the WPU of the amorphous copolymerizable resin is at most 1500, more preferably at most 1400, even more preferably at most 1200, most preferably at most 1100, especially at most 1000, more especially at most 900, most especially at most 800, for example at most 700, for example at most 680, for example at most 650, for example at most 630, for example at most 600, for example at most 500, for example at most 400 for example at most 350 g/mol.

Preferably, the amount of the copolymerizable agent in PCC A is at least 4, more preferably at least 4.5, even more preferably at least 6, most preferably at least 7, especially at least 8, more especially at least 9, even more especially at least 15, most especially at least 18, for example at least 19, for example at least 20, for example at least 24% w/w based on the total amount of A1 and A2. Preferably the amount of copolymerizable agent is at most 85, more preferably at most 70, even more preferably at most 65, most preferably at most 60, especially at most 55, more especially at most 50, even more especially at most 45, for example at most 40% w/w based on the total amount of A1 and A2.

Preferably, the amount of copolymerizable agent in PCC B is at least 4, more preferably at least 4.5, even more preferably at least 6, most preferably at least 7, especially at least 8, more especially at least 9, even more especially at least 15, most especially at least 18, for example at least 19, for example at least 20, for example at least 24% w/w based on the total amount of B1 and B2. Preferably the amount of copolymerizable agent is at most 85, more preferably at most 70, even more preferably at most 65, most preferably at most 60, especially at most 55, more especially at most 50, even more especially at most 45, for example at most 40% w/w based on the total amount of B1 and B2.

Preferably, the molar ratio $K_A$ (=mol of the reactive unsaturations in A2/mol of the ethylenic unsaturations in A1), is at most 9, preferably at most 8, more preferably at most 7, even more preferably at most 6, most preferably at most 5, especially at most 4, more especially at most 3, even more especially at most 2, most especially at most 1.5, for example at most 1.4, for example at most 1.3, for example at most 1.2, for example at most 1.15, for example at most 1.10, for example at most 1.05 for example at most 1.02, for example at most 1. Preferably, the molar ratio $K_A$ is at least 0.1, preferably at least 0.2, more preferably at least 0.3, even more preferably at least 0.4, most preferably at least 0.5, especially at least 0.6, more especially at least 0.7, even more especially at least 0.8, most especially at least 0.9, for example at least 0.95. Preferably, $K_A$ is equal to 1.

Preferably, the molar ratio $K_B$ (=mol of the reactive unsaturations in B2/mol of the ethylenic unsaturations in B1), is at most 9, preferably at most 8, more preferably at most 7, even more preferably at most 6, most preferably at most 5, especially at most 4, more especially at most 3, even more especially at most 2, most especially at most 1.5, for example at most 1.4, for example at most 1.3, for example at most 1.2, for example at most 1.15, for example at most 1.10, for example at most 1.05 for example at most 1.02, for example at most 1. Preferably, the molar ratio $K_B$ is at least 0.1, preferably at least 0.2, more preferably at least 0.3, even more preferably at least 0.4, most preferably at least 0.5, especially at least 0.6, more especially at least 0.7, even more especially at least 0.8, most especially at least 0.9, for example at least 0.95. Preferably, $K_B$ is equal to 1.

The disclosure regarding the molar ratio $K_A$ and $K_B$ apply analogously for any one of the selected preferments on crystalline copolymerizable resins mentioned in this application.

The crystalline copolymerizable resin is chosen from the group consisting of vinyl ether resins, vinyl ester resins, vinyl(ether-ester) resins, vinyl functionalized urethane resins, acrylate resins, methacrylate resins, vinyl amide resins, alkyne ethers resins, alkyne ester resins, alkyne amide resins, alkyne amine resins, propargyl ether resins, allyl resins, propargyl ester resins, itaconate resins and mixtures thereof; more preferably, the crystalline copolymerizable resin is chosen from the group consisting of vinyl ether resins, vinyl ester resin, vinyl(ether-ester) resins, vinyl functionalized urethane resins, acrylate resins, methacrylate resins, vinyl amide resins, alkyne ethers resins, alkyne ester resins, alkyne amide resins, alkyne amine resins, propargyl ether resins, propargyl ester resins, itaconate resins and mixtures thereof; most preferably the crystalline copolymerizable resin is chosen from the group consisting of vinyl ether resins, vinyl ester resins, vinyl(ether-ester) resins, vinyl functionalized urethane resins and mixtures thereof; especially the crystalline copolymerizable resin is chosen from the group consisting of vinyl ether resins, vinyl ester resins, vinyl functionalized urethane resins and mixtures thereof; more especially the crystalline copolymerizable resin is chosen from the group consisting of vinyl ether resins, vinyl functionalized urethane resins and mixtures thereof; most especially the crystalline copolymerizable resin is a vinyl functionalized urethane resin.

The amorphous copolymerizable resin is chosen from the group consisting of vinyl ether resins, vinyl ester resins, vinyl(ether-ester) resins, vinyl functionalized urethane resins, acrylate resins, methacrylate resins, vinyl amide resins, alkyne ethers resins, alkyne ester resins, alkyne amide resins, alkyne amine resins, propargyl ether resins, allyl resins, propargyl ester resins, itaconate resins and mixtures thereof; more preferably, the amorphous copolymerizable resin is chosen from the group consisting of vinyl ether resins, vinyl ester resins, vinyl(ether-ester) resins, vinyl functionalized urethane resins, acrylate resins, methacrylate resins, vinyl amide resins, alkyne ethers resins, alkyne ester resins, alkyne amide resins, alkyne amine resins, propargyl ether resins, propargyl ester resins, itaconate resins and mixtures thereof; most preferably the amorphous copolymerizable resin is chosen from the group consisting of vinyl ether resins, vinyl ester resins, vinyl(ether-ester) resins, vinyl functionalized urethane resins and mixtures thereof; especially the amorphous copolymerizable resin is chosen from the group consisting of vinyl ether resins, vinyl ester resins, vinyl functionalized urethane resins and mixtures thereof; more especially the amorphous copolymerizable resin is chosen from the group consisting of vinyl ether resins, vinyl functionalized urethane resins and mixtures thereof; most especially the amorphous copolymerizable resin is a vinyl functionalized urethane resin.

Exemplary vinyl ethers include but are not limited to mono (alcohol) functionalized vinyl ethers, for example 6-hydroxyhexyl vinyl ether, 4-hydroxybutyl vinyl ether, 2-hydroxyethyl vinyl ether, hydroxybutyl vinyl ether, hydroxyethyl vinyl ether, diethylene glycol monovinyl ether or 4-(hydroxyl methyl) cyclohexyl methyl vinyl ether (1,4-cyclohexanedimethanol vinyl ether); vinyl ether polyester resins that can be prepared via transesterification of hydroxyl functional polyester resins with hydroxyl functional vinyl ethers.

Exemplary vinyl esters include but are not limited to hydroxyl vinyl esters and to those prepared by any of the methods well known to those of ordinary skill in the art. The hydroxyl vinyl esters are usually prepared by the reaction of acetaldehyde with acid chlorides in the presence of tertiary amines; methods for the preparation of hydroxyl vinyl esters are known in the art.

VFUR are particularly useful as copolymerizable agent in the compositions of the invention. Preferably, the crystalline copolymerizable resin is a vinyl functionalized urethane resin (VFUR) selected from the group consisting of vinyl ether functionalized urethane resin (VEFUR), vinyl ester functionalized urethane resin (VESFUR) and mixtures thereof; more preferably the VFUR is a vinyl ether functionalized urethane resin (VEFUR).

In the context of this invention, VFUR are solid at room temperature and at atmospheric pressure; even more preferably VFUR are crystalline and solid at room temperature and at atmospheric pressure.

The VFUR has preferably a melting enthalpy ($\Delta H_m$) of at least 35, more preferably of at least 38, even more preferably of at least 40, most preferably of at least 50, especially of at least 60 J/g. The VFUR has preferably a melting enthalpy ($\Delta H_m$) of at most 400, more preferably of at most 300, even more preferably of at most 260, most preferably of at most 240, especially of at most 220, more especially of at most 210, most especially of at most 200, for example of at most 180 J/g.

Preferably, the VFUR has an $M_n$ ranging from at least 350 to at most 20000 Da. Preferably the VFUR has a $M_n$ of at least 355, more preferably of at least 360, even more preferably of at least 370, most preferably of at least 380, especially of at least 385, more especially of at least 390, most especially of at least 395, for example of at least 399, for example of at least 400. Preferably, the VFUR has a $M_n$ of at most 20000, more preferably of at most 10000, even more preferably of at most 9000, most preferably of at most 8000, especially of at most 7000, more especially of at most 6000, most especially of at most 5000, for example of at most 4000, for example of at most 3500, for example of at most 3000, for example of at most 2500, for example of at most 2200 Da, for example of at most 2180, for example of at most 2000, for example of at most 1800, for example of at most 1600, for example of at most 1500, for example of at most 1300, for example of at most 1200 Da.

Preferably, the T-WPU of the VFUR is at least 190, more preferably at least 195, even more preferably at least 200 g/mol. Preferably the T-WPU of the VFUR is at most 1500, more preferably at most 1400, even more preferably at most 1200, most preferably at most 1100, especially at most 1000, more especially at most 900, most especially at most 800, for example at most 700, for example at most 680, for example at most 650, for example at most 630, for example at most 600, for example at most 500, for example at most 400 for example at most 350 g/mol.

Preferably, the WPU of the VFUR is at least 190, more preferably at least 195, even more preferably at least 200 g/mol. Preferably the WPU of the VFUR is at most 1500, more preferably at most 1400, even more preferably at most 1200, most preferably at most 1100, especially at most 1000, more especially at most 900, most especially at most 800, for example at most 700, for example at most 680, for example at most 650, for example at most 630, for example at most 600, for example at most 500, for example at most 400 for example at most 350 g/mol.

Preferably the viscosity of the VFUR is at least 0.0001, more preferably at least 0.001, even more preferably at least 0.005, most preferably at least 0.008, especially at least 0.009, more especially at least 0.01 Pa·s. Preferably the viscosity of the VFUR is at most 30, more preferably at most 25, even more preferably at most 20, most preferably at most 15, especially at most 10, more especially at most 8, most especially at most 6, for example at most 5, for example at most 4, for example at most 3, for example at most 2 Pa·s. Preferably, the viscosity of the VFUR ranges from 0.1 to 30 Pa·s. Most preferably, the viscosity of the VFUR ranges from 0.01 to 2 Pa·s.

Preferably, the VFUR of the invention has a $T_g$ of at least −200, more preferably of at least −180, even more preferably of at least −150, most preferably of at least −125, especially of at least −100, more especially of at least −80, even more especially of at least −70, most especially of at least −50, for example of at least −40, for example of at least −35, for example of at least −20, for example of at least 0, for example of at least 10, for example of at least 20, for example of at least 30, for example of at least 35° C. Preferably, the VFUR of the invention has a $T_g$ of at most 100, more preferably of at most 90, even more preferably of at most 80, most preferably of at most 60, especially of at most 50, more especially of at most 40, most especially of at most 30, for example of at most 20, for example of at most 10, for example of at most 0, for example of at most −10, for example of at most −20, for example of at most −30° C.

Preferably the VFUR of the invention has a melting temperature ($T_m$) of at least 30, more preferably of at least 40° C. Preferably, the VFUR of the invention has a $T_m$ of at most 200, more preferably of at most 180, even more preferably of at most 160, most preferably of at most 140, especially of at most 120, more especially of at most 110, most especially of at most 100° C.

Preferably the VFUR of the invention has a crystallization temperature ($T_c$) of at least 30, more preferably of at least 40° C. Preferably, the VFUR of the invention has a $T_m$ of at most 200, more preferably of at most 180, even more preferably of at most 160, most preferably of at most 140, especially of at most 120, more especially of at most 100, most especially of at most 90° C.

In PCC A the amount of VFUR is preferably at least 4, more preferably at least 4.5, even more preferably at least 6, most preferably at least 7, especially at least 8, more especially at least 9, even more especially at least 15, most especially at least 18, for example at least 19, for example at least 20, for example at least 24% w/w based on the total amount of A1 and A2. Preferably the amount of VFUR is at most 85, more preferably at most 70, even more preferably at most 65, most preferably at most 60, especially at most 55, more especially at most 50, even more especially at most 45, for example at most 40% w/w based on the total amount of A1 and A2.

In PCC B, the amount of VFUR is preferably at least 4, more preferably at least 4.5, even more preferably at least 6, most preferably at least 7, especially at least 8, more especially at least 9, even more especially at least 15, most especially at least 18, for example at least 19, for example at least 20, for example at least 24% w/w based on the total amount of B1 and B2. Preferably the amount of VFUR is at most 85, more preferably at most 70, even more preferably at most 65, most preferably at most 60, especially at most 55, more especially at most 50, even more especially at most 45, for example at most 40% w/w based on the total amount of B1 and B2.

In case, the copolymerizable resin is a VFUR such as a VEFUR, VESFUR, VEESFUR, or a vinylester resin or a vinylether resin or a vinyl(ether-ester) resins or mixtures thereof, the acid value of the polyester resin comprising di-acid ethylenic unsaturations is preferably less than 5 mg KOH per g polyester resin comprising di-acid ethylenic unsaturations, more preferably less than 2 mg KOH per g polyester polyester resin comprising di-acid ethylenic unsaturations. In case the copolymerizable resin in the composition of the invention is different from a VFUR such as a VEFUR, VESFUR, VEESFUR, or a vinylester resin or a vinylether resin or a vinyl(ether-ester) resins or mixtures thereof, then the polyester resin comprising di-acid ethylenic unsaturations may have an acid value as described herein. These preferred combinations of features may result in a powder coating having a better adhesion, especially to metal substrates.

Unless otherwise stated, any and all elements, preferred elements, embodiments, features or preferred combination of features or preferred combination of ranges disclosed in this application with respect to the copolymerizing agent A2 in PCC A, can be combined with each other.

Unless otherwise stated, any and all elements, preferred elements, embodiments, features or preferred combination of features or preferred combination of ranges disclosed in this application with respect to the copolymerizing agent B2 in PCC B, can be combined with each other.

Unless otherwise stated, any and all elements, preferred elements, embodiments, features or preferred combination of features or preferred combination of ranges disclosed in the invention with respect to the copolymerizable agent: i) A2 in PCC A; ii) B2 in PCC B, can be combined with each other.

Unless otherwise stated, any and all elements, preferred elements, embodiments, features or preferred combination of features or preferred combination of ranges disclosed in this application with respect to the copolymerizing agent: i) A2 in PCC A; ii) B2 in PCC B; iii) in PCC C, can be combined with each other.

5. COMPONENT A3 OF PCC A AND COMPONENT B3 OF PCC B

Unsaturated Monomer

Unless otherwise stated, the disclosure of unsaturated monomer presented herein applies equally for component A3 of PCC A and for component B3 of PCC B. Component A3 and component B3 may have the same or different unsaturated monomer and may have the same or different amounts of unsaturated monomers, as said unsaturated monomers and their amounts are disclosed herein.

Preferably, PCC A comprises a unsaturated monomer in an amount 0-0.9, more preferably in an amount 0-0.8, even more preferably in an amount 0-0.7, most preferably in an amount 0-0.6, especially in an amount 0-0.5, more especially in an amount 0-0.4, most especially in an amount 0-0.3, for example in an amount 0-0.2, for example in an amount 0-0.1, for example in an amount 0-0.05 for example in an amount 0-0.02% w/w based on the total weight of PCC A, for example PCC A does not comprise an unsaturated monomer. Preferably, PCC A comprises a unsaturated monomer in an amount of at most 0.9, preferably of at most 0.8, more preferably of at most 0.7, most preferably of at most 0.6, especially of at most 0.5, more especially of at most 0.4, most especially of at most 0.3, for example of at most 0.2, for example of at most 0.1, for example of at most 0.05, for example of at most 0.02% w/w based on the total weight of PCC A.

Preferably, PCC B comprises a unsaturated monomer in an amount 0-0.9, more preferably in an amount 0-0.8, even more preferably in an amount 0-0.7, most preferably in an amount 0-0.6, especially in an amount 0-0.5, more especially in an amount 0-0.4, most especially in an amount 0-0.3, for example in an amount 0-0.2, for example in an amount 0-0.1, for example in an amount 0-0.05 for example in an amount 0-0.02% w/w based on the total weight of PCC B, for example PCC B does not comprise an unsaturated monomer. Preferably, PCC B comprises a unsaturated monomer in an amount of at most 0.9, preferably of at most 0.8, more preferably of at most 0.7, most preferably of at most 0.6, especially of at most 0.5, more especially of at most 0.4, most especially of at most 0.3, for example of at most 0.2, for example of at most 0.1, for example of at most 0.05, for example of at most 0.02% w/w based on the total weight of PCC B.

Unless otherwise stated, any and all elements, preferred elements, embodiments, features or preferred combination of features or preferred combination of ranges disclosed in this application with respect to the unsaturated monomer A3 in PCC A, can be combined with each other.

Unless otherwise stated, any and all elements, preferred elements, embodiments, features or preferred combination of features or preferred combination of ranges disclosed in this application with respect to the unsaturated monomer B3 in PCC B, can be combined with each other.

Unless otherwise stated, any and all elements, preferred elements, embodiments, features or preferred combination of features or preferred combination of ranges disclosed in the invention with respect to the unsaturated monomer: i) A3 in PCC A; ii) B3 in PCC B, can be combined with each other.

Unless otherwise stated, any and all elements, preferred elements, embodiments, features or preferred combination of features or preferred combination of ranges disclosed in this application with respect to the unsaturated monomer: i) A3 in PCC A; ii) B3 in PCC B; iii) in PCC C, can be combined with each other.

6. COMPONENT A4 OF PCC A

Thermal Radical Initiator

PCC A comprises a thermal radical initiator A4, in an amount of at least 1 and at most 500 mmol thermally labile groups/Kg of total weight of A1 and A2, said thermal radical initiator comprising:
  A4-1: a peroxide selected from the group consisting of peresters, alkylperoxy carbonates and mixtures thereof, said peroxide is present in an amount of at least 1 and at most 245 mmol peroxy groups/Kg of total weight of A1 and A2.

It is apparent that component A4 of PCC A must contain a peroxide selected from the group consisting of peresters (also known as peroxyesters), percarbonates and mixtures thereof, said peroxide is present in an amount of at least 1 and at most 245 mmol peroxy groups/Kg of total weight of A1 and A2. A4-1 peroxide may be monomeric, oligomeric or polymeric in nature, solid or liquid (including said A4-1 peroxide in or on a carrier). The A4-1 peroxide selected from the group consisting of peresters, percarbonates and mixtures thereof, is a thermal radical initiator according to the invention.

Exemplary peresters include but are not limited to peracetates and perbenzoates, or for example t-butyl peroxybenzoate (Trigonox® C), t-butyl peroxyacetate (Trigonox® F-050), t-amyl peroxybenzoate (Trigonox® 127), t-amyl peroxyacetate (Trigonox® 133-CK60), t-butyl-2-ethylhexanoate (Trigonox® 21S), t-butylperoxydiethylacetate (Trigonox® 27), di-t-butylperoxypivalate (Trigonox® 25-075), t-butyl peroxyneoheptanoate (Trigonox® 257-075), cumylperoxyneodecanoate (Trigonox® 99-075), 2-ethylhexyl perlaurate and mixtures thereof.

Preferably, the alkylperoxy carbonate is a monopercarbonate.

Exemplary monopercarbonates include but are not limited to t-butyl peroxy-2-ethylhexylcarbonate (Trigonox® 117), t-butyl peroxyisopropylcarbonate (Trigonox® BPI075), t-amylperoxy-2-ethylhexylcarbonate (Trigonox® 131) and mixtures thereof.

Exemplary percarbonates include but are not limited to di-t-butylpercarbonate and di-2-ethylhexylpercarbonate.

Preferably, A4-1 peroxide is selected from the group consisting of peresters, monopercarbonates and mixtures thereof, said peroxide is present in an amount of at least 1 and at most 245 mmol peroxy groups/Kg of total weight of A1 and A2.

Preferably, the A4-1 peroxide is present in an amount of at least 1.1, more preferably at least 2, even more preferably at least 3, most preferably at least 4, especially at least 5, more especially at least 6, even more especially at least 7, most especially at least 8, for examples at least 9, for example at least 10 mmol peroxy groups/Kg of total weight of A1 and A2. Preferably, the A4-1 peroxide is present in an amount of at most 244, more preferably at most 240, even more preferably at most 230, most preferably at most 220, especially at most 210, more especially at most 200, even more especially at most 190, most especially at most 185, for example at most 180, for example at most 175 for example at most 170, for example at most 160, for example at most 155 mmol peroxy groups/Kg of total weight of A1 and A2.

If desired, component A4 may comprise a thermal radical initiator other than A4-1 (that is other than a peroxide selected from the group consisting of peresters, percarbonates and mixtures thereof), herein mentioned as A4-2.

A4-2 thermal radical initiator is thus different to A4-1 thermal radical initiator, consequently A4-2 thermal radical initiator is any thermal radical initiator known to the person skilled in the art for being suitable for use in the radical curing of unsaturated resins such as UR and CA, other than a peroxide selected from the group consisting of peresters, percarbonates and mixtures thereof; thus, any reference herein to A4-2 thermal radical initiator refers to thermal radical initiators not including a peroxide selected from the group consisting of peresters, percarbonates and mixtures thereof. Examples of thermal radical initiators include, but are not limited to azo compounds such as for example azo isobutyronitrile (AIBN), 1,1'-azobis(cyclohexanenitrile), 1,1'-azobis(2,4,4-trimethylpentane), peroxides and mixtures thereof. Such thermal radical initiators for example peroxides include organic and inorganic peroxides, whether solid or liquid (including peroxides in or on a carrier); also hydrogen peroxide may be applied. A4-2 may be monomeric, oligomeric or polymeric in nature; an extensive series of examples of A4-2 thermal radical initiator such as peroxides can be found, for instance in US 2002/0091214 A1, paragraph [0018], hereby incorporated by reference.

Preferably, the A4-2 thermal radical initiator is an organic or inorganic peroxide, more preferably an organic peroxide, most preferably A4-2 is a peroxide chosen from the group consisting of hydroperoxides, ketone peroxides, peroxyketals, dialkyl peroxides also known as perethers, diacyl peroxides also known as peranhydrides, preferably, A4-2 is a peroxide selected from the group consisting of (substituted) benzoyl peroxide, lauroyl peroxide, dilauroyl peroxide and mixtures thereof, more preferably A4-2 is a peroxide selected from the group consisting of (substituted) benzoyl peroxide, lauroyl peroxide and mixtures thereof, most preferably A4-2 is (substituted) benzoyl peroxide.

Exemplary hydroperoxides include but are not limited to tertiary alkyl hydroperoxides (such as, for instance, t-butyl hydroperoxide) and other hydroperoxides (such as, for instance, cumene hydroperoxide). Examples of a special class of hydroperoxides formed by the group of ketone peroxides (also known as perketones, being an addition product of hydrogen peroxide and a ketone), are for example methyl ethyl ketone peroxide, methyl isobutylketone peroxide and acetylacetone peroxide.

Exemplary peroxyketals include but are not limited to 1,1-di-(t-butylperoxy) cyclohexane (Trigonox® 22), 1,1-di(t-amylperoxy)cyclohexane (Trigonox® 122), 1,1-di(t-butylperoxy)-3,3,5-trimethylcyclohexane (Trigonox® 29) and mixtures thereof.

Exemplary perethers include but are not limited to diperethers like 2,2-di(t-butylperoxy)butane (Trigonox® D), butyl 4,4-di(t-butylperoxy)valerate (Trigonox® 17), di(t-butylperoxyisopropyl)benzene(s) (Perkadox® 14S), 2,5-dimethyl-2,5-di(t-butylperoxy)hexane (Trigonox® 101) of for example monoperethers like dicumyl peroxide (Perkadox® BC-FF), t-butyl cumyl peroxide (Trigonox® T), di-t-butyl peroxide (Trigonox® B) and mixtures thereof.

Exemplary peranhydrides include but are not limited to benzoylperoxide (BPO), bis-(4-methylbenzoyl)-peroxide, dilauroyl peroxide, lauroyl peroxide (commercially available as Laurox®), didecanoylperoxide (Perkadox® SE-10), di(3,5,5-trimethylhexanoyl)peroxide (Trigonox® 36-075) and mixtures thereof.

It is of course also possible that A4-2 thermal radical initiator is a mixture of thermal radical initiators other than the A4-1 peroxide.

If an A4-2 thermal radical initiator is present in component A4, then the total amount of A4-1 peroxide and A4-2 thermal radical initiator that make up the total amount of component A4, shall be at least 1 and at most 500 mmol thermally labile groups/Kg of total weight of A1 and A2; thus, PCC A comprises an A4, thermal radical initiator in an amount of at least 1.1, more preferably at least 2, even more preferably at least 3, most preferably at least 4, especially at least 5, more especially at least 6, even more especially at least 7, most especially at least 8, for examples at least 9, for example at least 10 mmol thermally labile groups/Kg of total weight of A1 and A2. Preferably, PCC A comprises an A4 thermal radical initiator in an amount of at most 499, more preferably at most 480, even more preferably at most 470, most preferably at most 460, especially at most 450, more especially at most 440, even more especially at most 430, most especially at most 420, for example at most 410, for example at most 400 for example at most 390, for example at most 380, for example at most 370, for example at most 360 for example at most 350, for example at most 340 for example at most 330 for example at most 320 for example at most 310 for example at most 300, for example at most 290, for example at most 280, for example at most 270, for example at most 260, for example at most 250, for example at most 244 for example at most 240 for example at most 230 for example at most 220 for example at most 210 for example at most 200 for example at most 190 for example at most 185 for example at most 180 for example at most 180, for example at most 175 for example at most 170, for example at most 160, for example at most 155, for example at most 150 for example at most 145 mmol mmol thermally labile groups/Kg of total weight of A1 and A2.

Preferably, component A4 essentially consists of component A4-1, more preferably component A4 consists of component A4-1. For example component A4 essentially consists of a peroxide selected from the group consisting of peresters, percarbonates and mixtures thereof, said peroxide is present in an amount of at least 1 and at most 245 mmol peroxy groups/Kg of total weight of A1 and A2. For example component A4 is a peroxide selected from the group consisting of peresters, percarbonates and mixtures thereof, said peroxide is present in an amount of at least 1 and at most 245 mmol peroxy groups/Kg of total weight of A1 and A2.

Unless otherwise stated, any and all elements, preferred elements, embodiments, features or preferred combination of features or preferred combination of ranges disclosed in this application with respect to the thermal radical initiator A4 in PCC A, can be combined with each other.

7. COMPONENT B4 OF PCC B

Thermal Radical Initiator

PCC B comprises a thermal radical initiator B4 in an amount of at least 1 and at most 500 mmol thermally labile groups/Kg of total weight of B1 and B2, said thermal radical initiator comprising:

B4-1: a peranhydride in an amount of at least 0.5 and at most 300 mmol peroxy groups/Kg of total weight of B1 and B2.

It is apparent that component B4 of PCC A must contain a peranhydride in an amount of at least 0.5 and at most 300 mmol peroxy groups/Kg of total weight of B1 and B2. The peranhydride may be monomeric, oligomeric or polymeric in nature, solid or liquid (including a peranhydride in or on a carrier).

Exemplary peranhydrides (also known as diacyl peroxides) include but are not limited to benzoyl peroxide (BPO), bis-(4-methylbenzoyl)-peroxide, dilauroyl peroxide, lauroyl peroxide (commercially available as Laurox®), didecanoylperoxide (Perkadox® SE-10), di(3,5,5-trimethylhexanoyl)peroxide (Trigonox® 36-075) and mixtures thereof. Preferably, the peranhydride is selected from the group consisting of benzoyl peroxide, bis-(4-methylbenzoyl)-peroxide, lauroyl peroxide, dilauroyl peroxide and mixtures thereof, more preferably from the group consisting of benzoyl peroxide, bis-(4-methylbenzoyl)-peroxide, lauroyl peroxide, and mixtures thereof, most preferably the peranhydride is selected from the group consisting of benzoyl peroxide, bis-(4-methylbenzoyl)-peroxide and mixtures thereof, especially the peranhydride is benzoyl peroxide or bis-(4-methylbenzoyl)-peroxide.

Preferably, the peranhydride is present in an amount of at least 0.55, more preferably at least 0.6, even more preferably at least 0.8, most preferably at least 1, especially at least 1.2, more especially at least 1.4, even more especially at least 1.5, most especially at least 1.6, for examples at least 1.7, for example at least 1.8, for example at least 1.9 for example at least 2 for example at least 2.2 for example at least 2.5 for example at least 3 for example at least 4, for example at least 4.5 for example at least 5 for example at least 5.5 for example at least 6 for example at least 6.5 for example at least 7 for example at least 7.5, for example at least 8, for example at least 8.5 for example at least 9 for example at least 9.5 for example at least 10 mmol peroxy groups/Kg of total weight of B1 and B2. Preferably, the peranhydride is present in an amount of at most 299, more preferably at most 290, even more preferably at most 280, most preferably at most 275, especially at most 270, more especially at most 265, even more especially at most 260, most especially at most 255, for example at most 250, for example at most 245, for example at most 240, for example at most 235, for example at most 230, for example at most 220, for example at most 210, for example at most 200 mmol peroxy groups/Kg of total weight of B1 and B2.

If desired, component B4 may comprise a thermal radical initiator other than B4-1 (that is other than a peranhydride), herein mentioned as B4-2.

B4-2 thermal radical initiator is thus different to B4-1 thermal radical initiator, consequently B4-2 thermal radical initiator is any thermal radical initiator known to the person skilled in the art for being suitable for use in the radical curing of unsaturated resins such as UR and CA, other than a peranhydride; thus, any reference herein to B4-2 thermal radical initiator does not refer to peranhydrides. Examples of thermal radical initiators include, but are not limited to azo compounds such as for example azo isobutyronitrile (AIBN), 1,1'-azobis(cyclohexanenitrile), 1,1'-azobis(2,4,4-trimethylpentane), peroxides and mixtures thereof. Such thermal radical initiators for example peroxides include organic and inorganic peroxides, whether solid or liquid (including peroxides in or on a carrier); also hydrogen peroxide may be applied. B4-2 may be monomeric, oligomeric or polymeric in nature; an extensive series of examples of B4-2 thermal radical initiator such as peroxides can be found, for instance in US 2002/0091214 A1, paragraph [0018], hereby incorporated by reference.

Preferably, the B4-2 thermal radical initiator is an organic or inorganic peroxide, more preferably an organic peroxide, most preferably B4-2 is a peroxide chosen from the group consisting of hydroperoxides (when hydroperoxides refer to PCC B are mentioned as B4-2a), ketone peroxides, peroxyketals, dialkyl peroxides also known as perethers, peroxyesters also known as peresters (when peresters refer to PCC B are mentioned as B4-2b), alkylperoxy carbonates (when alkylperoxy carbonates refer to PCC B are mentioned as B4-2c).

Exemplary peroxyketals include but are not limited to 1,1-di-(t-butylperoxy) cyclohexane (Trigonox® 22), 1,1-di(t-amylperoxy)cyclohexane (Trigonox® 122), 1,1-di(t-butylperoxy)-3,3,5-trimethylcyclohexane (Trigonox® 29) and mixtures thereof.

Exemplary perethers include but are not limited to diperethers like 2,2-di(t-butylperoxy)butane (Trigonox® D), butyl 4,4-di(t-butylperoxy)valerate (Trigonox® 17), di(t-butylperoxyisopropyl)benzene(s) (Perkadox® 14S), 2,5-dimethyl-2,5-di(t-butylperoxy)hexane (Trigonox® 101) of for example monoperethers like dicumyl peroxide (Perkadox® BC-FF), t-butyl cumyl peroxide (Trigonox® T), di-t-butyl peroxide (Trigonox® B) and mixtures thereof.

Exemplary hydroperoxides include but are not limited to tertiary alkyl hydroperoxides (such as, for instance, t-butyl hydroperoxide) and other hydroperoxides (such as, for instance, cumene hydroperoxide). Examples of a special class of hydroperoxides formed by the group of ketone peroxides (also known as perketones, being an addition product of hydrogen peroxide and a ketone), are for example methyl ethyl ketone peroxide, methyl isobutylketone peroxide and acetylacetone peroxide. If B4-2 comprises a hydroperoxide, then the hydroperoxide is present in an amount 0-0.5, preferably in an amount 0-4, more preferably in an amount 0-3, most preferably in an amount 0-2, especially in an amount 0-1, more especially in an amount 0-0.5 mmol peroxy groups/Kg of total weight of B1 and B2, more especially B4-2 does not comprise a hydroperoxide. If B4-2 comprises a hydroperoxide, then the hydroperoxide is present in an amount of at most 5, preferably of at most 4, more preferably of at most 3, most preferably of at most 2, especially of at most 1, more especially of at most 0.5 mmol peroxy groups/Kg of total weight of B1 and B2.

Exemplary peresters include but are not limited to peracetates and perbenzoates, or for example t-butyl peroxybenzoate (Trigonox® C), t-butyl peroxyacetate (Trigonox® F-050), t-amyl peroxybenzoate (Trigonox® 127), t-amyl peroxyacetate (Trigonox® 133-CK60), t-butyl-2-ethylhexanoate (Trigonox® 21S), t-butylperoxydiethylacetate (Trigonox® 27), di-t-butylperoxypivalate (Trigonox® 25-075), t-butyl peroxyneoheptanoate (Trigonox® 257-075), cumylperoxyneodecanoate (Trigonox® 99-075), 2-ethylhexyl perlaurate and mixtures thereof. If B4-2 comprises a perester, then the perester is present in an amount 0-25, preferably in an amount 0-20, more preferably in an amount 0-15, most preferably in an amount 0-10, especially in an amount 0-5, more especially in an amount 0-1 mmol peroxy groups/Kg of total weight of B1 and B2, more especially B4-2 does not comprise a perester. If B4-2 comprises a perester, then the perester is present in an amount of at most 25, preferably of at most 20, more preferably of at most 15, most preferably of at most 10, especially of at most 5, more especially of at most 1 mmol peroxy groups/Kg of total weight of B1 and B2.

Exemplary monopercarbonates include but are not limited to t-butyl peroxy-2-ethylhexylcarbonate (Trigonox® 117), t-butyl peroxyisopropylcarbonate (Trigonox® BPI075), t-amylperoxy-2-ethylhexylcarbonate (Trigonox® 131) and mixtures thereof. Exemplary percarbonates include but are not limited to di-t-butylpercarbonate and di-2-ethylhexylpercarbonate. If B4-2 comprises an alkylperoxy carbonate, then the alkylperoxy carbonate is present in an amount 0-25, preferably in an amount 0-20, more preferably in an amount 0-15, most preferably in an amount 0-10, especially in an amount 0-5, more especially in an amount 0-1 mmol peroxy groups/Kg of total weight of B1 and B2, more especially B4-2 does not comprise an alkylperoxy carbonate. If B4-2 comprises an alkylperoxy carbonate, then the alkylperoxy carbonate is present in an amount of at most 25, preferably of at most 20, more preferably of at most 15, most preferably of at most 10, especially of at most 5, more especially of at most 1 mmol peroxy groups/Kg of total weight of B1 and B2.

Preferably, B4 further comprises:
B4-2a: 0-5 mmol peroxy groups/Kg of total weight of B1 and B2, of a hydroperoxide; and/or
B4-2b: 0-25 mmol peroxy groups/Kg of total weight of B1 and B2, of a perester; and/or
B4-2c: 0-25 mmol peroxy groups/Kg of total weight of B1 and B2, of an alkylperoxy carbonate.

Preferably, B4 further comprises:
B4-2a: 0-5 mmol peroxy groups/Kg of total weight of B1 and B2, of a hydroperoxide; and
B4-2b: 0-25 mmol peroxy groups/Kg of total weight of B1 and B2, of a perester; and
B4-2c: 0-25 mmol peroxy groups/Kg of total weight of B1 and B2, of an alkylperoxy carbonate.

Preferably, B4-2 does not contain a peroxide selected from the group consisting of hydroperoxides, peresters, alkylperoxy carbonates and mixtures thereof.

It is of course also possible that B4-2 thermal radical initiator is a mixture of thermal radical initiators other than the B4-1 peroxide.

If an B4-2 thermal radical initiator is present in component B4, then the total amount of B4-1 (peranhydride) and B4-2 thermal radical initiator that make up the total amount of component B4, shall be at least 1 and at most 500 mmol thermally labile groups/Kg of total weight of B1 and B2; thus, PCC B comprises a B4, thermal radical initiator in an amount of at least 1.1, more preferably at least 2, even more preferably at least 3, most preferably at least 4, especially at least 5, more especially at least 6, even more especially at least 7, most especially at least 8, for examples at least 9, for example at least 10 mmol peroxy groups/Kg of total weight of B1 and B2.

Preferably, PCC B comprises a B4 thermal radical initiator in an amount of at most 499, more preferably at most 480, even more preferably at most 470, most preferably at most 460, especially at most 450, more especially at most 440, even more especially at most 430, most especially at most 420, for example at most 410, for example at most 400 for example at most 390, for example at most 380, for example at most 370, for example at most 360 for example at most 350, for example at most 340 for example at most 330 for example at most 320 for example at most 310 for example at most 300, for example at most 290, for example at most 280, for example at most 270, for example at most 260, for example at most 250, for example at most 244 for example at most 240 for example at most 230 for example at most 220 for example at most 210 for example at most 200 for example at most 190 for example at most 185 for example at most 180 for example at most 180, for example at most 175 for example at most 170, for example at most 160, for example at most 155, for example at most 150 for example at most 145 mmol thermally labile groups/Kg of total weight of B1 and B2.

Preferably, component B4 essentially consists of component B4-1, more preferably component B4 consists of component B4-1. For example component B4 essentially consists of a peranhydride said peranhydride is present in an amount of at least 0.5 and at most 300 mmol peroxy groups/Kg of total weight of B1 and B2. For example component B4 is a peranhydride, said peranhydride is present in an amount of at least 0.5 and at most 300 mmol peroxy groups/Kg of total weight of B1 and B2.

Unless otherwise stated, any and all elements, preferred elements, embodiments, features or preferred combination of features or preferred combination of ranges disclosed in this application with respect to the thermal radical initiator A4 in PCC A, can be combined with each other.

Unless otherwise stated, any and all elements, preferred elements, embodiments, features or preferred combination of features or preferred combination of ranges disclosed in this application with respect to the thermal radical initiator B4 in PCC B, can be combined with each other.

Unless otherwise stated, any and all elements, preferred elements, embodiments, features or preferred combination of features or preferred combination of ranges disclosed in this application with respect to the thermal radical initiator: i) A4 in PCC A; ii) B4 in PCC B, can be combined with each other.

Unless otherwise stated, any and all elements, preferred elements, embodiments, features or preferred combination of features or preferred combination of ranges disclosed in this application with respect to thermal radical initiator: i) A4 in PCC A; ii) B4 in PCC B, iii) in PCC C, can be combined with each other.

8. COMPONENT A5 OF PCC A

Transition Metal Substance

PCC A comprises 0-4.5 mmol metal/Kg of total weight of A1 and A2, of a transition metal substance selected from the group consisting of Co, Mn, Cu, Fe, V, Ti, transition metal compounds of Co, transition metal compounds of Mn, transition metal compounds of Cu, transition metal compounds of Fe, transition metal compounds of V, transition metal compounds of Ti, and mixtures thereof.

Examples of Transition Metal Compounds of a. Co are: Co-salts, Co-complexes, Co-organic salts, Co-organic acid salts, derivatives of Co-organic acid salts; Co-carboxylates; Co-acetoacetates;

b. Mn are: Mn-salts, Mn-complexes, Mn-organic salts, Mn-organic acid salts, derivatives of Mn-organic acid salts; Mn-carboxylates; Mn-acetoacetates;

c. Cu are: Cu-salts, Cu-complexes, Cu-organic salts, Cu-organic acid salts, derivatives of Cu-organic acid salts; Cu-carboxylates; Cu-acetoacetates;

d. Fe are: Fe-salts, Fe-complexes, Fe-organic salts, Fe-organic acid salts, derivatives of Fe-organic acid salts; Fe-carboxylates; Fe-acetoacetates;

e. V are: V-salts, V-complexes, V-organic salts, V-organic acid salts, derivatives of V-organic acid salts; V-carboxylates; V-acetoacetates;

f. Ti are: Ti-salts, Ti-complexes, Ti-organic salts, Ti-organic acid salts, derivatives of Ti-organic acid salts; Ti-carboxylates; Ti-acetoacetates.

If a transition metal compound is a salt, then the transition metal may for example be in the form of a cation e.g. $Cu^+$, $Cu^{2+}$, $Mn^{2+}$, $Mn^{3+}$.

Preferably the transition metal compounds of any one of Co, Mn, Cu, Fe, V, Ti are selected from the group consisting of salts, complexes, organic salts, organic acid salts and derivatives of organic acid salts of any one of Co, Mn, Cu, Fe, V, Ti and mixtures thereof; more preferably the transition metal compounds of any one of Co, Mn, Cu, Fe, V, Ti are selected from the group consisting of complexes, organic salts, organic acid salts and derivatives of organic acid salts of any one of Co, Mn, Cu, Fe, V, Ti and mixtures thereof; most preferably the transition metal compounds of any one of Co, Mn, Cu, Fe, V, Ti are selected from the group consisting of organic salts, organic acid salts and derivatives of organic acid salts of any one of Co, Mn, Cu, Fe, V, Ti and mixtures thereof; especially the transition metal compounds of any one of Co, Mn, Cu, Fe, V, Ti are selected from the group consisting of organic acid salts and derivatives of organic acid salts of any one of Co, Mn, Cu, Fe, V, Ti and mixtures thereof; more especially the transition metal compounds of any one of Co, Mn, Cu, Fe, Ti are selected from the group consisting of organic acid salts and derivatives of organic acid salts of any one of Co, Mn, Cu, Fe, Ti and mixtures thereof; most especially the transition metal compounds of any one of Co, Mn, Cu, Fe are selected from the group consisting of organic acid salts and derivatives of organic acid salts of any one of Co, Mn, Cu, Fe and mixtures thereof.

Examples of transition metal compounds include but are not limited to cobalt ($Co^{+2}$) ethylexanoate, cobalt ($Co^{+2}$) acetate, cobalt ($Co^{+2}$) 2,4-pentanedionate, cobalt ($Co^{+3}$) 2,4-pentanedionate, cobalt ($Co^{+2}$) 2-ethyl hexanoate, cobalt ($Co^{+2}$) stearate, manganese ($Mn^{+2}$) acetate, manganese ($Mn^{+2}$) 2,4-pentanedionate, manganese ($Mn^{+3}$) 2,4-pentanedionate, manganese ($Mn^{+2}$) 2-ethyl hexanoate copper ($Cu^{+2}$) 2,4-pentanedionate, copper ($Cu^{+2}$) ethylacetoacetate, copper ($Cu^{+2}$) 2-ethyl hexanoate, copper ($Cu^{+2}$) naphtenate, copper ($Cu^{+2}$) acetate, iron ($Fe^{+2}$) acetate, iron ($Fe^{+3}$) 2,4-pentanedionate, iron ($Fe^{+2}$) naphtenate, iron ($Fe^{+2}$) 2-ethyl hexanoate, vanadium ($V^{+4}$)oxide bis(2,4-pentanedionate), vanadium ($V^{+3}$) 2,4-pentanedionate, titanium ($Ti^{+4}$) tetra butoxide, titanium ($Ti^{+4}$) di-n-butoxide bis(2,4-pentanedionate, titanium ($Ti^{+4}$) 2-ethylhexoxide.

Preferably, PCC A comprises 0-4.5 mmol metal/Kg of total weight of A1 and A2, of a transition metal substance selected from the group consisting of transition metal compounds of Co, transition metal compounds of Mn, transition metal compounds of Cu, transition metal compounds of Fe, transition metal compounds of V, transition metal compounds of Ti and mixtures thereof.

Preferably, PCC A comprises 0-4.5 mmol metal/Kg of total weight of A1 and A2, of a transition metal substance selected from the group consisting of transition metal compounds of Co, transition metal compounds of Mn and mixtures thereof.

Preferably, PCC A comprises a transition metal substance selected from the group consisting of transition metal compounds of Co, transition metal compounds of Mn, transition metal compounds of Cu, transition metal compounds of Fe, transition metal compounds of V, transition metal compounds of Ti and mixtures thereof, said transition metal substance is present in an amount 0-4.5, preferably in an amount 0-4, more preferably in an amount 0-3.5, most preferably in an amount 0-3, especially in an amount 0-2.5, more especially in an amount 0-2, most especially in an amount 0-1.5, for example in an amount 0-1, for example in an amount 0-0.5, for example in an amount 0-0.1 mmol metal/Kg of total weight of A1 and A2, for example PCC A does not comprise said transition metal substance. Preferably, PCC A comprises a transition metal substance selected from the group consisting of transition metal compounds of Co, transition metal compounds of Mn, transition metal compounds of Cu, transition metal compounds of Fe, transition metal compounds of V, transition metal compounds of Ti and mixtures thereof, said transition metal substance is present in an amount of at most 4.5, preferably of at most 4, more preferably of at most 3.5, most preferably of at most 3, especially of at most 2.5, more especially of at most 2, most especially of at most 1.5, for example of at most 1, for example of at most 0.5, for example of at most 0.1 mmol metal/Kg of total weight of A1 and A2.

Unless otherwise stated, any and all elements, preferred elements, embodiments, features or preferred combination of features or preferred combination of ranges disclosed in this application with respect to the transition metal substance A5 in PCC A, can be combined with each other.

9. COMPONENT B5 OF PCC B

Transition Metal Substance

Preferably, PCC B comprises 0.5-50 mmol metal/Kg of total weight of B1 and B2, of a transition metal substance selected from the group consisting of Co, Mn, Cu, Fe, V, Ti, transition metal compounds of Co, transition metal compounds of Mn, transition metal compounds of Cu, transition metal compounds of Fe, transition metal compounds of V, transition metal compounds of Ti, and mixtures thereof.

Examples of Transition Metal Compounds of a. Co are: Co-salts, Co-complexes, Co-organic salts, Co-organic acid salts, derivatives of Co-organic acid salts; Co-carboxylates; Co-acetoacetates;

b. Mn are: Mn-salts, Mn-complexes, Mn-organic salts, Mn-organic acid salts, derivatives of Mn-organic acid salts; Mn-carboxylates; Mn-acetoacetates;

c. Cu are: Cu-salts, Cu-complexes, Cu-organic salts, Cu-organic acid salts, derivatives of Cu-organic acid salts; Cu-carboxylates; Cu-acetoacetates.

d. Fe are: Fe-salts, Fe-complexes, Fe-organic salts, Fe-organic acid salts, derivatives of Fe-organic acid salts; Fe-carboxylates; Fe-acetoacetates;

e. V are: V-salts, V-complexes, V-organic salts, V-organic acid salts, derivatives of V-organic acid salts; V-carboxylates; V-acetoacetates;

f. Ti are: Ti-salts, Ti-complexes, Ti-organic salts, Ti-organic acid salts, derivatives of Ti-organic acid salts; Ti-carboxylates; Ti-acetoacetates.

If a transition metal compound is a salt, then the transition metal may for example be in the form of a cation e.g. $Cu^+$, $Cu^{2+}$, $Mn^{2+}$, $Mn^{3+}$.

Preferably the transition metal compounds of any one of Co, Mn, Cu, Fe, V, Ti are selected from the group consisting of salts, complexes, organic salts, organic acid salts and derivatives of organic acid salts of any one of Co, Mn, Cu, Fe, V, Ti and mixtures thereof; more preferably the transition metal compounds of any one of Co, Mn, Cu, Fe, V, Ti are selected from the group consisting of complexes, organic salts, organic acid salts and derivatives of organic acid salts of any one of Co, Mn, Cu, Fe, V, Ti and mixtures thereof; most preferably the transition metal compounds of any one of Co, Mn, Cu, Fe, V, Ti are selected from the group consisting of organic salts, organic acid salts and derivatives of organic acid salts of any one of Co, Mn, Cu, Fe, V, Ti and mixtures thereof; especially the transition metal compounds of any one of Co, Mn, Cu, Fe, V, Ti are selected from the group consisting of organic acid salts and derivatives of organic acid salts of any one of Co, Mn, Cu, Fe, V, Ti and mixtures thereof; more especially the transition metal compounds of any one of Co, Mn, Cu, Fe, Ti are selected from the group consisting of organic acid salts and derivatives of organic acid salts of any one of Co, Mn, Cu, Fe, Ti and mixtures thereof; most especially the transition metal compounds of any one of Co, Mn, Cu, Fe are selected from the group consisting of organic acid salts and derivatives of organic acid salts of any one of Co, Mn, Cu, Fe and mixtures thereof.

Examples of transition metal compounds include but are not limited to cobalt ($Co^{+2}$) ethylexanoate, cobalt ($Co^{+2}$) acetate, cobalt ($Co^{+2}$) 2,4-pentanedionate, cobalt ($Co^{+3}$) 2,4-pentanedionate, cobalt ($Co^{+2}$) 2-ethyl hexanoate, cobalt ($Co^{+2}$) stearate, manganese ($Mn^{+2}$) acetate, manganese ($Mn^{+2}$) 2,4-pentanedionate, manganese ($Mn^{+3}$) 2,4-pentanedionate, manganese ($Mn^{+2}$) 2-ethyl hexanoate copper ($Cu^{+2}$) 2,4-pentanedionate, copper ($Cu^{+2}$) ethylacetoacetate, copper ($Cu^{+2}$) 2-ethyl hexanoate, copper ($Cu^{+2}$) naphtenate, copper ($Cu^{+2}$) acetate, iron ($Fe^{+2}$) acetate, iron ($Fe^{+3}$) 2,4-pentanedionate, iron ($Fe^{+2}$) naphtenate, iron ($Fe^{+2}$) 2-ethyl hexanoate, vanadium ($V^{+4}$)oxide bis(2,4-pentanedionate), vanadium ($V^{+3}$) 2,4-pentanedionate, titanium ($Ti^{+4}$) tetra butoxide, titanium ($Ti^{+4}$) di-n-butoxide bis(2,4-pentanedionate, titanium ($Ti^{+4}$) 2-ethylhexoxide.

Preferably, PCC B comprises 0.5-50 mmol metal/Kg of total weight of B1 and B2, of a transition metal substance selected from the group consisting of transition metal compounds of Co, transition metal compounds of Mn, transition metal compounds of Cu, transition metal compounds of Fe, transition metal compounds of V, transition metal compounds of Ti and mixtures thereof.

Preferably, PCC B comprises 0.5-50 mmol metal/Kg of total weight of B1 and B2, of a transition metal substance selected from the group consisting of transition metal compounds of Co, transition metal compounds of Mn and mixtures thereof.

Preferably, PCC B comprises a transition metal substance selected from the group consisting of transition metal compounds of Co, transition metal compounds of Mn, transition metal compounds of Cu, transition metal compounds of Fe, transition metal compounds of V, transition metal compounds of Ti and mixtures thereof, said transition metal substance is present in an amount 0.5-50, preferably in an amount 1-50, more preferably in an amount 1.5-50, most preferably in an amount 2-50, especially in an amount 2-45, more especially in an amount 2-40, most especially in an amount 2-30, for example in an amount 2-25, metal groups/Kg of total weight of B1 and B2, for example PCC B does not comprise said transition metal substance. Preferably, PCC B comprises a transition metal substance selected from the group consisting of transition metal compounds of Co, transition metal compounds of Mn, transition metal compounds of Cu, transition metal compounds of Fe, transition metal compounds of V, transition metal compounds of Ti and mixtures thereof, said transition metal substance is present in an amount of at least 0.5, preferably of at least 1, more preferably of at least 1.5, even more preferably of at least 2, most preferably of at least 2.2, especially of at least 2.4 mmol metal groups/Kg of total weight of B1 and B2. Preferably, PCC B comprises a transition metal substance selected from the group consisting of transition metal compounds of Co, transition metal compounds of Mn, transition metal compounds of Cu, transition metal compounds of Fe, transition metal compounds of V, transition metal compounds of Ti and mixtures thereof, said transition metal substance is present in an amount of at most 50, more preferably of at most 45, even more preferably of at most 40, most preferably of at most 35, especially of at most 30, more especially of at most 25 mmol metal groups/Kg of total weight of B1 and B2. Preferably, if PCC B comprises said transition metal substance, then said transition metal substance is present in an amount 2-50, even more preferably 2-40, most preferably 2-30, especially 2-25 mmol metal groups/Kg of total weight of B1 and B2.

Unless otherwise stated, any and all elements, preferred elements, embodiments, features or preferred combination of features or preferred combination of ranges disclosed in this application with respect to the transition metal substance A5 in PCC A, can be combined with each other.

Unless otherwise stated, any and all elements, preferred elements, embodiments, features or preferred combination of features or preferred combination of ranges disclosed in this application with respect to the transition metal substance B5 in PCC B, can be combined with each other.

Unless otherwise stated, any and all elements, preferred elements, embodiments, features or preferred combination of features or preferred combination of ranges disclosed in this application with respect to the transition metal substance: i) A5 in PCC A; ii) B5 in PCC B, can be combined with each other.

Unless otherwise stated, any and all elements, preferred elements, embodiments, features or preferred combination of features or preferred combination of ranges disclosed in this application with respect to the transition metal substance: i) A5 in PCC A; ii) B5 in PCC B; iii) in PCC C, can be combined with each other.

10. COMPONENT A6 OF PCC A AND COMPONENT B6 OF PCC B

Inhibitor

Unless otherwise stated, the disclosure of inhibitors presented herein applies equally for component A6 of PCC A and for component B6 of PCC B. Component A6 and component B6 may have the same or different inhibitors and may have the same or different amounts of inhibitors, as said inhibitors and their amounts are disclosed herein.

For example, the inhibitor may be added to PCC A and PCC B or alternatively may be added in the unsaturated resin comprising ethylenic unsaturations and/or in the crystalline copolymerizable resin and/or in the amorphous copolymerizable resin or alternatively the inhibitor may be added during the synthesis of the unsaturated resin comprising ethylenic unsaturations and/or during the synthesis of the crystalline copolymerizable resin and/or amorphous copolymerizable resin.

Examples of inhibitors are preferably chosen from the group consisting of phenolic compounds, stable radicals, catechols, phenothiazines, hydroquinones, benzoquinones and mixtures thereof.

Examples of phenolic compounds include 2-methoxyphenol, 4-methoxyphenol, 2,6-di-t-butyl-4-methylphenol, 2,6-di-t-butylphenol, 2,6-di-6-butyl-4-ethyl phenol, 2,4,6-trimethyl-phenol, 2,4,6-tris-dimethylaminomethyl phenol, 4,4'-thio-bis(3-methyl-6-t-butylphenol), 4,4'-isopropylidene diphenol, 2,4-di-t-butylphenol and 6,6'-di-t-butyl-2,2'-methylene di-p-cresol.

Examples of stable radicals include 1-oxyl-2,2,6,6-tetramethylpiperidine, 1-oxyl-2,2,6,6-tetramethylpiperidine-4-ol (a compound also referred to as TEMPOL), 1-oxyl-2,2,6,6-tetramethylpiperidine-4-one (a compound also referred to as TEMPON), 1-oxyl-2,2,6,6-tetramethyl-4-carboxyl-piperidine (a compound also referred to as 4-carboxy-TEMPO), 1-oxyl-2,2,5,5-tetramethylpyrrolidine, 1-oxyl-2,2,5,5-tetramethyl-3-carboxylpyrrolidine (also called 3-carboxy-PROXYL and galvinoxyl (2,6-di-t-butyl-α-(3,5-di-t-butyl-4-oxo-2,5-cyclohexadien-1-ylidene)-p-tolyloxy).

Examples of catechols include catechol, 4-t-butylcatechol, and 3,5-di-t-butylcatechol.

Examples of hydroquinones include hydroquinone, 2-methylhydroquinone, 2-t-butylhydroquinone, 2,5-di-t-butylhydroquinone, 2,6-di-t-butylhydroquinone, 2,6-dimethylhydroquinone and 2,3,5-trimethylhydroquinone.

Examples of benzoquinones include benzoquinone, 2,3,5,6-tetrachloro-1,4-benzoquinone, methylbenzoquinone, 2,6-dimethylbenzoquinone, and napthoquinone.

Other suitable inhibitors may for example be chosen from the group of an aluminium-N-nitrosophenyl hydroxylamine, a diethylhydroxylamine and a phenothiazine.

Preferably, the inhibitor is chosen from the group consisting of phenolic compounds, stable radicals, catechols, phenothiazines, hydroquinones, benzoquinones and mixtures thereof; more preferably from the group consisting of phenolic compounds, catechols, phenothiazines, hydroquinones, benzoquinones and mixtures thereof; even more preferably from the group consisting of catechols, phenothiazines, hydroquinones, benzoquinones and mixtures thereof; most preferably from the group consisting of catechols, hydroquinones, benzoquinones and mixtures thereof; especially from the group consisting of catechols, hydroquinones, benzoquinones and mixtures thereof; more especially from the group consisting of catechols, hydroquinones, and mixtures thereof; most especially from the group of hydroquinones.

Preferably, the inhibitor is chosen from the group consisting of hydroquinone, 2-methylhydroquinone, 2-t-butylhydroquinone, 2,5-di-t-butylhydroquinone, 2,6-di-t-butylhydroquinone, 2,6-dimethylhydroquinone and 2,3,5-trimethylhydroquinone, and mixtures thereof; more preferably from the group consisting of hydroquinone, 2-methylhydroquinone, 2-t butylhydroquinone, 2,5-di-t-butylhydroquinone, 2,6-di-t-butylhydroquinone, 2,6-dimethylhydroquinone and mixtures thereof; most preferably from the group consisting of hydroquinone, 2-methylhydroquinone, 2-t butylhydroquinone, 2,5-di-t-butylhydroquinone, 2,6-di-t-butylhydroquinone, and mixtures thereof; especially from the group of consisting of hydroquinone, 2-methylhydroquinone, 2-t butylhydroquinone, 2,5-di-t-butylhydroquinone, 2,6-di-t-butylhydroquinone, and mixtures thereof; especially from the group of consisting of hydroquinone, 2-t butylhydroquinone, 2,5-di-t-butylhydroquinone, 2,6-di-t-butylhydroquinone, and mixtures thereof; especially from the group of consisting of hydroquinone, 2-t butylhydroquinone and 2-methylhydroquinone, and mixtures thereof.

PCC A comprises an inhibitor in an amount of 13-5000 mg inhibitor/Kg of total weight of A1 and A2; preferably PCC A comprises an inhibitor in an amount 13-4500, more preferably in an amount 13-4000, most preferably in an amount 13-3500, especially in an amount 13-3000, more especially in an amount 13-2900, most especially in an amount 13-2800, for example in an amount 13-2600, for example in an amount 13-2500, for example in an amount 13-2400, for example in an amount 13-2300, for example in an amount 13-2200, for example in an amount 13-2100, for example in an amount 13-2000, for example in an amount 13-2500, for example in an amount 14-2500, for example in an amount 15-2500, for example in an amount 20-2500, for example in an amount 40-2500, for example in an amount 60-2500, for example in an amount 70-2500, for example in an amount 80-2500, for example in an amount 100-2500, for example in an amount 120-2500, for example in an amount 130-2500, for example in an amount 140-2500, for example in an amount 150-2500, for example in an amount 180-2500, for example in an amount 200-2500, for example in an amount 160-2250, for example in an amount 170-2000, for example in an amount 180-1800, for example in an amount 190-1700, for example in an amount 200-1600 mg inhibitor/Kg of total weight of A1 and A2. PCC A comprises an inhibitor, in an amount of at most 5000, preferably of at most 4500, more preferably of at most 4000, most preferably of at most 3500, especially of at most 3000, more especially of at most 2900, most especially of at most 2800, for example of at most 2800, for example of at most 2700, for example of at most 2600, for example of at most 2500, for example of at most 2400, for example of at most 2300, for example of at most 2200, for example of at most 2100, for example of at most 2000, for example of at most 1800 for example of at most 1700, for example of at most 1600, for example of at most 1400 for example of at most 1200 for example of at most 1000 mg inhibitor/Kg of total weight of A1 and A2. PCC A comprises an inhibitor, in an amount of at least 13, preferably at least 14, more preferably at least 15, even more preferably at least 16, most preferably at least 17, especially at least 18, more especially at least 19, even more especially at least 20, most especially at least 22, more preferably at least 25, most preferably at least 30, especially at least 40, more especially at least 60, most especially at least 80, for example at least 100, for example at least 110, for example at least 120, for example at least 130, for example at least 135, for example at least 140, for example at least 150, for example at least 160, for example at least 170, for example at least 180, for example at least 190, for example at least 200, for example at least 210, for example at least 220 mg inhibitor/Kg of total weight of total weight of A1 and A2.

PCC B comprises an inhibitor in an amount of 16-5000 mg inhibitor/Kg of total weight of B1 and B2; preferably PCC B comprises an inhibitor in an amount 16-4500, more preferably in an amount 16-4000, most preferably in an amount 16-3500, especially in an amount 16-3000, more especially in an amount 16-2900, most especially in an amount 16-2800, for example in an amount 16-2600, for example in an amount 16-2500, for example in an amount 16-2400, for example in an amount 16-2300, for example in an amount 16-2200, for example in an amount 16-2100, for example in an amount 16-2000, for example in an amount 20-2500, for example in an amount 30-2500, for example in an amount 40-2500, for example in an amount 50-2500, for example in an amount 60-2500, for example in an amount 70-2500, for example in an amount 80-2500, for example in an amount 90-2500, for example in an amount 100-2500, for example in an amount 120-2500, for example in an amount 130-2500, for example in an amount 140-2500, for example in an amount 150-2500, for example in an amount 180-2500, for example in an amount 200-2500 140-2500, for example in an amount 150-2500, for example in an amount 180-2500, for example in an amount 200-2500, for example in an amount 160-2250, for example in an amount 170-2000, for example in an amount 180-1800, for example in an amount 190-1700, for example in an amount 200-1600 mg inhibitor/Kg of total weight of B1 and B2. PCC B comprises an inhibitor, in an amount of at most 5000, preferably of at most 4500, more preferably of at most 4000, most preferably of at most 3500, especially of at most 3000, more especially of at most 2900, most especially of at most 2800, for example of at most 2800, for example of at most 2700, for example of at most 2600, for example of at most 2500, for example of at most 2400, for example of at most 2300, for example of at most 2200, for example of at most 2100, for example of at most 2000, for example of at most 1800 for example of at most 1600 for example of at most 1400, for example of at most 1200 for example of at most 1000 for example of at most 800 mg inhibitor/Kg of total weight of B1 and B2. PCC B comprises an inhibitor, in an amount of at least 16, preferably of at least 20, more preferably of at least 30, even more preferably of at least 40, most preferably of at least 50, especially of at least 60, more especially of at least 70, even more especially of at least 80, most especially of at least 100, more preferably of at least 120, most preferably of at least 130, especially of at least 135, more especially of at least 140, most especially of at least 150, for example of at least 160, for example of at least 170, for example of at least 180, for example of at least 190, for example of at least 200, for example of at least 210, for example of at least 220 mg inhibitor/Kg of total weight of B1 and B2.

Unless otherwise stated, any and all elements, preferred elements, embodiments, features or preferred combination of features or preferred combination of ranges disclosed in this application with respect to the inhibitor A6 in PCC A can be combined with each other.

Unless otherwise stated, any and all elements, preferred elements, embodiments, features or preferred combination of features or preferred combination of ranges disclosed in this application with respect to the inhibitor B6 in PCC B can be combined with each other.

Unless otherwise stated, any and all elements, preferred elements, embodiments, features or preferred combination of features or preferred combination of ranges disclosed in this application with respect to the inhibitor: i) A6 in PCC A; ii) B6 in PCC B, can be combined with each other.

Unless otherwise stated, any and all elements, preferred elements, embodiments, features or preferred combination of features or preferred combination of ranges disclosed in this application with respect to the inhibitor: i) A6 in PCC A; ii) B6 in PCC B; iii) in PCC C, can be combined with each other.

11. COMPONENT A7 OF PCC A AND COMPONENT B7 OF PCC B

Thiol

Unless otherwise stated, the disclosure of thiol presented herein applies equally for component A7 of PCC A and for component B7 of PCC B. Component A7 and component B7 may have the same or different thiols and may have the same or different amounts of thiols, as said thiols and their amounts are disclosed herein.

Examples of suitable thiols include but are not limited to aliphatic thiols, more preferably primary aliphatic thiols. The aliphatic thiol is preferably an α-mercapto acetate, a β-mercapto propionate, a dodecylmercaptane or a mixture thereof. The thiol-functionality of the thiols in one or both of PCC A and PCC B, is preferably ≥2, more preferably ≥3.

Preferably, PCC A comprises a thiol in an amount 0-5, more preferably in an amount 0-4.5, even more preferably in an amount 0-4, most preferably in an amount 0-3.5, especially in an amount 0-3, more especially in an amount 0-2.5, most especially in an amount 0-2, for example in an amount 0-1.5, for example in an amount 0-1, for example in an amount 0-0.5 for example in an amount 0-0.1 mmol thiol groups/Kg of total weight of A1 and A2, for example PCC A does not comprise a thiol. Preferably, PCC A comprises a thiol in an amount of at most 5, preferably of at most 4.5, more preferably of at most 4, most preferably of at most 3.5, especially of at most 3, more especially of at most 2.5, most especially of at most 2, for example of at most 1.5, for example of at most 1, for example of at most 0.5, for example of at most 0.1 mmol thiol groups/Kg of total weight of A1 and A2.

Preferably, PCC B comprises a thiol in an amount 0-5, more preferably in an amount 0-4.5, even more preferably in an amount 0-4, most preferably in an amount 0-3.5, especially in an amount 0-3, more especially in an amount 0-2.5, most especially in an amount 0-2, for example in an amount 0-1.5, for example in an amount 0-1, for example in an amount 0-0.5 for example in an amount 0-0.1 mmol thiol groups/Kg of total weight of B1 and B2, for example PCC B does not comprise a thiol. Preferably, PCC B comprises a thiol in an amount of at most 5, preferably of at most 4.5, more preferably of at most 4, most preferably of at most 3.5, especially of at most 3, more especially of at most 2.5, most especially of at most 2, for example of at most 1.5, for example of at most 1, for example of at most 0.5, for example of at most 0.1 mmol thiol groups/Kg of total weight of B1 and B2.

Unless otherwise stated, any and all elements, preferred elements, embodiments, features or preferred combination of features or preferred combination of ranges disclosed in this application with respect to the thiol A7 in PCC A can be combined with each other.

Unless otherwise stated, any and all elements, preferred elements, embodiments, features or preferred combination of features or preferred combination of ranges disclosed in this application with respect to the thiol B7 in PCC B can be combined with each other.

Unless otherwise stated, any and all elements, preferred elements, embodiments, features or preferred combination of features or preferred combination of ranges disclosed in this application with respect to the thiol: i) A7 in PCC A; ii) B7 in PCC B, can be combined with each other.

Unless otherwise stated, any and all elements, preferred elements, embodiments, features or preferred combination of features or preferred combination of ranges disclosed in this application with respect to the thiol: i) A7 in PCC A; ii) B7 in PCC B; iii) in PCC C, can be combined with each other.

12. COMPONENT A8 OF PCC A AND COMPONENT B8 OF PCC B

Acetoacetamide Compound

Unless otherwise stated, the disclosure of acetoacetamide compounds presented herein applies equally for component A8 of PCC A and for component B8 of PCC B. Component A8 and component B8 may have the same or different acetoacetamide compound and may have the same or different amounts of acetoacetamide compound, as said acetoacetamide compounds and their amounts are disclosed herein.

Preferably, PCC A comprises an acetoacetamide compound in an amount 0-200, more preferably in an amount 0-180, even more preferably in an amount 0-160, most preferably in an amount 0-140, especially in an amount 0-120, more especially in an amount 0-100, most especially in an amount 0-80, for example in an amount 0-60, for example in an amount 0-40, for example in an amount 0-20, for example in an amount 0-10, for example in an amount 0-5, for example in an amount 0-2, for example in an amount 0-1, mmol acetoacetamide compound/Kg of total weight of A1 and A2, for example PCC A does not comprise acetoamide. Preferably, PCC A comprises an acetoacetamide compound in an amount of at most 200, preferably of at most 180, more preferably of at most 160, most preferably of at most 140, especially of at most 120, more especially of at most 100, most especially of at most 80, for example of at most 60, for example of at most 40, for example of at most 20, for example of at most 10, for example of at most 5, for example of at most 2, for example of at most 1 mmol acetoacetamide compound/Kg of total weight of A1 and A2.

Preferably, PCC B comprises an acetoacetamide compound in an amount 0-5, more preferably in an amount 0-4.5, even more preferably in an amount 0-4, most preferably in an amount 0-3.5 especially in an amount 0-3, more especially in an amount 0-2.5, most especially in an amount 0-2, for example in an amount 0-1.5, for example in an amount 0-1, for example in an amount 0-0.5, for example in an amount 0-0.3, for example in an amount 0-0.2, for example in an amount 0-0.1, for example in an amount 0-0.5, mmol acetoacetamide compound/Kg of total weight of B1 and B2, for example PCC B does not comprise acetoamide. Preferably, PCC B comprises an acetoacetamide compound in an amount of at most 5, preferably of at most 4.5, more preferably of at most 4, most preferably of at most 3.5, especially of at most 3, more especially of at most 2.5, most especially of at most 2, for example of at most 1.5, for example of at most 1, for example of at most 0.5, for example of at most 0.3, for example of at most 0.2, for example of at most 0.1, for example of at most 0.05 mmol acetoacetamide compound/Kg of total weight of B1 and B2.

Unless otherwise stated, any and all elements, preferred elements, embodiments, features or preferred combination of features or preferred combination of ranges disclosed in this application with respect to the acetoacetamide compound A8 in PCC A can be combined with each other.

Unless otherwise stated, any and all elements, preferred elements, embodiments, features or preferred combination of features or preferred combination of ranges disclosed in this application with respect to the acetoacetamide compound B8 in PCC B can be combined with each other.

Unless otherwise stated, any and all elements, preferred elements, embodiments, features or preferred combination of features or preferred combination of ranges disclosed in this application with respect to the acetoacetamide compound: i) A8 in PCC A; ii) B8 in PCC B, can be combined with each other.

Unless otherwise stated, any and all elements, preferred elements, embodiments, features or preferred combination of features or preferred combination of ranges disclosed in this application with respect to the acetoacetamide compound: i) A8 in PCC A; ii) B8 in PCC B; iii) in PCC C, can be combined with each other.

13. COMPONENT A9 OF PCC A AND COMPONENT B9 OF PCC B

1,2,3 Trihydroxy Aryl Compound

Unless otherwise stated, the disclosure of 1,2,3 trihydroxy aryl compounds presented herein applies equally for component A9 of PCC A and for component B9 of PCC B. Component A9 and component B9 may have the same or different 1,2,3 trihydroxy aryl compound and may have the same or different amounts of 1,2,3 trihydroxy aryl compound, as said 1,2,3 trihydroxy aryl compounds and their amounts are disclosed herein.

PCC A may comprise a 1,2,3 trihydroxy aryl compound; If PCC A comprises a transition metal substance, and said transition metal substance comprises one or both of Cu and a transition metal compound of Cu, then preferably, PCC A comprises a 1,2,3 trihydroxy aryl compound in an amount 0-10, more preferably in an amount 0-9, even more preferably in an amount 0-8, most preferably in an amount 0-7, especially in an amount 0-6, more especially in an amount 0-5, most especially in an amount 0-4, for example in an amount 0-3, for example in an amount 0-2, for example in an amount 0-1, for example in an amount 0-0.5, for example in an amount 0-0.4, for example in an amount 0-0.2, for example in an amount 0-0.1, mmol 1,2,3 trihydroxy aryl compound/Kg of total weight of A1 and A2, for example PCC A does not comprise a 1,2,3 trihydroxy aryl compound. Preferably, PCC A comprises an 1,2,3 trihydroxy aryl compound in an amount of at most 10, preferably of at most 9, more preferably of at most 8, most preferably of at most 7, especially of at most 6, more especially of at most 5, most especially of at most 4, for example of at most 3, for example of at most 2, for example of at most 1, for example of at most 0.5, for example of at most 0.3, for example of at most 0.2, for example of at most 0.1 mmol 1,2,3 trihydroxy aryl compound/Kg of total weight of A1 and A2.

PCC B may comprise a 1,2,3 trihydroxy aryl compound; If PCC B comprises a transition metal substance, and said transition metal substance comprises one or both of Cu and a transition metal compound of Cu, then preferably, PCC B comprises a 1,2,3 trihydroxy aryl compound in an amount 0-5, more preferably in an amount 0-4.5, even more preferably in an amount 0-4, most preferably in an amount 0-3.5, especially in an amount 0-3, more especially in an amount 0-2.5, most especially in an amount 0-2, for example in an amount 0-1.5, for example in an amount 0-1, for example in an amount 0-0.5, for example in an amount 0-0.3, for example in an amount 0-0.2, for example in an amount 0-1, for example in an amount 0-0.5, mmol 1,2,3 trihydroxy aryl compound/Kg of total weight of B1 and B2, for example PCC B does not comprise acetoamide. Preferably, PCC B comprises an 1,2,3 trihydroxy aryl compound in an amount of at most 5, preferably of at most 4.5, more preferably of at most 4, most preferably of at most 3.5, especially of at most 3, more especially of at most 2.5, most especially of at most 2, for example of at most 1.5, for example of at most 1, for example of at most 0.5, for example of at most 0.3, for example of at most 0.2, for example of at most 0.1, for example of at most 0.05 mmol 1,2,3 trihydroxy aryl compound/Kg of total weight of B1 and B2.

Preferably, PCC A does not comprise a 1,2,3 trihydroxy aryl compound.

Preferably, PCC B does not comprise a 1,2,3 trihydroxy aryl compound.

Unless otherwise stated, any and all elements, preferred elements, embodiments, features or preferred combination of features or preferred combination of ranges disclosed in this application with respect to the 1,2,3 trihydroxy aryl compound A9 in PCC A can be combined with each other.

Unless otherwise stated, any and all elements, preferred elements, embodiments, features or preferred combination of features or preferred combination of ranges disclosed in this application with respect to the 1,2,3 trihydroxy aryl compound B9 in PCC B can be combined with each other.

Unless otherwise stated, any and all elements, preferred elements, embodiments, features or preferred combination of features or preferred combination of ranges disclosed in this application with respect to the 1,2,3 trihydroxy aryl compound: i) A9 in PCC A; ii) B9 in PCC B, can be combined with each other.

Unless otherwise stated, any and all elements, preferred elements, embodiments, features or preferred combination of features or preferred combination of ranges disclosed in this application with respect to the 1,2,3 trihydroxy aryl compound: i) A9 in PCC A; ii) B9 in PCC B; iii) in PCC C, can be combined with each other.

14. COMPONENT A10 OF PCC A AND COMPONENT B10 OF PCC B

Free Amine

Unless otherwise stated, the disclosure of free amine presented herein applies equally for component A10 of PCC A and for component B10 of PCC B. Component A10 and component B10 may have the same or different free amine and may have the same or different amounts of free amine, as said free amines and their amounts are disclosed herein.

Examples of free amines include but are not limited to tertiary aliphatic amines, tertiary aromatic amines, aromatic amines, polyamines and their corresponding ammonium salts.

Examples of tertiary aromatic amines include but are not limited to N,N-dimethylaniline, N,N-diethylaniline; toluidines and xylidines such as N,N-diiosopropanol-para-toluidine, N,N-dimethyl-p-toluidine, N,N-bis(2-hydroxyethyl) xylidine, N,N-dimethylnaphtylamine, N,N-dimethyl toluidine and ethyl N,N-dimethylamino benzoate.

PCC A may comprise a free amine; preferably PCC A comprises a free amine in an amount 0-100, more preferably in an amount 0-90, even more preferably in an amount 0-80, most preferably in an amount 0-70, especially in an amount 0-60, more especially in an amount 0-50, most especially in an amount 0-40, for example in an amount 0-30, for example in an amount 0-20, for example in an amount 0-15, for example in an amount 0-10 mmol free amine/Kg of total weight of A1 and A2, for example PCC A does not comprise a free amine. Preferably, PCC A comprises a free amine in an amount of at most 100, preferably of at most 90, more preferably of at most 80, most preferably of at most 70, especially of at most 60, more especially of at most 50, most especially of at most 40, for example of at most 30, for example of at most 20, for example of at most 15, for example of at most 10 mmol free amine/Kg of total weight of A1 and A2. Preferably, PCC A comprises a free amine in an amount of at least 1, preferably of at least 2, more preferably of at least 4, most preferably of at least 6, especially of at least 8, more especially of at least 10, most especially of at least 12, for example of at least 14, for example of at least 16, for example of at least 18, for example of at least 20 mmol free amine/Kg of total weight of A1 and A2.

If PCC A comprises a thermal radical initiator and a free amine, then preferably, PCC A comprises a thermal radical initiator and a free amine in a ratio L of at least 1.1, more preferably of at least 1.5, even more preferably of at least 1.8, most preferably of at least 2, especially of at least 2.5, more especially of at least 3, most especially of at least 3.5, for example of at least 4, for example of at least 4.5, for example of at least 5, for example of at least 5.5, for example of at least 6. Preferably, PCC A comprises comprises a thermal radical initiator and a free amine in a ratio L of at most 500, more preferably of at most 200, even more preferably of at most 100, most preferably of at most 90, especially of at most 80, more especially of at most 70, most especially of at most 60, for example of at most 50, for example of at most 40, for example of at most 30, for example of at most 28, for example of at most 25.

PCC B may comprise a free amine; preferably PCC B comprises a free amine in an amount 0-100, more preferably in an amount 0-90, even more preferably in an amount 0-80, most preferably in an amount 0-70, especially in an amount 0-60, more especially in an amount 0-50, most especially in an amount 0-40, for example in an amount 0-30, for example in an amount 0-20, for example in an amount 0-15, for example in an amount 0-10 mmol free amine/Kg of total weight of B1 and B2, for example PCC B does not comprise a free amine. Preferably, PCC B comprises a free amine in an amount of at most 100, preferably of at most 90, more preferably of at most 80, most preferably of at most 70, especially of at most 60, more especially of at most 50, most especially of at most 40, for example of at most 30, for example of at most 20, for example of at most 15, for example of at most 10 mmol free amine/Kg of total weight of B1 and B2. Preferably, PCC B comprises a free amine in an amount of at least 1, preferably of at least 2, more preferably of at least 4, most preferably of at least 6, especially of at least 8, more especially of at least 10, most especially of at least 12, for example of at least 14, for example of at least 16, for example of at least 18, for example of at least 20 mmol free amine/Kg of total weight of B1 and B2.

If PCC B comprises a thermal radical initiator and a free amine, then preferably, PCC B comprises a thermal radical initiator and a free amine in a ratio L of at least 1.1, more preferably of at least 1.5, even more preferably of at least 1.8, most preferably of at least 2, especially of at least 2.5, more especially of at least 3, most especially of at least 3.5, for example of at least 4, for example of at least 4.5, for example of at least 5, for example of at least 5.5, for example of at least 6. Preferably, PCC B comprises comprises a thermal radical initiator and a free amine in a ratio L of at most 500, more preferably of at most 200, even more preferably of at most 100, most preferably of at most 90, especially of at most 80, more especially of at most 70, most especially of at most 60, for example of at most 50, for example of at most 40, for example of at most 30, for example of at most 28, for example of at most 25.

Unless otherwise stated, any and all elements, preferred elements, embodiments, features or preferred combination of features or preferred combination of ranges disclosed in this application with respect to the free amine A10 in PCC A can be combined with each other.

Unless otherwise stated, any and all elements, preferred elements, embodiments, features or preferred combination of features or preferred combination of ranges disclosed in this application with respect to the free amine B10 in PCC B can be combined with each other.

Unless otherwise stated, any and all elements, preferred elements, embodiments, features or preferred combination of features or preferred combination of ranges disclosed in this application with respect to the free amine: i) A10 in PCC A; ii) B10 in PCC B, can be combined with each other.

Unless otherwise stated, any and all elements, preferred elements, embodiments, features or preferred combination of features or preferred combination of ranges disclosed in this application with respect to the free amine: i) A10 in PCC A; ii) B10 in PCC B; iii) in PCC C, can be combined with each other.

15. OTHER COMPONENTS OF PCC A, PCC B AND PCC C

One or multiple of PCC A, PCC B, PCC C in any combination, may further comprise waxes, pigments, fillers, degassing agents, flow (smoothness) agents, appearance enhancing agents, photoinitiators, stabilizers such as light stabilizers. It should be noted that none of these usual additives are considered to be transition metal compounds; in other words transition metal compounds do not include any one of these usual additives. The pigments may be inorganic or organic. Suitable inorganic pigments include for example, titanium dioxide, zinc sulphide, zinc phosphate, mica, iron oxide and chromium oxide. Suitable organic pigments include for example azo compounds. Suitable fillers include for example metal oxides, silicates, carbonates and sulphates. Suitable stabilizers include for example primary and/or secondary antioxidants and UV stabilizers for example quinones, (sterically hindered) phenolic compounds, phosphonites, phosphites, thioethers and light stabilizers. Examples of suitable degassing agents include cyclohexane dimethanol bisbenzoate, benzoin and benzoin derivatives such as for example those described in WO02/50194, the relevant passages of which are incorporated herein by reference. Examples of flow agents include Byk® 361 N and Resiflow® PV-5.

Photoinitiators that may be incorporated in one or multiple of PCC A, PCC B, PCC C, in any combination, are well known in the art. Suitable photoinitiators can be acyl phosphines such as 2,4,6-trimethylbenzoyl diphenyl phosphine oxide or they may have ketone functionalities and can be aromatic such as for example benzophenone. Examples of suitable photoinitiators, which are known as alpha-cleavage free radical photoinitiators, include benzoin and its derivatives, for example, benzoin ethers, such as isobutyl benzoin ether and benzyl ketals, such as benzyl dimethyl ketal, 2-hydroxy-2-methyl-1-phenylpropan-1-one and 4-(2-hydroxyethoxy) phenyl-2-hydroxy-2-propyl ketone. Others include acyl phosphines, such as 2,4,6-trimethylbenzoyl diphenylphosphine oxide. Aryl ketones can also be used, such as 1-hydroxycyclohexyl phenyl ketone, 2,2-dimethoxy-2-phenylaceto-phenone, mixture of benzophenone and 1-hydroxycyclohexyl phenyl ketone and 2-methyl-1-(4-(methylthiophenyl)-2-(4-morpholinyl))-1-propanone.

Hydrogen abstraction type of photoinitiators can be used in combination with the above or alone such as benzophenone, thioxanthone, anthroquinone, d,l-camphorquinone, ethyl d,l-camphorquinone, ketocoumarin, anthracene, or derivatives thereof, and the like. Cationic polymerization, especially with vinyl ether containing crosslinkers, can proceed via cationic cure using cationic photoinitiators. Major classes of ionic photoinitiators are diaryliodonium salts and copper synergists, such as diphenyl iodonium hexafluorophosphate, dibenzyl iodonium hexaflouroarsinate and copper acetate, triarylsulfonium salts, such as triphenyl sulphonium hexafluorophosphate, triphenyl sulphonium tertafluoroborate. Dialkylphenacyl-sulfonium salts, hexafluorophosphate, alpha-sulfonyloxy ketone, and silyl benzyl ethers can be used as well. Preferably, the photoinitiators used herein are solids. If liquid initiators are used, however, preferably they are absorbed on solid carriers, such as fumed silica, prior to incorporation in one or multiple of PCC A, PCC B, PCC C in any combination. In general, the amount of photoinitiator used in one or multiple of PCC A, PCC B, PCC C, in any combination, ranges from 0.1 to 10, preferably from 1 to 5 pph. Exemplary photoinitiators include but are not limited to 1-hydroxy-cyclohexyl ketone (Irgacure® 184), 2-hydroxy-2-methyl-1-phenyl-propanone (Darocur® 1173), α,α-dimethoxy-α-phenylacetophenone (Irgacure® 651), phenyl bis (2,4,6-trimethylbenzoyl) phosphineoxide, (Irgacure® 819), and diphenyl (2,4,6-trimethylbenzoyl) phosphine oxide (Darocur® TPO). Irgacure®, and Darocur® are trademarks of BASF.

Preferably, PPC A does not comprise a photoinitiator.
Preferably, PCC B does not comprise a photoinitiator.
Preferably, PCC C does not comprise a photoinitiator.
Preferably, PCC A and PCC B and PCC C do not comprise a photoinitiator.

One or both of PCC A and PCC B can be cured via heat (heat-curable thermosetting powder coating composition) and/or radiation (radiation curable thermosetting powder coating composition). Preferably, one or both of PCC A and PCC B is/are heat-curable without being necessary to use radiation for curing; more preferably PCC A and PCC B are each heat-curable.

Other additives, such as additives for improving tribochargeability may also be added as well as nucleating agents may also be present in the composition of the invention in order to facilitate the crystallization of any crystalline component of one or both of PCC A and PCC B.

Unless otherwise stated, any and all elements, preferred elements, embodiments, features or preferred combination of features or preferred combination of ranges disclosed in § 15 for PCC A and any compound discussed § 15 in may be combined with each other.

Unless otherwise stated, any and all elements, preferred elements, embodiments, features or preferred combination of features or preferred combination of ranges disclosed in § 15 for PCC B and any compound discussed § 15 in may be combined with each other.

Unless otherwise stated, any and all elements, preferred elements, embodiments, features or preferred combination of features or preferred combination of ranges disclosed in this application with respect to any compound disclosed in § 15 for: i) the PCC A; ii) the PCC B, can be combined with each other.

Unless otherwise stated, any and all elements, preferred elements, embodiments, features or preferred combination of features or preferred combination of ranges disclosed in this application with respect to any compound disclosed in § 15 for: i) the PCC A; ii) for the PCC B, iii) the PCC C, can be combined with each other.

16. OTHER ASPECTS AND EMBODIMENTS OF THE INVENTION

In another aspect the invention provides for a process for making a cured thermosetting powder coating composition comprising the step of curing the thermosetting powder coating composition of the invention.

In another aspect, the invention provides for a cured thermosetting powder coating composition derived upon curing of the thermosetting powder coating composition of the invention; preferably the cured thermosetting powder coating composition is obtainable by the process for making the cured thermosetting powder coating composition. For example, the cured thermosetting powder coating composition may be derived from or is obtainable by a 3D-printing process.

In another aspect, the invention relates to an article of any shape, size or form, for example a substrate, having coated and cured thereon a thermosetting powder coating composition as defined herein. Preferably, said article is selected from the group consisting of heat-sensitive articles and non-heat sensitive articles; more preferably said article is selected from the group consisting of wood for example low density fibre board, medium density fibreboard and high density fibreboard, plastic, thermoplastic composite, thermoset composite, fibre reinforced composites, sandwich materials e.g. sandwich materials comprising heat sensitive foam core, metal and combinations thereof.

Heat-sensitive articles for example heat-sensitive substrates, include plastic articles, wood articles for example solid wood, such as for example: hard wood, soft wood, plywood; veneer, particle board, low density fibre board (LDF), medium density fibreboard (MDF) and high density fibreboard (HDF), OSB (Oriented Strand Board) wood laminates, chipboard and other articles in which wood is an important constituent, such as for example foil covered wooden articles, engineered wood, plastic modified wood, plastic articles or wood plastic compounds (WPC); articles with cellulosic fibres, for example cardboard or paper articles; textile and leather articles. Examples of plastic articles include unsaturated polyester resin based compositions, ABS (acrylonitril butadiene styrene), melamine-formaldehyde resins, polycarbonate, polyethylene, polypropylene, ethylene-propylene-diene monomer (EPDM), thermoplastic olefin (TPO), polyurethane (PU), polypropylene oxide (PPO), polyethylene oxide (PEO), polyethyleneterephthalate and nylon, for example polyamide 6,6 and mixtures thereof, for example polycarbonate-ABS. Other heat-sensitive articles include objects that are a combination of a non-heat-sensitive part such as metal parts with a heat-sensitive part, such as any one of the aforementioned for example plastic hosing with heavy metal parts, strips for example aluminium frames with heat strips etc.

Specific wood coating markets where the thermosetting powder coating compositions of the invention may be used include domestic furniture, such as tables, chairs, cabinets, etc., bedroom and bathroom furniture, office furniture, contract furniture such as school and child furniture, hospital furniture, restaurant and hotel furniture, kitchen cabinets and furniture, (flat) panels for interior design, interior and exterior windows and doors, interior and exterior window frames and door frames, exterior and interior sidings and wooden flooring.

Specific plastic coating markets where thermosetting powder coating compositions of the invention may be used include automotive applications, such as interior car parts, wheel covers, bumpers, under the hood parts etc., flexible flooring, sporting goods, cosmetics, audio-visual applications, such as TV sets, computer housing, phones, etc., household appliances and satellite dishes.

Typical examples of non-heat-sensitive articles include glass, ceramic, composite, fibre cement board, or metal, for example aluminum, copper or steel articles, for instance carbon steel, where the main alloying constituent is carbon. Carbon steel usually contains carbon 0.2 and 1.5% w/w based on the total alloy composition and often contains other constituents such as manganese, chromium, nickel, molybdenum, copper, tungsten, cobalt, or silicon, depending on the desired steel properties. Steel has properties similar to iron if the amount of carbon is not too high, for example not more than 1.5% w/w based on the total alloy composition. The steel may be surface treated (treatment with zinc, or zinc phosphate or iron phosphate etc.) or non-surface treated.

In another aspect, the invention relates to a cured thermosetting powder composition of the invention; preferably said cured thermosetting powder composition of the invention is a powder coating. The cured thermosetting powder composition of the invention is derived upon partial or full cure of the thermosetting powder coating composition of the invention.

In another aspect, the invention relates to the use of any one of the compositions according to the invention to fully or partially coat an article.

In another embodiment the invention relates to the use of any one of the compositions of the invention to coat a heat-sensitive article preferably wood for example low density fibre board, medium density fibreboard and high density fibreboard, plastic, etc., or combinations thereof.

In another aspect, the invention relates to an article that is fully or partially coated with any one of the compositions of the invention.

In one embodiment of the invention the substrate is a non-heat-sensitive substrate, for example glass, ceramic, fibre cement board, or metal, for example aluminum, copper or steel, preferably metal.

In yet another embodiment, the invention provides for a use of the composition of the invention to coat a heat-sensitive article as defined herein and/or a non-heat-sensitive article as defined herein.

In yet another embodiment, the invention provides for a use of the thermosetting powder coating compositions of the invention to coat an article wherein the article is a heat-sensitive article for example wood such as low density fibre board, medium density fibreboard and high density fibreboard, plastic and combinations thereof.

In yet another embodiment, the invention provides for a use of the thermosetting powder coating compositions of the invention to coat an article wherein the article is a non-heat-sensitive article for example glass, ceramic, composite, fibre cement board, or metal, for example aluminum, copper or steel articles, for instance carbon steel.

In yet another embodiment, the invention provides for a use of the thermosetting powder coating compositions of the invention to coat an article wherein the article is a heat-sensitive article for example wood such as low density fibre board, medium density fibreboard and high density fibreboard, plastic and combinations thereof and also to coat an article wherein the article is a non-heat-sensitive article for example glass, ceramic, composite, fibre cement board, or metal, for example aluminum, copper or steel articles, for instance carbon steel.

In another aspect of the invention there is provided a use of:
- a thermosetting powder coating composition of the invention; or
- a cured thermosetting powder coating composition of the invention (or equally an object of any shape, size or form); or
- an article as disclosed herein, in powder coatings, powder coatings for heat-sensitive articles, powder coatings for non-heat-sensitive articles, 3D-printing, automotive applications (car parts, agricultural machines, composite structures, ceramic structures, etc.), marine applications (ships, boats), aerospace applications (planes, helicopters, composite structures, ceramic structures, etc.), medical applications (artificial joints, meshes, woven or non-woven sheets, tapes, ribbons, bands, cables, tube-like products for e.g. ligament replacement, composite structures, ceramic structures, etc.), defense applications (ballistic protection, body armor, ballistic vests, ballistic helmets, ballistic vehicle protection, composite structures, ceramic structures, etc.), sports/recreational applications (fencing, skates, skateboarding, snowboarding, suspension lines on sport parachutes, paragliders, kites, kite lines for kite sports, climbing equipment, composite structures, ceramic structures, etc.), architectural applications (windows, doors, (pseudo-)walls, cables, etc.), bottling applications, household applications (household appliances, white-goods, furniture, computer housings, etc.), machinery applications (can and bottle handling machine parts, moving parts on weaving machines, bearings, gears, composite structures, ceramic structures, computer housings, etc.), can applications, coil applications, energy applications for e.g. generators for wind, tide or solar energy, textile applications for e.g. fabrics, this can be very broad from impregnation technical textiles to for example complete composites both as coating and as a binder for composites, and electrical applications for e.g. cabinets for electrical wire or switch boards.

In another aspect the invention further relates to the use of PCC A for a 2K thermosetting powder coating composition.

In another aspect the invention further relates to the use of PCC A for a cured thermosetting powder coating composition of the invention.

In another aspect the invention further relates to the use of PCC B for a 2K thermosetting powder coating composition.

In another aspect the invention further relates to the use of PCC B for a cured thermosetting powder coating composition of the invention.

In another aspect the invention further relates to the use of PCC A for a 2K thermosetting powder coating composition that is heat-curable at low temperatures.

In another aspect the invention further relates to the use of PCC B for a 2K thermosetting powder coating composition that is heat-curable at low temperatures.

In another aspect the invention further relates to the use of PCC C for a cured thermosetting powder coating composition of the invention.

In another aspect the invention further relates to the use of PCC C for heat-curing at low temperatures.

In another aspect the invention further relates to a method (herein mentioned as "method X") for making a cured thermosetting powder coating composition of the invention, preferably said cured thermosetting powder coating composition of the invention is a powder coating having any one of the following properties alone or in combination:
  i) excellent resistance to swelling;
  ii) good smoothness;
  iii) good chemical resistance;
  iv) low gloss, preferably very low gloss;
  v) low yellowness, preferably very low yellowness,
comprising the steps of: a) providing the thermosetting powder coating composition of the invention; b) curing the thermosetting powder coating composition of the invention.

In another embodiment, the invention further relates to a method (herein mentioned as "method X") for making a cured thermosetting powder coating composition of the invention, preferably said cured thermosetting powder coating composition of the invention is a powder coating having any one of the following properties alone or in combination:
  i) excellent resistance to swelling;
  ii) good smoothness;
  iii) good chemical resistance;
  iv) low gloss, preferably very low gloss;
  v) low yellowness, preferably very low yellowness,
comprising the steps of: a) providing the thermosetting powder coating composition of the invention; b) applying the thermosetting powder coating composition on an article; c) curing the thermosetting powder coating composition of the invention, preferably at low temperature.

Yet, another aspect of the invention is a thermosetting powder coating composition chosen from the group of thermosetting powder coating compositions according to InvPCC1-41.

Yet, another aspect of the invention is a cured thermosetting powder coating composition chosen from the group of cured thermosetting powder coating compositions according to InvPCC1-41.

Yet, another aspect of the invention is a powder coating chosen from the group of powder coatings derived upon curing of InvPCC1-41.

Many other variations and embodiments of the claimed invention will be apparent to those skilled in the art and such variations are contemplated within the scope of the claimed invention.

Further aspects of the invention and preferred features thereof are given in the claims herein.

The invention will now be described in detail with reference to the following non limiting examples which are by way of illustration only.

17. EXAMPLES

The invention is explained in more detail with reference to the following non-limiting examples.

In the Examples section, the abbreviation UR represents unsaturated resin comprising ethylenic unsaturations, the abbreviation VFUR represents vinyl functionalized urethane resins used as curing agent, the abbreviation PCC represents thermosetting powder coating composition and the abbreviation PC represents powder coating.

The abbreviation PA denotes a thermosetting powder coating composition A and the abbreviation PB denotes a thermosetting powder coating composition B.

In all the examples the unsaturated resin comprising ethylenic unsaturations (UR) were unsaturated polyester resins comprising 2-butenedioic acid ethylenic unsaturations.

In all the examples the vinyl functionalized urethane resins (VFUR) used as curing agent were vinyl ether functionalized urethane resins (VEFUR).

All powder coating compositions presented in the Examples were thermosetting powder coating compositions (PCC).

In the Examples section the abbreviation "Comp" denotes a Comparative Example associated to either a comparative thermosetting powder coating composition e.g. CompPCC1, or to a comparative powder coating e.g. CompPC1.

In the Examples section the abbreviation "Inv" denotes an Inventive Example associated to a thermosetting powder coating composition according to the invention e.g. InvPCC1, or to a powder coating e.g. InvPC1, according to the invention.

In the Examples the abbreviation "n.m." denotes "not measured".

In the Examples the abbreviation "n.a." denotes "not applicable".

In the Examples the abbreviation "n.r." denotes not recorded with the method applied.

In the Examples the abbreviation "n.p.m." denotes "not possible to measure".

In the numbers shown in the Tables 1-10, the decimal sign is denoted by a comma ",". for any other number shown in the application, the decimal sign is denoted by a point ".".

Tables 3-4 present the composition and properties of comparative thermosetting powder coating compositions CompPCC1-22 and of their corresponding powder coatings.

Tables 5-7 present the composition and properties of inventive thermosetting powder coating compositions InvPCC1-29 and of their corresponding powder coatings.

Table 8 presents the composition and properties of inventive thermosetting powder coating compositions InvPCC30-36 and of their corresponding powder coatings.

Table 9 presents the composition and properties of: i) inventive thermosetting powder coating compositions InvPCC37-38 and of their corresponding powder coatings, as well as of ii) comparative thermosetting powder coating compositions CompPCC23-24 and of their corresponding powder coatings.

Table 10 presents the composition and properties of: i) inventive thermosetting powder coating compositions InvPCC39-41 and of their corresponding powder coatings as well as of ii) comparative thermosetting powder coating composition CompPCC25 and of its corresponding powder coating.

17.1 Analytical Methods and Techniques for the Measurement of the Properties of the Unsaturated Polyester Resins Comprising Ethylenic Unsaturations and the Vinyl Functionalized Urethane Resins Used as Curing Agents in the Thermosetting Powder Coating Compositions Unless otherwise stated the theoretical number average molecular weight ($M_n$) is defined as follows:

$$M_n = (\Sigma_i N_i M_i)/(\Sigma_i N_i)$$

where $N_i$ is the number of molecules of molecular weight $M_i$.

In the case of the UR, the $M_n$ was calculated by multiplying the theoretical (targeted) functionality (f) with 56110 and dividing the outcome thereof by the sum of the theoretical (targeted) acid value (AV) (mg KOH/g of UR) and the theoretical (targeted) hydroxyl value (OHV) (mg KOH/g UP) according to the following equation EX1a:

$$M_n = (56110 \times f)/(AV + OHV) \qquad (EX1a)$$

EX1a applies analogously for the calculation of the $M_n$ of any UR as described herein when the theoretical f, theoretical AV and theoretical OHV are available. If the theoretical values of AV, OHV are not available, then the $M_n$ can be calculated according to EX1a by factoring in EX1a the measured values of AV and OHV and wherein in this case f is calculated from analytical data on the chemical composition of the UR, said analytical data being obtained from analytical techniques e.g. NMR spectroscopy, well-known to one skilled in the art.

In the case of the VFUR, the $M_n$ was calculated by the following equation EX1:

$$M_n = \frac{\sum_{i=1}^{n}(N_i * MW_i) - M_{H2O}}{N_{VFUR}} \qquad (EX1)$$

whereas $N_i$=mol of each monomer used for the preparation of the VFUR;

$MW_i$=$M_n$ (Da) of each monomer used for the preparation of the VFUR;

$M_{H2O}$=mass (g) of water formed during the preparation of the VFUR;

$N_{VFUR}$=mol of VFUR prepared from said monomers.

EX1 applies analogously for determining the $M_n$ of any curing agent as described herein, wherein $N_i$, $MW_i$, $M_{H2O}$, $N_{VFUR}$ in EX1, would stand for:

$N_i$=mol of each monomer used for the preparation of the curing agent;

$MW_i$=$M_n$ (Da) of each monomer used for the preparation of the curing agent;

$M_{H2O}$=mass (g) of a by-product produced during the preparation of said curing agent, for example water or alcohol e.g. methanol, ethanol, depending on the chemical composition of said curing agent;

$N_{VFUR}$=mol of curing agent prepared from said monomers.

In case $M_n$ refers to a monomer then the $M_n$ corresponds to molecular weight values calculated on the basis of the molecular formula of said monomer, as such calculation is known to one skilled in the art.

Melt viscosity (herein mentioned as viscosity, in Pa·s) measurements were carried out at 160° C. on a Brookfield CAP 2000+H Viscometer. The applied shear-rate was 70 s$^{-1}$ and a 19.05 mm spindle (cone spindle CAP-S-05 (19.05 mm, 1.8°) was used.

The acid and hydroxyl values of the unsaturated resins comprising ethylenic unsaturations (UR) that were unsaturated polyester resins comprising 2-butenedioic acid ethylenic unsaturations, were determined titrimetrically according to ISO 2114-2000 and ISO 4629-1978; in addition the targeted (theoretical) acid and hydroxyl values of said resins were also reported herein.

17.2 $^1$H-NMR Method for the Measurement of the WPU ("$^1$H-NMR Method WPU")

The WPU was measured via $^1$H-NMR spectroscopy according to the method entitled—for simplicity—"$^1$H-NMR Method WPU" which is presented herein. The estimated margin of error of this method for determining the WPU is +/−2%; the margin of error was determined on the basis of measuring three samples of the same lot of a VFUR or UR.

More specifically, said WPU was measured via $^1$H-NMR spectroscopy as explained herein after and it was calculated according to the following equation EX2:

$$WPU = \left[ \frac{W_{pyr}}{W_{resin}} \frac{1}{MW_{pyr}} \frac{A_{c=c}/N_{c=c}}{A_{pyr}/N_{pyr}} \right]^{-1} \quad (EX2)$$

wherein, $W_{pyr}$ is the weight of pyrazine (internal standard),
$W_{resin}$ is the weight of UR such as an unsaturated polyester resin comprising 2-butenedioic acid ethylenic unsaturations, or the weight of a curing agent such as a VFUR; $W_{pyr}$ and $W_{resin}$ are expressed in the same units.
$MW_{pyr}$ is the molecular weight of the pyrazine (=80 Da) (internal standard).
$A_{pyr}$ is the peak area for methine protons attached to the aromatic ring of pyrazine and
$N_{pyr}$ is the number of the methine protons of pyrazine (=4).

In case of a VFUR:
$A_{C=C}$ is the peak area for the methine proton ( . . . —CH═ . . . ) of the vinyl groups ( . . . —CH═CH$_2$) in the VFUR; $N_{C=C}$ is the number of methine protons ( . . . —CH═ . . . ) of the vinyl groups ( . . . —CH═CH$_2$) in the VFUR.

In case of a UR:
$A_{C=C}$ is the peak area for methine protons ( . . . —CH═ . . . ) of the ethylenic unsaturations (>C═C<) of the UR; $N_{C=C}$ is the number of methine protons ( . . . —CH═ . . . ) attached to the ethylenic unsaturations (>C═C<) of the UR.

The peak areas of the methine protons of pyrazine and methine protons ( . . . —CH═ . . . ) of the vinyl groups ( . . . —CH═CH$_2$) in the VFUR of Formula EX2 were measured as follows: A sample of 30 mg of VFUR was diluted at 105° C. in 0.800 ml deuterated dimethylsulfoxide containing a known amount (mg) of pyrazine as internal standard for performing $^1$H-NMR spectroscopy. Subsequently, the $^1$H-NMR spectrum of the VFUR sample was recorded at 40° C. on a 400 MHz BRUKER NMR-spectrometer. Afterwards, the chemical shifts (ppm) of the methine protons of pyrazine and the methine protons ( . . . —CH═ . . . ) of the vinyl groups ( . . . —CH═CH$_2$) in the VFUR were identified; the chemical shifts (ppm) of the methine protons of pyrazine and methine protons ( . . . —CH═ . . . ) of the vinyl groups ( . . . —CH═CH$_2$) in the VFUR of Formula EX2 measured on a 400 MHz BRUKER NMR-spectrometer deuterated dimethylsulfoxide were at about 8.6 and at about 6.4-6.9 ppm, respectively. Subsequently, with the help of suitable commercially available software for analyzing $^1$H-NMR spectra such as ACD/Spectrus Processor software provided by ACD/Labs, the peak areas of the methine protons of pyrazine and methine protons ( . . . —CH═ . . . ) of the vinyl groups ( . . . —CH═CH$_2$) in the VFUR of Formula EX2 were measured and from these values the WPU was determined according to Formula EX2.

In case in which 30 mg of a VFUR is not soluble at 105° C. in 0.800 ml deuterated dimethylsulfoxide, then any other suitable solvent or mixture of solvents known to the skilled person for performing the $^1$H-NMR spectroscopy may be used; for example a mixture of methanol and deuterated chloroform The choice of a suitable solvent or a mixture of suitable solvents depends on the solubility of the sample of the VFUR in said deuterated solvents. In case in which 30 mg of VFUR is soluble in a mixture of 0.800 ml deuterated dimethylsulfoxide at 105° C., then dimethylsulfoxide is the solvent of choice for performing the $^1$H-NMR spectroscopy for the VFUR. In case in which a different solvent or mixture of solvents is used for performing the $^1$H-NMR Method WPU, then the chemical shifts of the protons of Formula EX2 may shift from the ones reported here for the selected solvents for the $^1$H-NMR Method WPU since the actual chemical shifts may depend on the solvent or mixture of solvents used to record the $^1$H-NMR spectrum; in such case one should identify and determine the chemical shifts of the corresponding protons and apply Formula EX2 for the determination of WPU.

The peak areas of the methine protons of pyrazine and methine protons ( . . . —CH═ . . . ) of the ethylenic unsaturations (>C═C<) of the UR in EX2 were measured as follow: A sample of 75 mg of UR was diluted at 25° C. in 1 ml deuterated chloroform containing a known amount (mg) of pyrazine as internal standard for performing $^1$H-NMR spectroscopy. Subsequently, the $^1$H-NMR spectrum of the UR sample was recorded at 25° C. on a 400 MHz BRUKER NMR-spectrometer. Afterwards, the chemical shifts (ppm) of the methine protons of pyrazine and the methine protons ( . . . —CH═ . . . ) of the ethylenic unsaturations (>C═C<) of the UR were identified; the chemical shifts (ppm) of the methine protons of pyrazine and the methine protons ( . . . —CH═ . . . ) of the ethylenic unsaturations (>C═C<) of the UR in EX2 measured on a 400 MHz BRUKER NMR-spectrometer in methanol and deuterated chloroform were at about 8.6 and at about 6.8-6.9 ppm, respectively. Subsequently, with the help of suitable commercially available software for analyzing $^1$H-NMR spectra such as ACD/Spectrus Processor software provided by ACD/Labs, the peak areas of the methine protons of pyrazine and methine protons ( . . . —CH═ . . . ) of the ethylenic unsaturations (>C═C<) of the UR of EX2 were measured and from these values the WPU was determined according to EX2.

In case in which 75 mg of a UR is not soluble at 25° C. in 1 ml of deuterated chloroform, then any other suitable solvent or mixture of solvents known to the skilled person for performing the $^1$H-NMR spectroscopy may be used; for example deuterated dimethylsulfoxide, pyridine, tetrachloro ethane, and mixtures thereof. The choice of a suitable solvent or a mixture of suitable solvents depends on the solubility of the sample of the UR in said solvents. In case in which 75 mg of UR is soluble in 1 mL of deuterated chloroform at 25° C., then deuterated chloroform is the solvent of choice for performing the $^1$H-NMR spectroscopy for the UR. In case in which a different solvent or mixture of solvents is used for performing the $^1$H-NMR Method WPU, then the chemical shifts of the protons of EX2 may shift from the ones reported here for the selected solvents for the $^1$H-NMR Method WPU since the actual chemical shifts may depend on the solvent or mixture of solvents used to record the $^1$H-NMR spectrum; in such case one should identify and determine the chemical shifts of the corresponding protons and apply EX2 for the determination of WPU. In case in which a different solvent or mixture of solvents is used for performing the $^1$H-NMR Method WPU, then the chemical shifts of the protons of EX2 may shift from the ones reported here for the selected solvents for the $^1$H-NMR Method WPU since the actual chemical shifts may depend on the solvent or mixture of solvents used to record the $^1$H-NMR spectrum; in addition, one may perform the measurement at different temperature than the one disclosed herein, for example the measurement can be performed at higher temperature than the one disclosed herein in order to solubilize the sample intended to be analyzed for measuring its WPU according to this method and/or may use a lower amount of sample e.g. 25 mg, depending on the resolution of the NMR instrument; in such case one should identify and determine the chemical shifts of the corresponding protons and apply EX2 for the determination of WPU.

The method—as described herein—for the measurement of the WPU of the samples mentioned in the Examples, applies analogously for any UR and any curing agent in connection with this application, taking of course into account common general knowledge in performing and analyzing results of NMR spectroscopy, the particular chemical nature of the UR or the curing agent and the skills of one skilled in the art of NMR spectroscopy; for example, the chemical shifts may be somewhat shifted from the ones disclosed herein, and/or the temperatures used to perform the measurement different e.g. higher than the ones disclosed herein, or the amount of the sample used can be lower e.g. 25 mg, depending on the resolution of the NMR instrument; in such case one should identify and determine the chemical shifts of the corresponding protons and apply EX2 for the determination of WPU.

17.3 DSC Method for the Measurement of $T_g$, $T_m$, $T_c$, $\Delta H_m$, $\Delta H_c$, (Mentioned as "DSC Method")

The glass transition temperature of the inventive and comparative thermosetting powder coating compositions ($T_{g\ PCC}$ in ° C.), glass transition temperature of the UR ($T_{g\ UR}$ in ° C.), glass transition temperature of the crystalline copolymerizable resin (that is a crystalline VFUR) ($T_{g\ VFUR}$ in ° C.), the crystallization temperature ($T_c$ in ° C.), the crystallization enthalpy ($\Delta H_c$ in J/g), the melting temperature ($T_m$ in ° C.), and the melting enthalpy ($\Delta H_m$ in J/g) of the crystalline copolymerizable resin (that is a crystalline VFUR) were measured via Differential Scanning calorimetry (DSC) on a TA instruments DSC Q2000 apparatus, in $N_2$ atmosphere calibrated with indium, within 24 hours from the time of preparation of the entity (freshly prepared entities) e.g. UR, VFUR, PCC C, etc., intended to be subject to this method for the measurement of any one (those applicable) of the aforementioned parameters. The processing of the signal (DSC thermogram, Heat Flow vs. Temperature) was carried out using Universal Analysis 2000 software version 4.5a provided by TA instruments, as described herein after:

For the determination of the $T_{g\ PCC}$ of the inventive and comparative thermosetting powder coating compositions (InvPCC and CompPCC) a sample of 10±0.5 mg was weight and placed in the DSC cell. The sample was cooled down to −20° C. and the temperature was kept at −20° C. for 1 minute; Subsequently the sample was heated up to 200° C. at a heating rate of 5° C./minute (thermograph A). Thermograph A was used for measuring the $T_{g\ PCC}$.

For the determination of the $T_{g\ UR}$ of the UR a sample of 10±0.5 mg was weight and placed in the DSC cell. The sample was heated up to 150° C. at a heating rate of 40° C./minute. Once the sample has reached 150° C., the temperature was maintained at 150° C. for 10 minutes. Subsequently, the sample was cooled down to 0° C. at a cooling rate of 40° C./minute (thermograph B); once the sample has reached 0° C., the temperature was maintained at 0° C. for 10 minute. Subsequently, the sample was heated up to 100° C. at a heating rate of 5° C./minute (thermograph C). Thermographs A, B and C were processed as the Y axis of the thermographs representing the heat flow having exotherm up and endotherm down. Thermograph C was used to measure the $T_{g\ UR}$.

For the determination of $T_{g\ VFUR}$, $\Delta H_m$, $T_m$, $\Delta H_c$ and $T_c$ of the crystalline copolymerizable resin, that is a VFUR, a sample of 10±0.5 mg was weighed and placed in the DSC cell. The sample was equilibrated at 25° C. for 1 minute; Subsequently the sample was heated up to 150° C. at a heating rate of 5° C./minute. Once the sample has reached 150° C., the temperature was maintained at 150° C. for 1 minute. Subsequently, the sample was cooled down to −50° C. at a cooling rate of 5° C./minute (thermograph B); once the sample has reached −50° C., the temperature was maintained at −50° C. for 1 minute. Subsequently, the sample was heated up to 150° C. at a heating rate of 5° C./minute (thermograph C) Thermographs A, B and C were processed as the Y axis of the thermographs representing the heat flow has exotherm up and endotherm down. Thermograph B was used for measuring the $T_{g\ VFUR}$, $\Delta H_m$ and $T_m$; thermograph C was used to measure the $\Delta H_c$ and $T_c$.

Each one of the $T_{g\ UR}$, $T_{g\ VFUR}$, $T_{g\ PCC}$ was the midpoint temperature of the temperature range over which the glass transition took place, said midpoint temperature was the point at which the curve was intersected by a line that was equidistant between the two extrapolated baselines, as defined in § 3.2 and § 3.3 in ISO 11357-2 edition 1999 Mar. 15 [for midpoint temperature see § 3.3.3 in ISO 11357-2; edition 1999 Mar. 15].

The $T_m$ was measured as the temperature recorded at the minimum heat flow of the endothermic signal attributed to the melting of the sample.

The $\Delta H_m$ was measured as the integrated heat flow over the temperature range of the melting.

The $T_c$ was measured as the temperature recorded at the maximum heat flow of the exothermic signal attributed to the crystallization of the sample.

The $\Delta H_c$ was measured as the integrated heat flow over the temperature range of the crystallization.

The DSC Method—as described herein—for the measurement of any property measured in this section that is or may be related to the UR, applies analogously for any UR disclosed in this application.

The DSC Method—as described herein—for the measurement of any property measured in this section that is or may be related to the VFUR, applies analogously for any curing agent disclosed in this application.

The DSC Method—as described herein—for the measurement of any property measured in this section that is or may be related to the PCC C, applies analogously for any PCC C disclosed in this application.

The DSC Method—as described herein—for the measurement of any property measured in this section that is or may be related to the PCC A or PCC B, applies analogously for any PCC A or PCC B disclosed in this application.

The DSC Method described herein applies analogously for the measurement of the glass transition temperature ($T_g$), the melting temperature ($T_m$), the crystallization temperature ($T_c$), the melting enthalpy ($\Delta H_m$), the crystallization enthalpy (ΔH$_c$), in connection with any resin, any resin composition, any compound, any composition, disclosed in this application.

17.4 Method to Determine Presence of Unreacted N=C=O Groups (Free Isocyanate Groups) (Method NCO)

If necessary, in order to determine any unreacted —N=C=O groups an FT-IR spectrum can be recorded on a infrared spectrometer such as the Digilab Excalibur infrared spectrometer, using a Golden gate ATR accessory from Specac. FT-IR spectra can be taken using a resolution of 4 cm$^{-1}$, over a range of 700 cm$^{-1}$ to 4000 cm$^{-1}$ over 64 scans and processed with proper software such as the Varian Resolutions pro software version 5.1. A characteristic peak for unreacted —N=C=O groups can be found around 2250 cm$^{-1}$; the presence of this peak is indicative of unreacted N=C=O groups (free isocyanate groups).

17.5 Synthesis of Unsaturated Resins Comprising Ethylenic Unsaturations Said Resins being Amorphous Unsaturated Polyester Resin Comprising 2-Butenedioic Acid Ethylenic Unsaturations Table 1 presents the monomers used for the preparation of the unsaturated resins comprising ethylenic unsaturations said resins being amorphous unsaturated polyester resin comprising 2-butenedioic acid ethylenic unsaturations and the properties of said resins.

Amorphous (UR1-UR3) unsaturated polyesters comprising 2-butenedioic acid ethylenic unsaturations were prepared.

All unsaturated polyester resins comprising 2-butenedioic acid ethylenic unsaturations (UR1-UR3) prepared herein were solid at room temperature and at atmospheric pressure.

Each of UR1, UR2 and UR3 contains t-butyl hydroquinone (inhibitor). This amount of inhibitor was factored in the amount of inhibitor in the thermosetting powder coating compositions that contained any one of UR1-UR3.

UR1

A reactor vessel fitted with a thermometer, a stirrer and a distillation device for the removal of water formed during the synthesis, was filled with a tin catalyst (butyl stannoic acid, 1 g) and the monomers for the first step (isophthalic acid (320.1 g; 1.93 mol), neopentylglycol (314.5 g; 3.02 mol) and hydrogenated bisphenol A (270.1 g; 1.12 mol) as listed in Table 1). Stirring was then applied and a light nitrogen flow was passed over the reaction mixture while the temperature was raised to 220° C.; the temperature was kept at 220° C. till no water was released. Subsequently, the reaction mixture was cooled down to 180° C.; once the temperature reached 180° C. fumaric acid (231.6 g; 2.0 mol) together with a small amount of t-butyl hydroquinone (0.2 g; 0.0012 mol) was added at a temperature of 180° C. followed by esterification at 205° C. (second step). When an acid value of less than 15 mg KOH/g resin was reached and water stopped being released, the third step of the polyester preparation was carried out under reduced pressure at 205° C. till an acid value of 6.5 mg KOH/g was reached. In order to lower the acid value of the resin below 5 mgKOH/g resin, 2,3-epoxy propyl neodecanoate (7.7 g; 0.03 mol) was added to the resin in order to react with the acid groups of the resin; upon the addition of 2,3-epoxy propyl neodecanoate the reaction continued for at least 30 minutes. Subsequently, the polyester resin was discharged onto an aluminum foil kept at room temperature. The polyester resin obtained had an acid value of 4.7 mgKOH/g resin and a hydroxyl value of 35.7 mgKOH/g resin.

UR2

A reactor vessel fitted with a thermometer, a stirrer and a distillation device for the removal of water formed during the synthesis, was filled with a tin catalyst (butyl stannoic acid, 1 g) and the monomers for the first step (terephthalic acid (631.6 g; 3.80 mol), 1,2-propylene glycol (362.2 g; 4.76 mol) and trimethylol propane (45.1 g; 0.34 mol) as listed in Table 1). Stirring was then applied and a light nitrogen flow was passed over the reaction mixture while the temperature was raised to 220° C.; the temperature was kept at 220° C. till no water was released. Subsequently, the reaction mixture was cooled down to 180° C.; once the temperature reached 180° C. fumaric acid (114.0 g; 0.98 mol) together with a small amount of t-butyl hydroquinone (0.1 g; 0.0006 mol) was added at a temperature of 180° C. followed by esterification at 205° C. (second step). When an acid value of less than 15 mg KOH/g resin was reached and water stopped being released, the third step of the polyester preparation was carried out under reduced pressure at 205° C. till an acid value of 6 mg KOH/g was reached. In order to lower the acid value of the resin below 5 mgKOH/g resin, 2,3-epoxy propyl neodecanoate (21.5 g; 0.09 mol) was added to the resin in order to react with the acid groups of the resin; upon the addition of 2,3-epoxy propyl neodecanoate the reaction continued for at least 30 minutes. Subsequently, the polyester resin was discharged onto an aluminum foil kept at room temperature. The polyester resin obtained had an acid value of 1 mgKOH/g resin and a hydroxyl value of 52.6 mgKOH/g resin.

UR3

A reactor vessel fitted with a thermometer, a stirrer and a distillation device for the removal of water formed during the synthesis, was filled with a tin catalyst (butyl stanoic acid, 1 g) and the monomers for the first step (terephthalic acid (553.7 g; 3.33 mol), trimethylol propane (44.1 g; 0.33 mol) and neopentyl glycol (443.4 g; 4.26 mol) as listed in Table 1). Stirring was then applied and a light nitrogen flow was passed over the reaction mixture while the temperature was raised to 220° C.; the temperature was kept at 220° C. till no water was released. Subsequently, the reaction mixture was cooled down to 180° C.; once the temperature reached 180° C. fumaric acid (112.5 g; 0.92 mol) together with a small amount t-butyl hydroquinone (0.1 g; 0.0006 mol) was added at a temperature of 180° C. followed by esterification at 205° C. (second step). When an acid value of less than 15 mg KOH/g resin was reached and water stopped being released, the third step of the polyester preparation was carried out under reduced pressure at 205° C. till an acid value of 6.5 mg KOH/g was reached. In order to lower the acid value of the resin below 5 mgKOH/g resin, ethylene carbonate (5.6 g; 0.06 mol) was added to the resin in order to react with the acid groups of the resin; upon the addition of ethylene carbonate the reaction continued for at least 30 minutes. Subsequently, the polyester resin was discharged onto an aluminum foil kept at room temperature. The polyester resin obtained had an acid value of 3.1 mgKOH/g resin and a hydroxyl value of 42.7 mgKOH/g resin.

17.6 Synthesis of Vinyl Functionalized Urethane Resins Said Resins being Vinyl Ether Functionalized Urethane Resins Vinyl functionalized urethane resins (VFUR) were prepared and they were used as curing agents in the thermosetting powder coating compositions prepared herein.

Table 2 presents the monomers used for the preparation of VFUR1-VFUR3 and the properties of said resins.

VFUR1, VFUR2 and VFUR3 were crystalline vinyl functionalized urethane resins.

VFUR1, VFUR2 and VFUR3

A reaction vessel fitted with a thermometer and a stirrer, was filled with the monomers for the first step as listed in Table 2. Stirring was then applied and a light nitrogen flow was passed over the reaction mixture while the temperature was raised to approximately 60° C. Subsequently, for the second step an isocyanate as listed in table 2 was dosed such that the reaction mixture was kept below 120° C. during addition. After all isocyanate was dosed, the temperature was kept or set at 120° C. and maintained at this temperature for approximately half an hour. The temperature was kept at 120° C. and vacuum was applied for at least half an hour to remove all volatiles. After vacuum the content of the vessel was discharged.

17.7 Preparation of Thermosetting Powder Coating Compositions: General Procedure Tables 3-10 present the compositions of the thermosetting powder coating compositions InvPCC1-41 and CompPCC1-25 along with their properties and the properties of their corresponding powder coatings which were derived upon curing of these compositions.

Table A presents the chemicals used to prepare the unsaturated resins, copolymerizable agents, InvPCC1-41 and CompPCC1-25.

Perkadox® L-W75 (supplied by AkzoNobel Polymer Chemicals) is a solid mixture of benzoyl peroxide and water wherein the amount of benzoyl peroxide is 75% w/w on the solid mixture; water is the carrier material for the benzoyl peroxide. Perkadox® L-W75 is viewed as a peranhydride.

TC-R 3020 (supplied by AkzoNobel Polymer Chemicals; name of the product corresponds to experimental sample provided by AKZO), is a solid mixture of bis(4-methylbenzoyl) peroxide and water wherein the amount of bis(4-methylbenzoyl) peroxide is 62% w/w on the solid mixture; water is the carrier material for bis(4-methylbenzoyl) peroxide. TC-R 3020 is viewed as a peranhydride.

Perkadox® CH50 (supplied by AkzoNobel Polymer Chemicals) is a solid mixture of BPO and 50% with dicyclohexyl phthalate wherein the amount of BPO is 50% w/w on the solid mixture; dicyclohexyl phthalate is the carrier material for the BPO. Perkadox® CH50 is viewed as a peranhydride.

Trigonox® C-50D (supplied by AkzoNobel Polymer Chemicals) is a solid mixture of t-butyl peroxybenzoate and siliciumoxide wherein the amount of t-butyl peroxybenzoate is 50% w/w on the solid mixture; Trigonox® C-50D is viewed as a perester.

Trigonox® 42S (supplied by AkzoNobel Polymer Chemicals) is a liquid mixture of t-butyl peroxy-3,5,5-trimethylhexanoate and water wherein the amount of t-butyl peroxy-3,5,5-trimethylhexanoate is 97% w/w on the liquid mixture; Trigonox® 42S is viewed as a peresters.

Trigonox® 27 (supplied by AkzoNobel Polymer Chemicals) is a liquid mixture of t-butyl peroxydiethylacetate and water wherein the amount of t-butyl peroxydiethylacetate is 96% w/w on the liquid mixture; Trigonox® 27 is viewed as a perester.

Trigonox® 141 (supplied by AkzoNobel Polymer Chemicals) is a liquid mixture of 2,5-Dimethyl-2,5-di(2-ethylhexanoylperoxy)hexane and water wherein the amount of 2,5-Dimethyl-2,5-di(2-ethylhexanoylperoxy)hexane is 90% w/w on the liquid mixture; Trigonox® 141 is viewed as a perester.

Trigonox® 117 (supplied by AkzoNobel Polymer Chemicals) is a liquid mixture of t-butylperoxy 2-ethylhexyl carbonate and water wherein the amount of t-butylperoxy 2-ethylhexyl carbonate is 95% w/w on the liquid mixture; Trigonox® 117 is viewed as a monopercarbonate.

Trigonox® 17 (supplied by AkzoNobel Polymer Chemicals) is a liquid mixture of Butyl 4,4-di(t-butylperoxy) valerate and water wherein the amount of butyl 4,4-di(t-butylperoxy)valerate 95% w/w on the liquid mixture; Trigonox® 17 is viewed as a perether.

Trigonox® A80 (supplied by AkzoNobel Polymer Chemicals) is a liquid mixture of t-butyl hydroperoxide and water with di-t-butylperoxide wherein the amount t-butyl hydroperoxide 80% w/w on the liquid mixture; Trigonox® 17 is viewed as a hydroperoxide.

Triallyl cyanurate (supplied by Sigma-Aldrich) is a crystalline unsaturated component with a theoretical WPU of 83 g/mol and a $M_n$ of 249 g/mol; triallyl cyanurate is viewed as a crystalline unsaturated monomer.

Diacetone acrylamide (supplied by Alfa Aesar) is a crystalline unsaturated monomer with a theoretical WPU of 169 g/mol and a $M_n$ of 169 g/mol; diacetone acrylamide is viewed as a crystalline unsaturated monomer.

Daiso DAP®-A (supplied by Daiso) is an amorphous diallyl phthalate resin with a WPU of 315 g/mol; the latter being calculated from the iodine value reported in the technical data sheet of this resin; Daiso DAP®-A is viewed as an amorphous copolymerizable resin.

Uracross® P3307P is a crystalline vinyl functionalized urethane resin with a WPU of 204 g/mol and a $M_n$ of 400 g/mol; Uracross® P3307P is the commercial grade of the DSM ZW3307P shown in EP 0957 141 A1 (equivalent to U.S. Pat. No. 6,194,525 B1); Uracross® P3307P is viewed as a crystalline copolymerizable resin.

Cobalt stearate (supplied by Alfa aesar) is an cobalt salt solution containing 8% w/w of cobalt; cobalt stearate is viewed as a transition metal compound.

Cobalt Hex-Cem (supplied by OMG) is a mixture of cobalt 2-ethylhexanoate and white spirits, containing 10% w/w of cobalt; cobalt Hex-Cem is viewed as a transition metal compound.

Manganese acetate (supplied by Sigma-Aldrich) is an manganese salt containing 23% w/w of manganese; manganese acetate is viewed as a transition metal compound.

Nuodex® drycoat (supplied by Rockwood) is solution of manganese carboxylate in de-aromatized kerosene, containing 1% w/w of manganese; Nuodex® drycoat is viewed as a transition metal compound.

Nuodex® Cu 8 (supplied by Rockwood) is a mixture of copper naphtenate in aliphatic hydrocarbons containing 8% w/w of copper; Nuodex® Cu 8 is viewed as a transition metal compound.

Kronos® 2360 (supplied by Kronos Titan GmbH) is titanium dioxide and was used as a white pigment.

t-Butyl hydroquinone (supplied by Sigma-Aldrich) was used as an inhibitor.

t-Butyl catechol (supplied by Sigma-Aldrich) was used as an inhibitor.

Resiflow® PV-5 (supplied by Worlée-Chemie GmbH) was used as a flow control agent.

Byk0-361 (supplied by Byk) was used as a flow control agent.

Martinal® ON310 (supplied by Martinswerk GmbH) is aluminum hydroxide [Al(OH)$_3$] and it was used as a filler.

Benzoin (supplied by Alfa Aesar) was used as a degassing agent

The thermosetting powder coating compositions PA and PB used for the Comp PCC, were prepared separately from each other.

The thermosetting powder coating compositions PA and PB used for the InvPCC, were prepared separately from each other.

The preparation of each of the thermosetting powder coating compositions PA and PB used for either the CompPCC or InvPCC was carried out as follows:

i) the entire amount of all the unsaturated resins comprising ethylenic unsaturations (UR);

ii) the entire amount of all unsaturated monomers—if present—;

iii) an amount of all the copolymerizing agents (CA)—if present—, said amount being equal to ⅕ of the entire amount of all UR, and said amount observing the relevant weight ratios among the CA and among the components of each CA—if CA is a mixture itself—, were mixed in, in a blender; said mixture was subsequently extruded in a PRISM TSE16 PC twin screw extruder at 120° C. with a screw speed of 200 rpm and a torque higher than 90%. The obtained extrudate was allowed to cool to room temperature and it was broken into chips. Subsequently, the extrudate was placed in a blender, together with all the rest of the components of the thermosetting powder coating composition, including any remaining amount of CA, making the formulations as listed in Tables 3-10; subsequently, the mixture obtained was extruded in a PRISM TSE16 PC twin screw extruder at 80° C. with a screw speed of 200 rpm and a torque higher than 90%. The temperature of the extrudate exiting the extruder was approximately 85° C. The extrudate was allowed to cool at room temperature and broken into chips. After approximately 12-16 hours these chips were then ground in an ultra-centrifugal mill at 14000 rpm and sieved in a Retsch ZM100 sieve. The sieve fraction with particle size below 90 μm was collected (by means of a Fritsch Analysette Spartan sieving apparatus equipped with a 90 micron sieve, sieving performed for 15 minutes at 2.5 mm amplitude) and used in the Examples.

Powders PA and PB prepared as mentioned herein above were mixed in a weight ratio R=1, for example 25 g of powder A and 25 g of powder B in a blender for 60 seconds to obtain CompPCC1-25, InvPCC1-31, InvPCC34-41.

In the case of InvPCC32 (Table 8), powders PA and PB prepared as mentioned herein above were mixed in a weight ratio R=3, for example 37.5 g of powder A and 12.5 g of powder B in a blender for 60 seconds to obtain InvPCC32.

In the case of InvPCC33 (Table 8), powders PA and PB prepared as mentioned herein above were mixed in a weight ratio R=0.33, for example 12.5 g of powder A and 37.5 g of powder B in a blender for 60 seconds to obtain InvPCC33.

In the case of InvPCC30 (Table 8), in powder PA the $K_A$=0.82 and in powder PB the $K_B$=0.82.

In the case of InvPCC31 (Table 8), in powder PA the $K_A$=1.36 and in powder PB the $K_B$=1.36.

In the case of InvPCC34 (Table 8), in powder PA the M=0.11 and in powder PB the M=0.11.

In the case of InvPCC35 (Table 8), in powder PA the M=0.33 and in powder PB the M=0.33.

In the case of InvPCC36 (Table 8), in powder PA the M=0.11 and in powder PB the M=1.

Any one of the thermosetting powder coating compositions described in the Examples and shown in the relevant Tables, had a particle size lower than 90 microns.

17.8 Preparation of Powder Coatings on Aluminium Substrates

The thermosetting powder coating compositions CompPCC and InvPCC alike, prepared herein, were electrostatically sprayed (corona spray gun, 60 kV) onto aluminium test panels (type AL36 test panels) at room temperature; subsequently, the coated panels were cured at 130° C. for 10 minutes in an air-circulation oven (Heraeus Instruments UT6120) affording clearcoats (non-pigmented powder coatings) or white powder coatings depending on the composition.

The smoothness, chemical resistance and yellowness of powder coatings shown in the Examples were measured on the aforementioned coated aluminum substrates.

The curing conditions (130° C. for 10 minutes in an air-circulation oven) were those at which the smoothness, chemical resistance and yellowness of the powder coatings were assessed.

17.9 Preparation of Powder Coatings on MDF Substrates

MDF substrates (type Medite MR) was preheated at 60-70° C. using a gas catalytic IR oven from Vulcan. The thermosetting powder coating compositions CompPCC and InvPCC alike, prepared herein, were electrostatically sprayed (corona spray gun, 60 kV) onto the preheated MDF substrates at 50-60° C. Subsequently, the coated substrates were cured at at 130° C. for 3 minutes in a catalytic IR oven (Vulcan), affording clearcoats (non-pigmented powder coatings) or white powder coatings depending on the composition.

The resistance to swelling and gloss 60° of powder coatings shown in the Examples were measured on the aforementioned coated MDF substrates.

The curing conditions (130° C. for 3 minutes in a catalytic IR oven) were those at which the resistance to swelling and gloss 60° of the powder coatings were assessed.

17.10 Methods for the Measurement of Properties of the Powder Coatings Derived Upon Heat-Curing of the Thermosetting Powder Coating Compositions Prepared Herein The physical storage stability (PSS) of the comparative and inventive thermosetting powder coating compositions (CompPCC1-25 and InvPCC1-41) was tested at 23° C. for 7 weeks. Prior to assessing the PSS the thermosetting powder coating composition was left to cool down to room temperature for about 2-3 hours. The greater the extend of agglomeration or sintering the poorer the PSS, thus the lower its ranking according to the following scale. The extent of agglomeration was visually assessed and ranked according to the following rating on a 1-10 scale (1 representing the worst PSS and 10 the best PSS):

10: No change.
9: No agglomeration, very good fluidity.
8: No agglomeration, good fluidity.
7: Very low agglomeration; agglomeration can be dispersed by one light tap into a fine powder.
6: Very low agglomeration; agglomeration can be dispersed by several taps into a fine powder.
5: Low agglomeration; agglomeration can be dispersed by hand pressure into a fine powder.
4: Low agglomeration; agglomeration cannot be dispersed by hand pressure in a fine powder.
3: Severe agglomeration into several large lumps, material is pourable.
2: Severe agglomeration into several large lumps, material is not pourable.
1: product sintered to one lump, volume reduced.

According to the invention, PSS equal or higher to 5 is desired.

The coating (film) thickness of the powder coatings derived upon heat curing of the corresponding thermosetting powder coating compositions, on AL36 test panels was measured with a PosiTector 6000 coating thickness gauge from DeFelsko Corporation according to EN ISO 2808: 2007. The measurement was carried out on a coated surface of the coated AL36 test panel. The film thickness of the relevant powder coatings of the Examples was 80±5 μm.

The coating (film) thickness of the powder coatings derived upon heat curing of the corresponding thermosetting powder coating compositions, on MDF was measured with a Elcometer 195 Saberg Drill from Elcometer according to EN ISO 2808-5B:2007; the measurement was carried out on a coated surface of the coated MDF panel. The film thickness of the relevant powder coatings of the Examples was 100±20 micrometers.

Smoothness (or also known in the art as flow) of clearcoats, or white powder coatings derived upon heat curing of the corresponding thermosetting powder coating compositions was determined by comparing the smoothness of the coating with PCI Powder Coating Smoothness panels (ACT Test Panels Inc., APR22163 (A) Batch: 50708816). The rating of smoothness is from 1 to 10, with 1 representing the roughest coating and 10 representing the smoothest coating. In addition, a ranking of <1 corresponds to a textured surface, in other words a poorer surface than available on the reference panels. According to the invention, smoothness equal or higher to 3 is desired.

Gloss measurements of clearcoats, or white powder coatings—derived upon heat of the corresponding heat-curable thermosetting powder coating compositions—on MDF were accomplished according to ASTM-D-523/70 at 60° with a haze-gloss meter (Byk-Gardner). According to the invention, gloss at 60° equal to or lower than 45 (low gloss), more preferably equal to or lower than 40 (very low gloss) is desired.

The yellowness (b*: chromatic value for yellow) of white powder coatings derived upon heat curing of the corresponding thermosetting powder coating compositions, was measured with the help of a colorimeter (Sheen Spectromatch Gloss Sphere) and according to ISO11664-4. The higher the b* value, the yellower the coating is. According to the invention, a b* value equal to or lower than 3 (low yellowness) is desired, preferably a b* value equal to or lower than 2,2 (very low yellowness) is desired.

The chemical resistance of clearcoats or white powder coatings derived upon heat curing of the corresponding thermosetting powder coating compositions, was assessed with acetone (10 sec) and it was carried out according to DIN 68861 1B. The results were reported according to the following assessment/ranking on a scale 0-5, 5=best:

1: very poor cure: large damage of the surface, large part of the coating is dissolved, resulting in a clear difference in layer thickness between a treated spot and untreated spot on the coating 2: poor cure: small damage of the surface: this can be seen that part of the coating surface is washed away by the acetone, resulting in a feel able edge of the treated spot (in surface structure or coating thickness), or part of the coating is dissolved, resulting in small craters where one part of the dry-blended coating is dissolved.

3: cure ok: the coating is not damaged, but the treated spot is visible under several angles as a large gloss difference.

4: good cure: the spot which was in contact with acetone is only visible under a specific angle as a gloss difference.

5: perfect cure: The spot which was in contact with acetone is not visible

According to the invention, chemical resistance equal or higher than 3 is desired.

The resistance to swelling of clearcoats, or white powder coatings derived upon heat curing of the corresponding thermosetting powder coating compositions, was assessed according to the following test: MDF panels having coated and cured thereon the relevant compositions of the Examples were prepared with an R2 radius on the 90° edges and coated with a powder coating and cured for 3 minutes at 130° C. A hole of Ø35 mm is drilled at a distance of 5 mm to the edge and a drill depth down to 5 mm remaining MDF thickness. (e.g. for 19 mm MDF drill depth is 14 mm). The dust is removed and the hole is completely filled with tap water at the start of test). Once the panel was prepared it was stored in an air-conditioned chamber at 6±2° C./70±5% relative humidity; refilling the hole with tapped water might be necessary after 24 hours testing. Visual inspections for cracks on the coatings due to the swelling of the MDF were carried out for up to 48 h and at the following points in time: after 2, 4, 6, 8, 24 and 48 hours from the initiation of the test. If cracks were observed at any point in time prior to any 48 h when inspections were carried out, the test was stopped. If no cracks were visible after 48 hours the test was stopped. The results were reported according to the following assessment/ranking on a scale 0-48, 48=best:

0: cracks on coating were spotted after 2 h (no resistance to swelling);

2: cracks on coating were spotted after 4 h (extremely poor resistance to swelling);

3: cracks on coating were spotted after 6 h (very poor resistance to swelling);

4: cracks on coating were spotted after 8 h (poor resistance to swelling);

12: cracks on coating were spotted after 24 h (some resistance to swelling);

24: cracks on coating were spotted after 48 h (good resistance to swelling);

48: no cracks on coating were spotted after 48 h (excellent resistance to swelling).

According to the invention, excellent resistance to swelling is desired.

TABLE A

Chemicals used for the preparation of the Examples shown in Tables 1-10.

| Chemical name | Trademark | Comments |
| --- | --- | --- |
| Isophthalic acid | n.a. | dicarboxylic acid |
| Terephthalic acid | n.a. | dicarboxylic acid |
| Neopentylglycol | n.a. | diol |
| Trimethylol propane | n.a. | triol |
| 1,2-propylene glycol | n.a. | diol |
| Hydrogenated bisphenol A | n.a. | diol |
| Fumaric acid | n.a. | unsaturated dicarboxylic acid |
| Hexanediol | n.a. | diol |
| 4-Hydroxylbutyl vinylether | n.a. | hydroxylbutyl vinylether |

TABLE A-continued

Chemicals used for the preparation of the Examples shown in Tables 1-10.

| Chemical name | Trademark | Comments |
|---|---|---|
| 1,6-Hexamethylene diisocyanate | n.a. | diisocyanate |
| Triallyl cyanurate | n.a. | crystalline unsaturated monomer ($M_n$ = 249 Da, theoretical WPU = 83); not according to the invention |
| Diallyl phtalate resin | Daiso DAP ®-A | amorphous copolymerizable resin (WPU = 315) |
| diacetone acryl amide | n.a. | crystalline unsaturated monomer ($M_n$ = 169 Da, theoretical WPU = 169 g/mol); not according to the invention |
| Vinyl functionalized urethane resin | Uracross ® P3307 | crystaline copolymerizable resin ($M_n$ = 400 Da, WPU = 204 g/mol) |
| t-butyl hydroquinone | n.a. | inhibitor |
| t-butyl catechol | n.a. | inhibitor |
| Titanium dioxide | Kronos ® 2360 | white pigment |
| Aluminum hydroxide | Martinal ® ON310 | filler |
| Polyacrylate | Resiflow ® PV-5 | flow control agent |
| Acrylic copolymer | Modarez ®MFP | flow control agent |
| Benzoin | n.a. | degassing agent |
| bis(4-methylbenzoyl) peroxide | n.a. | peranhydride (abbreviated as TC-R 3020) |
| Benzoyl peroxide | Perkadox ® LW75 | peranhydride |
| Benzoyl peroxide | Perkadox ® CH | peranhydride |
| Dilauroyl peroxide | Laurox ® S | peranhydride |
| t-Butyl peroxy-3,5,5-trimethylhexanoate | Trigonox ® 42S | perester |
| 2,5-Dimethyl-2,5-di(2-ethylhexanoylperoxy)hexane | Trigonox ® 141 | perester |
| t-Butyl peroxybenzoate | Trigonox ® C 50D | perester |
| t-Butyl peroxydiethylacetate | Trigonox ® 27 | perester |
| t-Butylperoxy 2-ethylhexyl carbonate | Trigonox ® 117 | percarbonate |
| Butyl 4,4-di(tert-butylperoxy)valerate | Trigonox ® 17 | perether |
| t-butyl hydroperoxide | Trigonox ® A80 | hydroperoxide |
| Cobalt stearate | n.a. | transition metal compound |
| Cobalt 2-ethylhexanoate | n.a. | transition metal compound (known as Cobalt Hex-Cem) |
| Manganese acetate | n.a | transition metal compound |
| Copper naphtalate | Nuodex ® Cu 8 | transition metal compound |
| Manganese carboxylate | Nuodex ® drycoat | transition metal compound |

TABLE 1

Composition and characterization of the unsaturated resins comprising ethylenic unsaturations UR1-UR3, each of which is an unsaturated polyester resin comprising 2-butenedioic acid ethylenic unsaturations.

|  | UR1 | UR2 | UR3 |
|---|---|---|---|
| Monomers first step |  |  |  |
| Isophthalic acid (mol) | 1.93 |  |  |
| Terephthalic acid (mol) |  | 3.8 | 3.33 |
| Neopentylglycol (mol) | 3.02 |  | 4.26 |
| Trimethylol propane (mol) |  | 0.34 | 0.33 |
| 1,2-propylene glycol (mol) |  | 4.76 |  |
| Hydrogenated bisphenol A (mol) | 1.12 |  |  |
| Monomers second step |  |  |  |
| Fumaric acid (mol) | 2 | 0.98 | 0.97 |
| Total (mol) | 8.07 | 9.88 | 8.89 |
| Monomers first step |  |  |  |
| Isophthalic acid (g) | 320.1 |  |  |
| Terephthalic acid (g) |  | 631.6 | 553.7 |
| Neopentylglycol (g) | 314.5 |  | 443.4 |
| Trimethylol propane (g) |  | 45.1 | 44.1 |
| 1,2-propylene glycol (g) |  | 362.2 |  |
| Hydrogenated bisphenol A (g) | 270.1 |  |  |
| Monomers second step |  |  |  |
| Fumaric acid (g) | 231.6 | 114 | 112.5 |
| Total weight (g) | 1136.3 | 1152.9 | 1153.7 |
| Water formed during synthesis (g) | 136.3 | 152.9 | 153.7 |
| Weight (g) of resin produced | 1000 | 1000 | 1000 |
| Characterisation of UR |  |  |  |
| Amorphous or crystalline | amorphous | amorphous | amorphous |
| Theoretical values |  |  |  |
| AV (mg KOH/g UR) | 5 | 5 | 5 |
| OHV (mg KOH/g UR) | 29.9 | 59.9 | 55.3 |
| Functionality (f) | 2.0 | 2.8 | 2.9 |
| $M_n$ (Da) | 3214 | 2458 | 2723 |
| WPU (g/mol) | 500 | 1000 | 1028 |
| Measured values |  |  |  |
| WPU (g/mol) | 536 | 1116 | 1130 |
| $T_g$ (° C.) | 53 | 55 | 47 |
| Viscosity (Pa · s) @ 160° C. | 41.1 | 45.1 | 21.2 |
| AV (mg KOH/g UR) | 4.7 | 1 | 3.1 |
| OHV (mg KOH/g UR) | 35.7 | 52.6 | 42.7 |

TABLE 2

Composition and characterization of the crystalline vinyl functionalized urethane resins VFUR1-VFUR3 used as crystalline copolymerizable resins in the Examples shown in Tables 3-10.

|  | VFUR1 | VFUR2 | VFUR3 |
|---|---|---|---|
| Monomers first step | | | |
| Hexane diol (mol) |  | 0.32 | 0.53 |
| 4-Hydroxylbutyl vinyl ether (mol) | 5.00 | 4.53 | 4.25 |
| Monomers second step | | | |
| 1,6-Hexamethylene diisocyanate (mol) | 2.50 | 2.58 | 2.64 |
| Total (mol) | 7.50 | 7.43 | 7.42 |
| Total weight of reactants (g) | 1000 | 1000 | 1000 |
| Weight (g) of VFUR produced | 1000 | 1000 | 1000 |
| Characterisation of VFUR | | | |
| Amorphous or crystalline | crystalline | crystaline | crystalline |
| Theoretical values | | | |
| $M_n$ (Da) | 400 | 440 | 470 |
| WPU (g/mol) | 200 | 221 | 237 |
| Measured values | | | |
| WPU (g/mol) | 202 | 229 | 242 |
| Tg (° C.) | n.r. | n.r. | n.r. |
| Tc (° C.) | 77 | 84 | 81 |
| $\Delta H_c$ (J/g) | 166 | 175 | 162 |
| $T_m$ (° C.) | 100 | 98 | 98 |
| $\Delta H_m$ (J/g) | 165 | 170 | 165 |
| Viscosity (Pa · s) @ 160° C. | <0.1 | <0.1 | <0.1 |
| AV (mg KOH/g VFUR) | 0 | 0 | 0 |
| OHV (mg KOH/g VFUR) | 0 | 0 | 0 |

TABLE 3

Composition and properties of comparative thermosetting powder coating compositions CompPCC1-12 and of their corresponding powder coatings.

|  | CompPCC1 | | CompPCC2 | | CompPCC3 | |
|---|---|---|---|---|---|---|
|  | PA | PB | PA | PB | PA | PB |
| UR1 (g) | 82.2 | 127.9 | 82.2 |  | 82.2 | 127.9 |
| UR2 (g) | 45.7 |  | 45.7 | 127.9 | 45.7 |  |
| UR3 (g) | | | | | | |
| VFUR1 (g) | | | | | | |
| Uracross ® P3307 (g) | | | | | | |
| Triallyl cyanurate (g) | 9.14 | 9.14 | 9.14 | 9.14 | 9.14 | 9.14 |
| Daiso DAP ®-A (g) | 53 | 53 | 53 | 53 | 53 | 53 |
| diacetone acrylamide (g) | | | | | | |
| t-butyl hydroquinone (g) | | | | | 0.04 | 0.04 |
| benzoin (g) | | | | | | |
| t-butyl catechol (g) | | | | | | |
| Resiflow ® PV-5 (g) | | | | | 3.5 | 3.5 |
| perkadox CH50 (g) (peranhydride) | | | | | | |
| Perkadox ® LW75 (g) (peranhydride) | 1.14 | 1.14 | 1.14 | 1.14 | 1.14 | 1.14 |
| Trigonox ® C 50D (g) (perester) | 8 |  | 8 |  | 8 |  |
| Trigonox ® 27 (g) (perester) | 8 |  | 8 |  | 8 |  |
| Cobalt stearate (g) |  | 2.51 |  | 2.51 |  | 2.51 |
| Cobalt Hex-Cem (g) | | | | | | |
| Amounts (units as described in the application) of certain components in the language of the invention | | | | | | |
| amount of perester and/or alkylperoxy carbonate | 337 | 0 | 337 | 0 | 337 | 0 |
| amount of peranhydride | 20 | 20 | 20 | 20 | 20 | 20 |
| amount of transition metal compound | 0 | 22 | 0 | 22 | 0 | 22 |
| amount of inhibitor | 12 | 14 | 12 | 7 | 233 | 235 |
| total amount of thermal radical initiator | 188.5 | | 188.5 | | 188.5 | |
| Properties of the CompPCC | | | | | | |
| Extrudable | No | No | No | No | Yes | Yes |
| Physical storage stabillity (0-10, 10 = best) | n.p.m | | n.p.m | | 1 | |
| Tg of CompPCC (° C.) | | | | | 17 | |
| Properties of the CompPC | | | | | | |
| Resistance to swelling (scale 0-48, 48 = best) | n.p.m | | n.p.m | | 2 | |
| Smoothness (1-10 PCI, 10 = best) | | | | | <1 | |
| Chemical resistance (0-5, 5 = best) | | | | | 2 | |
| Gloss 60° | | | | | n.p.m | |
| Yellowness (b*) | | | | | n.a. | |

TABLE 3-continued

Composition and properties of comparative thermosetting powder coating compositions CompPCC1-12 and of their corresponding powder coatings.

| | CompPCC4 | | CompPCC5 | | CompPCC6 | |
|---|---|---|---|---|---|---|
| | PA | PB | PA | PB | PA | PB |
| UR1 (g) | 82.2 | | 127.9 | | 127.9 | 127.9 |
| UR2 (g) | 45.7 | 127.9 | | | | |
| UR3 (g) | | | | | | |
| VFUR1 (g) | | | | | | |
| Uracross ® P3307 (g) | | | | | | |
| Triallyl cyanurate (g) | 9.14 | 9.14 | 9.14 | 9.14 | | |
| Daiso DAP ®-A (g) | 53 | 53 | 53 | 53 | | |
| diacetone acrylamide (g) | | | | | | |
| t-butyl hydroquinone (g) | 0.04 | 0.04 | 0.04 | 0.04 | 0.04 | 0.04 |
| benzoin (g) | | | | | | |
| t-butyl catechol (g) | | | | | | |
| Resiflow ® PV-5 (g) | 3.5 | 3.5 | 3.5 | 3.5 | 3.5 | 3.5 |
| perkadox CH50 (g) (peranhydride) | | | | | | |
| Perkadox ® LW75 (g) (peranhydride) | 1.14 | 1.14 | 1.14 | 1.14 | 1.14 | 1.14 |
| Trigonox ® C 50D (g) (perester) | 8 | | 8 | | 8 | |
| Trigonox ® 27 (g) (perester) | 8 | | 8 | | 8 | |
| Cobalt stearate (g) | | 2.51 | | 2.51 | | 2.51 |
| Cobalt Hex-Cem (g) | | | | | | |
| Amounts (units as described in the application) of certain components in the language of the invention | | | | | | |
| amount of perester and/or alkylperoxy carbonate | 337 | 0 | 337 | 0 | 477 | 0 |
| amount of peranhydride | 20 | 20 | 20 | 20 | 28 | 28 |
| amount of transition metal compound | 0 | 22 | 0 | 22 | 0 | 31 |
| amount of inhibitor | 233 | 228 | 235 | 235 | 333 | 333 |
| total amount of thermal radical initiator | 188.5 | | 188.5 | | 266.5 | |
| Properties of the CompPCC | | | | | | |
| Extrudable | Yes | Yes | Yes | Yes | Yes | Yes |
| Physical storage stabillity (0-10, 10 = best) | 1 | | 1 | | 3 | |
| Tg of CompPCC (° C.) | 18 | | 18 | | 36 | |
| Properties of the CompPC | | | | | | |
| Resistance to swelling (scale 0-48, 48 = best) | 4 | | 2 | | 2 | |
| Smoothness (1-10 PCI, 10 = best) | <1 | | <1 | | <1 | |
| Chemical resistance (0-5, 5 = best) | 3 | | 3 | | 2 | |
| Gloss 60° | n.p.m | | n.p.m | | n.p.m | |
| Yellowness (b*) | n.a. | | n.a. | | n.a. | |

| | CompPCC7 | | CompPCC8 | | CompPCC9 | |
|---|---|---|---|---|---|---|
| | PA | PB | PA | PB | PA | PB |
| UR1 (g) | 127.9 | 127.9 | 127.9 | 127.9 | | |
| UR2 (g) | | | | | | |
| UR3 (g) | | | | | 127 | 127 |
| VFUR1 (g) | | | | | | |
| Uracross ® P3307 (g) | | | | | 6.7 | 6.7 |
| Triallyl cyanurate (g) | 9.14 | 9.14 | | | | |
| Daiso DAP ®-A (g) | | | 53 | 53 | | |
| diacetone acrylamide (g) | | | | | | |
| t-butyl hydroquinone (g) | 0.04 | 0.04 | 0.04 | 0.04 | | |
| benzoin (g) | | | | | 0.7 | 0.7 |
| t-butyl catechol (g) | | | | | 0.015 | 0.015 |
| Resiflow ® PV-5 (g) | 3.5 | 3.5 | 3.5 | 3.5 | | |
| perkadox CH50 (g) (peranhydride) | | | | | | |
| Perkadox ® LW75 (g) (peranhydride) | 1.14 | 1.14 | 1.14 | 1.14 | | |
| Trigonox ® C 50D (g) (perester) | 8 | | 8 | | 5 | |
| Trigonox ® 27 (g) (perester) | 8 | | 8 | | | |
| Cobalt stearate (g) | | 2.51 | | 2.51 | | |
| Cobalt Hex-Cem (g) | | | | | | 0.28 |
| Amounts (units as described in the application) of certain components in the language of the invention | | | | | | |
| amount of perester and/or alkylperoxy carbonate | 477 | 0 | 337 | 0 | 96 | 0 |
| amount of peranhydride | 28 | 28 | 20 | 20 | 0 | 0 |
| amount of transition metal compound | 0 | 31 | 0 | 22 | 0 | 4 |
| amount of inhibitor | 333 | 333 | 235 | 235 | 128 | 128 |
| total amount of thermal radical initiator | 266.5 | | 188.5 | | 48 | |
| Properties of the CompPCC | | | | | | |
| Extrudable | Yes | Yes | Yes | Yes | Yes | Yes |
| Physical storage stabillity (0-10, 10 = best) | 1 | | 3 | | 7 | |

TABLE 3-continued

Composition and properties of comparative thermosetting powder coating compositions CompPCC1-12 and of their corresponding powder coatings.

| | | | |
|---|---|---|---|
| Tg of CompPCC (° C.) | 18 | 31 | 36 |
| Properties of the CompPC | | | |
| Resistance to swelling (scale 0-48, 48 = best) | 2 | 4 | 4 |
| Smoothness (1-10 PCI, 10 = best) | <1 | <1 | 1 |
| Chemical resistance (0-5, 5 = best) | 2 | 2 | 2 |
| Gloss 60° | n.p.m | n.p.m | 27 |
| Yellowness (b*) | n.a. | n.a. | n.a. |

| | CompPCC10 | | CompPCC11 | | CompPCC12 | |
|---|---|---|---|---|---|---|
| | PA | PB | PA | PB | PA | PB |
| UR1 (g) | 82.2 | 127.9 | 82.2 | | | |
| UR2 (g) | 45.7 | | 45.7 | 127.9 | 42.7 | 42.7 |
| UR3 (g) | | | | | 127.9 | 127.9 |
| VFUR1 (g) | 52.5 | 52.5 | 52.5 | 52.5 | | |
| Uracross ® P3307 (g) | | | | | | |
| Triallyl cyanurate (g) | | | | | | |
| Daiso DAP ®-A (g) | | | | | 77.4 | 77.4 |
| diacetone acrylamide (g) | | | | | 90.3 | 90.3 |
| t-butyl hydroquinone (g) | 0.04 | 0.04 | 0.04 | 0.04 | | |
| benzoin (g) | | | | | | |
| t-butyl catechol (g) | | | | | 0.027 | 0.027 |
| Resiflow ® PV-5 (g) | 3.5 | 3.5 | 3.5 | 3.5 | | |
| perkadox CH50 (g) (peranhydride) | | | | | 1.9 | 1.9 |
| Perkadox ® LW75 (g) (peranhydride) | 1.14 | 1.14 | 1.14 | 1.14 | | |
| Trigonox ® C 50D (g) (perester) | 8 | | 8 | | 15.9 | |
| Trigonox ® 27 (g) (perester) | 8 | | 8 | | | |
| Cobalt stearate (g) | | 2.51 | | 2.51 | | |
| Cobalt Hex-Cem (g) | | | | | | 2.38 |
| Amounts (units as described in the application) of certain components in the language of the invention | | | | | | |
| amount of perester and/or alkylperoxy carbonate | 338 | 0 | 338 | 0 | 165 | 0 |
| amount of peranhydride | 20 | 20 | 20 | 20 | 16 | 16 |
| amount of transition metal compound | 0 | 22 | 0 | 22 | 0 | 16 |
| amount of inhibitor | 233 | 236 | 233 | 229 | 116 | 116 |
| total amount of thermal radical initiator | | 189 | | 189 | 98.5 | |
| Properties of the CompPCC | | | | | | |
| Extrudable | Yes | Yes | Yes | Yes | Yes | yes |
| Physical storage stabillity (0-10, 10 = best) | 2 | | 2 | | 1 | |
| Tg of CompPCC (° C.) | 35 | | 35 | | 9 | |
| Properties of the CompPC | | | | | | |
| Resistance to swelling (scale 0-48, 48 = best) | 48 | | 48 | | 4 | |
| Smoothness (1-10 PCI, 10 = best) | 2 | | 3 | | <1 | |
| Chemical resistance (0-5, 5 = best) | 4 | | 5 | | 2 | |
| Gloss 60° | 35 | | 21 | | n.p.m | |
| Yellowness (b*) | n.a | | n.a. | | n.a. | |

TABLE 4

Composition and properties of comparative thermosetting powder coating compositions CompPCC13-22 and of their corresponding powder coatings.

| | CompPCC13 | | CompPCC14 | | CompPCC15 | | CompPCC16 | | CompPCC17 | |
|---|---|---|---|---|---|---|---|---|---|---|
| | PA | PB | PA | PB | PA | PB | PA | PB | PA | PB |
| UR1 (g) | 127.9 | 127.9 | 127.9 | 127.9 | 127.9 | 127.9 | 127.9 | 127.9 | 127.9 | 127.9 |
| VFUR1 (g) | 46.5 | 46.5 | 46.5 | 46.5 | 46.5 | 46.5 | 46.5 | 46.5 | 46.5 | 46.5 |
| Kronos ® 2360 (g) | 52.3 | 52.3 | 52.3 | 52.3 | 52.3 | 52.3 | 52.3 | 52.3 | 52.3 | 52.3 |
| Martinal ® ON310 (g) | 69.8 | 69.8 | 69.8 | 69.8 | 69.8 | 69.8 | 69.8 | 69.8 | 69.8 | 69.8 |
| Resiflow ® PV-5 (g) | 3.5 | 3.5 | 3.5 | 3.5 | 3.5 | 3.5 | 3.5 | 3.5 | 3.5 | 3.5 |
| t-butyl hydroquinone (g) | | | 0.044 | 0.044 | 0.044 | 0.044 | 0.044 | 0.044 | 0.044 | 0.044 |
| Trigonox ® C 50D (g) (perester) | 10.33 | | 1.7 | | | | 6.8 | | 3.4 | |
| Trigonox ® 141 (g) (perester) | | | | | 10.4 | | | | | |
| TC-R3020 (g) (peranhydride) | | 11.9 | | 1.4 | | 7.8 | | | | |
| Perkadox LW75 (g) (peranhydride) | | | | | | | | | 5.74 | 3.05 |
| Trigonox ® 17 (g) (perether) | | | | | | | | | | |
| Trigonox ® A80 (g) (hydroperoxide) | | | | | | | | | | |

TABLE 4-continued

Composition and properties of comparative thermosetting powder coating compositions CompPCC13-22 and of their corresponding powder coatings.

| | CompPCC13 | | CompPCC14 | | CompPCC15 | | CompPCC16 | | CompPCC17 | |
|---|---|---|---|---|---|---|---|---|---|---|
| | PA | PB | PA | PB | PA | PB | PA | PB | PA | PB |
| Cobalt stearate (g) | 0.55 | | | 0.56 | | 0.56 | | | | |
| Manganese acetate (g) | | | | | 0.42 | | | | 0.2 | |
| *Amounts (units as described in the application) of certain components in the language of the invention* | | | | | | | | | | |
| amount of perester and/or alkylperoxy carbonate | 152 | 0 | 25 | 0 | 249 | 0 | 100 | 0 | 50 | 0 |
| amount of peranhydride | 0 | 157 | 0 | 18 | 0 | 103 | 0 | 102 | 50 | 0 |
| amount of transition metal compound | 0 | 5 | 0 | 5 | 0 | 10 | 5 | 0 | 0 | 5 |
| amount of inhibitor | 15 | 15 | 267 | 267 | 267 | 267 | 267 | 267 | 267 | 267 |
| total amount of thermal radical initiator | 154.5 | | 21.5 | | 176 | | 101 | | 50 | |
| *Properties of the CompPCC* | | | | | | | | | | |
| Extrudable | Yes | No | Yes | Yes | Yes | Yes | Yes | Yes | Yes | Yes |
| Physical storage stabillity (0-10, 10 = best) | n.p.m | | 8 | | 2 | | 8 | | 9 | |
| Tg of CompPCC (° C.) | n.p.m | | 43 | | 42 | | 44 | | 41 | |
| *Properties of the CompPC* | | | | | | | | | | |
| Resistance to swelling (scale 0-48, 48 = best) | n.p.m | | 12 | | 48 | | 24 | | 12 | |
| Smoothness (1-10 PCI, 10 = best) | n.p.m | | 4 | | 2 | | 1 | | 8 | |
| Chemical resistance (0-5, 5 = best) | n.p.m | | 2 | | 3 | | 3 | | 2 | |
| Gloss 60° | n.p.m | | 25 | | 30 | | 23 | | 15 | |
| Yellowness (b*) | n.p.m | | 1.3 | | 1.4 | | 1.6 | | 1.3 | |

| | CompPCC18 | | CompPCC19 | | CompPCC20 | | CompPCC21 | | CompPCC22 | |
|---|---|---|---|---|---|---|---|---|---|---|
| | PA | PB | PA | PB | PA | PB | PA | PB | PA | PB |
| UR1 (g) | 127.9 | 127.9 | 127.9 | 127.9 | 127.9 | 127.9 | 127.9 | 127.9 | 127.9 | 127.9 |
| VFUR1 (g) | 46.5 | 46.5 | 46.5 | 46.5 | 46.5 | 46.5 | 46.5 | 46.5 | 46.5 | 46.5 |
| Kronos ® 2360 (g) | 52.3 | 52.3 | 52.3 | 52.3 | 52.3 | 52.3 | 52.3 | 52.3 | 52.3 | 52.3 |
| Martinal ® ON310 (g) | 69.8 | 69.8 | 69.8 | 69.8 | 69.8 | 69.8 | 69.8 | 69.8 | 69.8 | 69.8 |
| Resiflow ® PV-5 (g) | 3.5 | 3.5 | 3.5 | 3.5 | 3.5 | 3.5 | 3.5 | 3.5 | 3.5 | 3.5 |
| t-butyl hydroquinone (g) | 0.044 | 0.044 | 0.044 | 0.044 | 0.044 | 0.044 | 0.044 | 0.044 | 0.044 | 0.044 |
| Trigonox ® C 50D (g) (perester) | 6.8 | | | | | | | | | |
| Trigonox ® 141 (g) (perester) | | | 4.2 | | 4.2 | | | | | |
| TC-R3020 (g) (peranhydride) | | | | 7.8 | | 7.8 | | | | |
| Perkadox LW75 (g) (peranhydride) | | | | | | | | 5.74 | | 5.74 |
| Trigonox ® 17 (g) (perether) | | | | | | | | | 3.12 | |
| Trigonox ® A80 (g) (hydroperoxide) | | | | | | | 2.28 | | | |
| Cobalt stearate (g) | | 0.54 | | | | | | 0.94 | | 0.94 |
| Manganese acetate (g) | | | | | | 2.17 | | | | |
| *Amounts (units as described in the application) of certain components in the language of the invention language of the invention* | | | | | | | | | | |
| amount of perester and/or alkylperoxy carbonate | 100 | 0 | 101 | 0 | 101 | 0 | 0 | 0 | 0 | 0 |
| amount of peranhydride | 0 | 0 | 0 | 103 | 0 | 103 | 0 | 102 | 0 | 102 |
| amount of transition metal compound | 0 | 5 | 0 | 0 | 0 | 51 | 0 | 9 | 0 | 9 |
| amount of inhibitor | 267 | 267 | 267 | 267 | 267 | 267 | 267 | 267 | 267 | 267 |
| total amount of thermal radical initiator | 50 | | 102 | | 102 | | 101 | | 101 | |
| *Properties of the CompPCC* | | | | | | | | | | |
| Extrudable | Yes | Yes | Yes | Yes | Yes | Yes | Yes | Yes | Yes | Yes |
| Physical storage stabillity (0-10, 10 = best) | 8 | | 8 | | 8 | | 8 | | 8 | |
| Tg of CompPCC (° C.) | 41 | | 41 | | 41 | | 42 | | 43 | |
| *Properties of the CompPC* | | | | | | | | | | |
| Resistance to swelling (scale 0-48, 48 = best) | 12 | | 4 | | 48 | | 12 | | 24 | |
| Smoothness (1-10 PCI, 10 = best) | 3 | | 3 | | 2 | | 4 | | 5 | |
| Chemical resistance (0-5, 5 = best) | 2 | | 2 | | 4 | | 2 | | 2 | |
| Gloss 60° | 25 | | 45 | | 28 | | 43 | | 43 | |
| Yellowness (b*) | 1.1 | | 1.2 | | 3.3 | | 1.2 | | 1.2 | |

TABLE 5

Composition and properties of inventive thermosetting powder coating compositions InvPCC1-5 and of their corresponding powder coatings.

|  | InvPCC1 | | InvPCC2 | | InvPCC3 | | InvPCC4 | | InvPCC5 | |
| --- | --- | --- | --- | --- | --- | --- | --- | --- | --- | --- |
|  | PA | PB | PA | PB | PA | PB | PA | PB | PA | PB |
| UR1 (g) | 127.9 | 127.9 | 82.2 | 127.9 | | | | | 123 | 123 |
| UR2 (g) | | | 45.7 | | | | 158.5 | 158.5 | | |
| UR3 (g) | | | | | 200 | 200 | | | | |
| VFUR1 (g) | 52.5 | 52.5 | 52.5 | 52.5 | 40.8 | 40.8 | | | | |
| VFUR2 (g) | | | | | | | | | 49.9 | 49.9 |
| VFUR3 (g) | | | | | | | 15.9 | 15.9 | | |
| t-butyl hydroquinone (g) | 0.04 | 0.04 | 0.04 | 0.04 | | | 0.044 | 0.044 | 0.044 | 0.044 |
| t-butyl cathechol (g) | | | | | 0.12 | 0.12 | | | | |
| Byke ® 361N (g) | | | | | 1.2 | 1.2 | | | | |
| Kronos ® 2360 (g) | | | | | | | 52.3 | 52.3 | 52.3 | 52.3 |
| Martinal ® ON310 (g) | | | | | | | 69.8 | 69.8 | 69.8 | 69.8 |
| Resiflow ® PV-5 (g) | 3.5 | 3.5 | 3.5 | 3.5 | | | 3.5 | 3.5 | 3.5 | 3.5 |
| Perkadox ® LW75 (g) (peranhydride) | 1.14 | 1.14 | 1.14 | 1.14 | | 7.5 | 2.8 | 1.5 | 2.8 | 1.5 |
| Trigonox ® C 50D (g) (perester) | 2.25 | | 2.25 | | 9.6 | | 3.3 | | 3.3 | |
| Trigonox ® 27 (perester) | 2.25 | | 2.25 | | | | | | | |
| Cobalt stearate (g) | | 2.51 | | 2.51 | | | | 1.1 | | 1.1 |
| Cobalt Hex-Cem (g) | | | | | | 0.85 | | | | |
| Amounts (units as described in the application) of certain components in the language of the invention | | | | | | | | | | |
| amount of perester and/or alkylperoxy carbonate | 95 | 0 | 95 | 0 | 102 | 0 | 49 | 0 | 49 | 0 |
| amount of peranhydride | 20 | 20 | 20 | 20 | 0 | 96 | 50 | 27 | 50 | 27 |
| amount of transition metal compound | 0 | 22 | 0 | 22 | 0 | 6 | 0 | 10 | 0 | 10 |
| amount of inhibitor | 236 | 236 | 233 | 236 | 507 | 507 | 261 | 261 | 269 | 269 |
| total amount of thermal radical initiator | 67.5 | | 67.5 | | 99 | | 63 | | 63 | |
| Properties of the InvPCC | | | | | | | | | | |
| Extrudable | Yes | Yes | Yes | Yes | Yes | Yes | Yes | Yes | Yes | Yes |
| Physical storage stability (0-10, 10 = best) | 8 | | 7 | | 6 | | 8 | | 8 | |
| Tg of PCC (° C.) | 39 | | 38 | | 28 | | 44 | | 42 | |
| Properties of the InvPC | | | | | | | | | | |
| Resistance to swelling (scale 0-48, 48 = best) | 48 | | 48 | | 48 | | 48 | | 48 | |
| Smoothness (1-10 PCI, 10 = best) | 5 | | 5 | | 3 | | 5 | | 5 | |
| Chemical resistance (0-5, 5 = best) | 5 | | 4 | | 3 | | 5 | | 3 | |
| Gloss 60° | 25 | | 28 | | 24 | | 25 | | 27 | |
| Yellowness (b*) | n.a. | | n.a. | | n.a. | | 1.3 | | 1.6 | |

TABLE 6

Composition and properties of inventive thermosetting powder coating compositions InvPCC6-17 and of their corresponding powder coatings.

|  | InvPCC6 | | InvPCC7 | | InvPCC8 | |
| --- | --- | --- | --- | --- | --- | --- |
|  | PA | PB | PA | PB | PA | PB |
| UR1 (g) | 127.9 | 127.9 | 127.9 | 127.9 | 127.9 | 127.9 |
| VFUR1 (g) | 46.5 | 46.5 | 46.5 | 46.5 | 46.5 | 46.5 |
| Kronos ® 2360 (g) | 52.3 | 52.3 | 52.3 | 52.3 | 52.3 | 52.3 |
| Martinal ® ON310 (g) | 69.8 | 69.8 | 69.8 | 69.8 | 69.8 | 69.8 |
| Resiflow ® PV-5 (g) | 3.5 | 3.5 | 3.5 | 3.5 | 3.5 | 3.5 |
| t-butylhydroquinone (g) | 0.044 | 0.044 | 0.044 | 0.044 | 0.044 | 0.044 |
| Trigonox ® C 50D (g) (perester) | 6.89 | | | | | |
| TC-R 3020 (g) (peranhydride) | | | | | | |
| Trigonox ® 141 (g) (perester) | | | | | | |
| Perkadox ® LW75 (g) (peranhydride) | | 5.74 | | 5.74 | | 5.74 |
| Trigonox ® 27 (g) (perester) | | | 3.48 | | | |
| Trigonox ® 42S (g) (perester) | | | | | 4.6 | |
| Trigonox ® 117 (g) (percarbonate) | | | | | | |
| Manganese acetate (g) | | | | | | |
| Cobalt stearate (g) | | 0.94 | | 0.94 | | 0.94 |
| Amounts (units as described in the application) of certain components in the language of the invention | | | | | | |
| amount of perester and/or alkylperoxy carbonate | 102 | 0 | 101 | 0 | 106 | 0 |
| amount of peranhydride | 0 | 102 | 0 | 102 | 0 | 102 |
| amount of transition metal compound | 0 | 9 | 0 | 9 | 0 | 9 |

TABLE 6-continued

Composition and properties of inventive thermosetting powder coating compositions InvPCC6-17 and of their corresponding powder coatings.

| | | | | | | |
|---|---|---|---|---|---|---|
| amount of inhibitor | 267 | 267 | 267 | 267 | 267 | 267 |
| total amount of thermal radical initiator | 102 | | 101.5 | | 104 | |
| Properties of the InvPCC | | | | | | |
| Extrudable | Yes | Yes | Yes | Yes | Yes | Yes |
| Physical storage stabillity (0-10, 10 = best) | 8 | | 8 | | 8 | |
| Tg of PCC (° C.) | 40 | | 41 | | 39 | |
| Properties of the InvPC | | | | | | |
| Resistance to swelling (scale 0-48, 48 = best) | 48 | | 48 | | 48 | |
| Smoothness (1-10 PCI, 10 = best) | 3 | | 3 | | 3 | |
| Chemical resistance (0-5, 5 = best) | 4 | | 3 | | 3 | |
| Gloss 60° | 19 | | 22 | | 21 | |
| Yellowness (b*) | 0.9 | | 0.8 | | 1.1 | |

| | InvPCC9 | | InvPCC10 | | InvPCC11 | |
|---|---|---|---|---|---|---|
| | PA | PB | PA | PB | PA | PB |
| UR1 (g) | 127.9 | 127.9 | 127.9 | 127.9 | 127.9 | 127.9 |
| VFUR1 (g) | 46.5 | 46.5 | 46.5 | 46.5 | 46.5 | 46.5 |
| Kronos ® 2360 (g) | 52.3 | 52.3 | 52.3 | 52.3 | 52.3 | 52.3 |
| Martinal ® ON310 (g) | 69.8 | 69.8 | 69.8 | 69.8 | 69.8 | 69.8 |
| Resiflow ® PV-5 (g) | 3.5 | 3.5 | 3.5 | 3.5 | 3.5 | 3.5 |
| t-butylhydroquinone (g) | 0.044 | 0.044 | 0.044 | 0.044 | 0.044 | 0.044 |
| Trigonox ® C 50D (g) (perester) | | | | | 10.33 | |
| TC-R 3020 (g) (peranhydride) | | | | | | 11.9 |
| Trigonox ® 141 (g) (perester) | 4.21 | | | | | |
| Perkadox ® LW75 (g) (peranhydride) | | 5.74 | | 5.74 | | |
| Trigonox ® 27 (g) (perester) | | | | | | |
| Trigonox ® 42S (g) (perester) | | | | | | |
| Trigonox ® 117 (g) (percarbonate) | | | 4.25 | | | |
| Manganese acetate (g) | | | | | | |
| Cobalt stearate (g) | | 0.94 | | 0.94 | | 0.55 |
| Amounts (units as described in the application) of certain components in the language of the invention | | | | | | |
| amount of perester and/or alkylperoxy carbonate | 101 | 0 | 94 | 0 | 152 | 0 |
| amount of peranhydride | 0 | 102 | 0 | 102 | 0 | 157 |
| amount of transition metal compound | 0 | 9 | 0 | 9 | 0 | 5 |
| amount of inhibitor | 267 | 267 | 267 | 267 | 267 | 267 |
| total amount of thermal radical initiator | 101.5 | | 98 | | 154.5 | |
| Properties of the InvPCC | | | | | | |
| Extrudable | Yes | Yes | Yes | Yes | Yes | Yes |
| Physical storage stabillity (0-10, 10 = best) | 8 | | 8 | | 6 | |
| Tg of PCC (° C.) | 40 | | 40 | | 43 | |
| Properties of the InvPC | | | | | | |
| Resistance to swelling (scale 0-48, 48 = best) | 48 | | 48 | | 48 | |
| Smoothness (1-10 PCI, 10 = best) | 3 | | 3 | | 4 | |
| Chemical resistance (0-5, 5 = best) | 4 | | 4 | | 3 | |
| Gloss 60° | 18 | | 23 | | 33 | |
| Yellowness (b*) | 1.4 | | 1.2 | | 1.6 | |

| | InvPCC12 | | InvPCC13 | | InvPCC14 | |
|---|---|---|---|---|---|---|
| | PA | PB | PA | PB | PA | PB |
| UR1 (g) | 127.9 | 127.9 | 127.9 | 127.9 | 127.9 | 127.9 |
| VFUR1 (g) | 46.5 | 46.5 | 46.5 | 46.5 | 46.5 | 46.5 |
| Kronos ® 2360 (g) | 52.3 | 52.3 | 52.3 | 52.3 | 52.3 | 52.3 |
| Martinal ® ON310 (g) | 69.8 | 69.8 | 69.8 | 69.8 | 69.8 | 69.8 |
| Resiflow ® PV-5 (g) | 3.5 | 3.5 | 3.5 | 3.5 | 3.5 | 3.5 |
| t-butylhydroquinone (g) | 0.265 | 0.265 | 0.044 | 0.044 | 0.044 | 0.044 |
| Trigonox ® C 50D (g) (perester) | 10.33 | | | | 3.4 | |
| TC-R 3020 (g) (peranhydride) | | 11.9 | | 7.8 | | 1.4 |
| Trigonox ® 141 (g) (perester) | | | 1.05 | | | |
| Perkadox ® LW75 (g) (peranhydride) | | | | | | |
| Trigonox ® 27 (g) (perester) | | | | | | |
| Trigonox ® 42S (g) (perester) | | | | | | |
| Trigonox ® 117 (g) (percarbonate) | | | | | | |
| Manganese acetate (g) | | | | 0.42 | | |
| Cobalt stearate (g) | | 0.55 | | | | 0.56 |

TABLE 6-continued

Composition and properties of inventive thermosetting powder coating compositions InvPCC6-17 and of their corresponding powder coatings.

| Amounts (units as described in the application) of certain components in the language of the invention | | | | | | |
|---|---|---|---|---|---|---|
| amount of perester and/or alkylperoxy carbonate | 152 | 0 | 25 | 0 | 50 | 0 |
| amount of peranhydride | 0 | 157 | 0 | 103 | 0 | 18 |
| amount of transition metal compound | 0 | 5 | 0 | 10 | 0 | 5 |
| amount of inhibitor | 1534 | 1534 | 267 | 267 | 267 | 267 |
| total amount of thermal radical initiator | 154.5 | | 64 | | 34 | |
| Properties of the InvPCC | | | | | | |
| Extrudable | Yes | Yes | Yes | Yes | Yes | Yes |
| Physical storage stabillity (0-10, 10 = best) | 6 | | 8 | | 8 | |
| Tg of PCC (° C.) | 39 | | 42 | | 41 | |
| Properties of the InvPC | | | | | | |
| Resistance to swelling (scale 0-48, 48 = best) | 48 | | 48 | | 48 | |
| Smoothness (1-10 PCI, 10 = best) | 6 | | 3 | | 3 | |
| Chemical resistance (0-5, 5 = best) | 3 | | 3 | | 3 | |
| Gloss 60° | 33 | | 38 | | 22 | |
| Yellowness (b*) | 1.9 | | 1.6 | | 1.2 | |

| | InvPCC15 | | InvPCC16 | | InvPCC17 | |
|---|---|---|---|---|---|---|
| | PA | PB | PA | PB | PA | PB |
| UR1 (g) | 127.9 | 127.9 | 127.9 | 127.9 | 127.9 | 127.9 |
| VFUR1 (g) | 46.5 | 46.5 | 46.5 | 46.5 | 46.5 | 46.5 |
| Kronos ® 2360 (g) | 52.3 | 52.3 | 52.3 | 52.3 | 52.3 | 52.3 |
| Martinal ® ON310 (g) | 69.8 | 69.8 | 69.8 | 69.8 | 69.8 | 69.8 |
| Resiflow ® PV-5 (g) | 3.5 | 3.5 | 3.5 | | | |
| t-butylhydroquinone (g) | 0.044 | 0.044 | 0.044 | 0.044 | 0.044 | 0.044 |
| Trigonox ® C 50D (g) (perester) | 6.8 | | 10.2 | | | |
| TC-R 3020 (g) (peranhydride) | | 1.4 | | 1.4 | | 7.8 |
| Trigonox ® 141 (g) (perester) | | | | | 2.1 | |
| Perkadox ® LW75 (g) (peranhydride) | | | | | | |
| Trigonox ® 27 (g) (perester) | | | | | | |
| Trigonox ® 42S (g) (perester) | | | | | | |
| Trigonox ® 117 (g) (percarbonate) | | | | | | |
| Manganese acetate (g) | | | | | | 0.42 |
| Cobalt stearate (g) | | 0.56 | | 0.56 | | |
| Amounts (units as described in the application) of certain components in the language of the invention | | | | | | |
| amount of perester and/or alkylperoxy carbonate | 100 | 0 | 150 | 0 | 50 | 0 |
| amount of peranhydride | 0 | 18 | 0 | 18 | 0 | 103 |
| amount of transition metal compound | 0 | 5 | 0 | 5 | 0 | 10 |
| amount of inhibitor | 267 | 267 | 267 | 267 | 267 | 267 |
| total amount of thermal radical initiator | 59 | | 84 | | 76.5 | |
| Properties of the InvPCC | | | | | | |
| Extrudable | Yes | Yes | Yes | Yes | Yes | Yes |
| Physical storage stabillity (0-10, 10 = best) | 8 | | 7 | | 7 | |
| Tg of PCC (° C.) | 41 | | 41 | | 42 | |
| Properties of the InvPC | | | | | | |
| Resistance to swelling (scale 0-48, 48 = best) | 48 | | 48 | | 48 | |
| Smoothness (1-10 PCI, 10 = best) | 4 | | 3 | | 3 | |
| Chemical resistance (0-5, 5 = best) | 4 | | 4 | | 3 | |
| Gloss 60° | 23 | | 33 | | 36 | |
| Yellowness (b*) | 1.3 | | 1.3 | | 0.6 | |

TABLE 7

Composition and properties of inventive thermosetting powder coating compositions InvPCC18-29 and of their corresponding powder coatings.

| | InvPCC18 | | InvPCC19 | | InvPCC20 | |
|---|---|---|---|---|---|---|
| | PA | PB | PA | PB | PA | PB |
| UR1 (g) | 127.9 | 127.9 | 127.9 | 127.9 | 127.9 | 127.9 |
| VFUR1 (g) | 46.5 | 46.5 | 46.5 | 46.5 | 46.5 | 46.5 |

TABLE 7-continued

Composition and properties of inventive thermosetting powder coating compositions InvPCC18-29 and of their corresponding powder coatings.

|  | InvPCC18 | | InvPCC19 | | InvPCC20 | |
|---|---|---|---|---|---|---|
|  | PA | PB | PA | PB | PA | PB |
| Kronos ® 2360 (g) | 52.3 | 52.3 | 52.3 | 52.3 | 52.3 | 52.3 |
| Martinal ® ON310 (g) | 69.8 | 69.8 | 69.8 | 69.8 | 69.8 | 69.8 |
| Resiflow ® PV-5 (g) | 3.5 | 3.5 | 3.5 | 3.5 | 3.5 | 3.5 |
| t-butylhydroquinone (g) | 0.044 | 0.044 | 0.044 | 0.044 | 0.044 | 0.044 |
| Trigonox ® C 50D (g) (perester) |  |  | 3.4 |  | 3.4 |  |
| TC-R 3020 (g) (peranhydride) |  | 7.8 |  | 0.78 |  | 2.1 |
| Laurox ® S (g) (peranhydride) |  |  |  |  |  |  |
| Trigonox ® 141 (g) (perester) | 4.2 |  |  |  |  |  |
| Perkadox ® LW75 (g) (peranhydride) |  |  | 3.05 |  | 3.05 |  |
| Manganese acetate (g) |  | 0.42 |  | 0.2 |  | 0.2 |
| Cobalt stearate (g) |  |  |  |  |  |  |
| Nuodex ® Cu 8 (g) |  |  |  |  |  |  |
| Nuodex ® drycoat (g) |  |  |  |  |  |  |
| Amounts (units as described in the application) of certain components in the language of the invention |  |  |  |  |  |  |
| amount of perester and/or alkylperoxy carbonate | 101 | 0 | 50 | 0 | 50 | 0 |
| amount of peranhydride | 0 | 103 | 54 | 10 | 54 | 28 |
| amount of transition metal compound | 0 | 10 | 0 | 5 | 0 | 5 |
| amount of inhibitor | 267 | 267 | 267 | 267 | 267 | 267 |
| total amount of thermal radical initiator | 102 | | 57 | | 66 | |
| Properties of the InvPCC |  |  |  |  |  |  |
| Extrudable | Yes | Yes | Yes | Yes | Yes | Yes |
| Physical storage stabillity (0-10, 10 = best) | 7 | | 8 | | 8 | |
| Tg of PCC (° C.) | 41 | | 42 | | 43 | |
| Properties of the InvPC |  |  |  |  |  |  |
| Resistance to swelling (scale 0-48, 48 = best) | 48 | | 8 | | 48 | |
| Smoothness (1-10 PCl, 10 = best) | 3 | | 7 | | 4 | |
| Chemical resistance (0-5, 5 = best) | 3 | | 3 | | 3 | |
| Gloss 60° | 34 | | 14 | | 24 | |
| Yellowness (b*) | 0.8 | | 1.6 | | 1.3 | |

|  | InvPCC21 | | InvPCC22 | | InvPCC23 | |
|---|---|---|---|---|---|---|
|  | PA | PB | PA | PB | PA | PB |
| UR1 (g) | 127.9 | 127.9 | 127.9 | 127.9 | 127.9 | 127.9 |
| VFUR1 (g) | 46.5 | 46.5 | 46.5 | 46.5 | 46.5 | 46.5 |
| Kronos ® 2360 (g) | 52.3 | 52.3 | 52.3 | 52.3 | 52.3 | 52.3 |
| Martinal ® ON310 (g) | 69.8 | 69.8 | 69.8 | 69.8 | 69.8 | 69.8 |
| Resiflow ® PV-5 (g) | 3.5 | 3.5 | 3.5 | 3.5 | 3.5 | 3.5 |
| t-butylhydroquinone (g) | 0.044 | 0.044 | 0.044 | 0.044 | 0.044 | 0.044 |
| Trigonox ® C 50D (g) (perester) | 3.4 |  | 3.4 |  | 6.8 |  |
| TC-R 3020 (g) (peranhydride) |  | 8.2 |  | 11.9 |  |  |
| Laurox ® S (g) (peranhydride) |  |  |  |  |  | 7.15 |
| Trigonox ® 141 (g) (perester) |  |  |  |  |  |  |
| Perkadox ® LW75 (g) (peranhydride) | 3.05 |  | 3.05 |  |  |  |
| Manganese acetate (g) |  | 0.2 |  | 0.2 |  |  |
| Cobalt stearate (g) |  |  |  |  |  | 0.54 |
| Nuodex ® Cu 8 (g) |  |  |  |  |  |  |
| Nuodex ® drycoat (g) |  |  |  |  |  |  |
| Amounts (units as described in the application) of certain components in the language of the invention |  |  |  |  |  |  |
| amount of perester and/or alkylperoxy carbonate | 50 | 0 | 50 | 0 | 100 | 0 |
| amount of peranhydride | 54 | 108 | 54 | 157 | 0 | 103 |
| amount of transition metal compound | 0 | 5 | 0 | 5 | 0 | 5 |
| amount of inhibitor | 267 | 267 | 267 | 267 | 267 | 267 |
| total amount of thermal radical initiator | 106 | | 130.5 | | 101.5 | |
| Properties of the InvPCC |  |  |  |  |  |  |
| Extrudable | Yes | Yes | Yes | Yes | Yes | Yes |
| Physical storage stability (0-10, 10 = best) | 8 | | 7 | | 8 | |
| Tg of PCC (° C.) | 42 | | 42 | | 41 | |
| Properties of the InvPC |  |  |  |  |  |  |
| Resistance to swelling (scale 0-48, 48 = best) | 48 | | 48 | | 48 | |
| Smoothness (1-10 PCl, 10 = best) | 3 | | 3 | | 3 | |
| Chemical resistance (0-5, 5 = best) | 3 | | 3 | | 3 | |
| Gloss 60° | 39 | | 39 | | 19 | |
| Yellowness (b*) | 1.2 | | 1.5 | | 1 | |

TABLE 7-continued

Composition and properties of inventive thermosetting powder coating compositions InvPCC18-29 and of their corresponding powder coatings.

| | InvPCC24 | | InvPCC25 | | InvPCC26 | |
|---|---|---|---|---|---|---|
| | PA | PB | PA | PB | PA | PB |
| UR1 (g) | 127.9 | 127.9 | 127.9 | 127.9 | 127.9 | 127.9 |
| VFUR1 (g) | 46.5 | 46.5 | 46.5 | 46.5 | 46.5 | 46.5 |
| Kronos ® 2360 (g) | 52.3 | 52.3 | 52.3 | 52.3 | 52.3 | 52.3 |
| Martinal ® ON310 (g) | 69.8 | 69.8 | 69.8 | 69.8 | 69.8 | 69.8 |
| Resiflow ® PV-5 (g) | 3.5 | 3.5 | 3.5 | 3.5 | 3.5 | 3.5 |
| t-butylhydroquinone (g) | 0.044 | 0.044 | 0.044 | 0.044 | 0.044 | 0.044 |
| Trigonox ® C 50D (g) (perester) | 6.8 | | | | | |
| TC-R 3020 (g) (peranhydride) | | | | 7.8 | | 7.8 |
| Laurox ® S (g) (peranhydride) | | | | | | |
| Trigonox ® 141 (g) (perester) | | | 4.2 | | 4.2 | |
| Perkadox ® LW75 (g) (peranhydride) | | 5.74 | | | | |
| Manganese acetate (g) | | | | 0.11 | | 0.22 |
| Cobalt stearate (g) | | 0.54 | | | | |
| Nuodex ® Cu 8 (g) | | | | | | |
| Nuodex ® drycoat (g) | | | | | | |
| Amounts (units as described in the application) of certain components in the language of the invention | | | | | | |
| amount of perester and/or alkylperoxy carbonate | 100 | 0 | 101 | 0 | 101 | 0 |
| amount of peranhydride | 0 | 102 | 0 | 103 | 0 | 103 |
| amount of transition metal compound | 0 | 5 | 0 | 2.6 | 0 | 5 |
| amount of inhibitor | 267 | 267 | 267 | 267 | 267 | 267 |
| total amount of thermal radical initiator | 101 | | 102 | | 102 | |
| Properties of the InvPCC | | | | | | |
| Extrudable | Yes | Yes | Yes | Yes | Yes | Yes |
| Physical storage stabillity (0-10, 10 = best) | 8 | | 8 | | 8 | |
| Tg of PCC (° C.) | 41 | | 43 | | 41 | |
| Properties of the InvPC | | | | | | |
| Resistance to swelling (scale 0-48, 48 = best) | 48 | | 48 | | 48 | |
| Smoothness (1-10 PCl, 10 = best) | 3 | | 3 | | 3 | |
| Chemical resistance (0-5, 5 = best) | 3 | | 3 | | 3 | |
| Gloss 60° | 20 | | 39 | | 34 | |
| Yellowness (b*) | 1.2 | | 1.2 | | 1.2 | |

| | InvPCC27 | | InvPCC28 | | InvPCC29 | |
|---|---|---|---|---|---|---|
| | PA | PB | PA | PB | PA | PB |
| UR1 (g) | 127.9 | 127.9 | 127.9 | 127.9 | 127.9 | 127.9 |
| VFUR1 (g) | 46.5 | 46.5 | 46.5 | 46.5 | 46.5 | 46.5 |
| Kronos ® 2360 (g) | 52.3 | 52.3 | 52.3 | 52.3 | 52.3 | 52.3 |
| Martinal ® ON310 (g) | 69.8 | 69.8 | 69.8 | 69.8 | 69.8 | 69.8 |
| Resiflow ® PV-5 (g) | 3.5 | 3.5 | 3.5 | 3.5 | 3.5 | 3.5 |
| t-butylhydroquinone (g) | 0.044 | 0.044 | 0.044 | 0.044 | 0.044 | 0.044 |
| Trigonox ® C 50D (g) (perester) | | | 6.8 | | 6.8 | |
| TC-R 3020 (g) (peranhydride) | | 7.8 | | 7.8 | | 7.8 |
| Laurox ® S (g) (peranhydride) | | | | | | |
| Trigonox ® 141 (g) (perester) | 4.2 | | | | | |
| Perkadox ® LW75 (g) (peranhydride) | | | | | | |
| Manganese acetate (g) | | 0.44 | | | | |
| Cobalt stearate (g) | | | | | | |
| Nuodex ® Cu 8 (g) | | | | 0.7 | | |
| Nuodex ® drycoat (g) | | | | | | 4.87 |
| Amounts (units as described in the application) of certain components in the language of the invention | | | | | | |
| amount of perester and/or alkylperoxy carbonate | 101 | 0 | 100 | 0 | 100 | 0 |
| amount of peranhydride | 0 | 103 | 0 | 103 | 0 | 103 |
| amount of transition metal compound | 0 | 10 | 0 | 5 | 0 | 5 |
| amount of inhibitor | 267 | 267 | 267 | 267 | 267 | 267 |
| total amount of thermal radical initiator | 102 | | 101.5 | | 101.5 | |
| Properties of the InvPCC | | | | | | |
| Extrudable | Yes | Yes | Yes | Yes | Yes | Yes |
| Physical storage stabillity (0-10, 10 = best) | 8 | | 8 | | 6 | |
| Tg of PCC (° C.) | 42 | | 40 | | 40 | |

TABLE 7-continued

Composition and properties of inventive thermosetting powder coating compositions InvPCC18-29 and of their corresponding powder coatings.

Properties of the InvPC

| | | | |
|---|---|---|---|
| Resistance to swelling (scale 0-48, 48 = best) | 48 | 48 | 48 |
| Smoothness (1-10 PCI, 10 = best) | 3 | 3 | 3 |
| Chemical resistance (0-5, 5 = best) | 3 | 3 | 3 |
| Gloss 60° | 32 | 26 | 24 |
| Yellowness (b*) | 1.5 | 1 | 1.8 |

TABLE 8

Composition and properties of inventive thermosetting powder coating compositions InvPCC30-36 and of their corresponding powder coatings.

| | InvPCC30 | | InvPCC31 | | InvPCC32 | | InvPCC33 | |
|---|---|---|---|---|---|---|---|---|
| | PA | PB | PA | PB | PA | PB | PA | PB |
| UR1 (g) | 127.9 | 127.9 | 127.9 | 127.9 | 191.85 | 63.95 | 63.95 | 191.85 |
| VFUR1 (g) | 34.9 | 34.9 | 58.1 | 58.1 | 69.75 | 23.25 | 23.25 | 69.75 |
| Daiso DAP ®-A (g) | | | | | | | | |
| Kronos ® 2360 (g) | 48.84 | 52.3 | 55.8 | 52.3 | 78.45 | 26.15 | 26.15 | 78.45 |
| Martinal ® ON310 (g) | 65.12 | 69.8 | 74.4 | 69.8 | 104.7 | 34.9 | 34.9 | 104.7 |
| Resiflow ® PV-5 (g) | 3.2 | 3.5 | 3.72 | 3.5 | 5.25 | 1.75 | 1.75 | 5.25 |
| t-butylhydroquinone (g) | 0.041 | 0.041 | 0.044 | 0.044 | 0.066 | 0.022 | 0.022 | 0.066 |
| Trigonox ® C 50D (g) (perester) | 6.5 | | 7.2 | | 5.1 | | 1.7 | |
| TC-R 3020 (g) (peranhydride) | | 1.9 | | 2.2 | | 5.95 | | 17.85 |
| Perkadox ® LW75 (g) (peranhydride) | | | | | 4.575 | | 1.525 | |
| Manganese acetate (g) | | | | | | 0.1 | | 0.3 |
| Cobalt stearate (g) | | 1.05 | | 1.2 | | | | |
| Amounts (units as described in the application) of certain components in the language of the invention | | | | | | | | |
| amount of perester and/or alkylperoxy carbonate | 103 | 0 | 100 | 0 | 50 | 0 | 50 | 0 |
| amount of peranhydride | 0 | 27 | 0 | 27 | 54 | 157 | 54 | 157 |
| amount of transition metal compound | 0 | 10 | 0 | 10 | 0 | 5 | 0 | 5 |
| amount of inhibitor | 268 | 268 | 250 | 250 | 267 | 267 | 267 | 267 |
| total amount of thermal radical initiator | 65 | | 63.5 | | 117.25 | | 143.75 | |
| Properties of the InvPCC | | | | | | | | |
| Extrudable | Yes | Yes | Yes | Yes | Yes | Yes | Yes | Yes |
| Physical storage stabillity (0-10, 10 = best) | 8 | | 8 | | 8 | | 8 | |
| Tg of PCC (° C.) | 45 | | 41 | | 42 | | 42 | |
| Properties of the InvPC | | | | | | | | |
| Resistance to swelling (scale 0-48, 48 = best) | 48 | | 48 | | 48 | | 48 | |
| Smoothness (1-10 PCI, 10 = best) | 4 | | 7 | | 4 | | 4 | |
| Chemical resistance (0-5, 5 = best) | 3 | | 3 | | 3 | | 3 | |
| Gloss 60° | 15 | | 18 | | 15 | | 33 | |
| Yellowness (b*) | 0.8 | | 0.9 | | 1.2 | | 1.1 | |

| | InvPCC34 | | InvPCC35 | | InvPCC36 | |
|---|---|---|---|---|---|---|
| | PA | PB | PA | PB | PA | PB |
| UR1 (g) | 127.9 | 127.9 | 127.9 | 127.9 | 127.9 | 127.9 |
| VFUR1 (g) | 41.9 | 41.9 | 34.9 | 34.9 | 41.9 | 23.3 |
| Daiso DAP ®-A (g) | 4.7 | 4.7 | 11.6 | 11.6 | 4.7 | 23.3 |
| Kronos ® 2360 (g) | 52.3 | 52.3 | 52.3 | 52.3 | 52.3 | 52.3 |
| Martinal ® ON310 (g) | 69.8 | 69.8 | 69.8 | 69.8 | 69.8 | 69.8 |
| Resiflow ® PV-5 (g) | 3.5 | 3.5 | 3.5 | 3.5 | 3.5 | 3.5 |
| t-butylhydroquinone (g) | 0.044 | 0.044 | 0.044 | 0.044 | 0.044 | 0.044 |
| Trigonox ® C 50D (g) (perester) | 7.2 | | 7.2 | | 7.2 | |
| TC-R 3020 (g) (peranhydride) | | 11.9 | | 11.9 | | 11.9 |
| Perkadox ® LW75 (g) (peranhydride) | | | | | | |
| Manganese acetate (g) | | | | | | |
| Cobalt stearate (g) | | 0.54 | | 0.54 | | 0.54 |
| Amounts (units as described in the application) of certain components in the language of the invention | | | | | | |
| amount of perester and/or alkylperoxy carbonate | 106 | 0 | 106 | 0 | 106 | 0 |
| amount of peranhydride | 0 | 156 | 0 | 157 | 0 | 156 |
| amount of transition metal compound | 0 | 5 | 0 | 5 | 0 | 5 |

TABLE 8-continued

Composition and properties of inventive thermosetting powder coating compositions InvPCC30-36 and of their corresponding powder coatings.

| | | | | | | | |
|---|---|---|---|---|---|---|---|
| amount of inhibitor | 267 | 267 | 267 | 267 | 267 | 267 | |
| total amount of thermal radical initiator | | 131 | | 131.5 | | 131 | |
| Properties of the InvPCC | | | | | | | |
| Extrudable | Yes | Yes | Yes | Yes | Yes | Yes | |
| Physical storage stabillity (0-10, 10 = best) | | 8 | | 8 | | 9 | |
| Tg of PCC (° C.) | | 35 | | 36 | | 36 | |
| Properties of the InvPC | | | | | | | |
| Resistance to swelling (scale 0-48, 48 = best) | | 48 | | 48 | | 48 | |
| Smoothness (1-10 PCl, 10 = best) | | 4 | | 3 | | 3 | |
| Chemical resistance (0-5, 5 = best) | | 4 | | 3 | | 3 | |
| Gloss 60° | | 35 | | 32 | | 32 | |
| Yellowness (b*) | | 1.3 | | 1.2 | | 1.3 | |

TABLE 9

Composition and properties of: i) inventive thermosetting powder coating compositions InvPCC37-38 and of their corresponding powder coating as well as of ii) comparative thermosetting powder coatings compositions CompPCC23-24 and of their corresponding powder coatings.

| | CompPCC23 | | CompPCC24 | | InvPCC37 | | InvPCC38 | |
|---|---|---|---|---|---|---|---|---|
| | PA | PB | PA | PB | PA | PB | PA | PB |
| UR3 (g) | 200 | 200 | 200 | 200 | 200 | 200 | 200 | 200 |
| Uracross ® P3307 (g) | 40.8 | 40.8 | 40.8 | 40.8 | 40.8 | 40.8 | 40.8 | 40.8 |
| t-butyl hydroquinone (g) | | | 0.12 | 0.12 | 0.12 | 0.12 | | |
| t-butyl cathechol (g) | 0.12 | 0.12 | | | | | 0.12 | 0.12 |
| Byk ® 361N (g) | 1.2 | 1.2 | 1.2 | 1.2 | 1.2 | 1.2 | 1.2 | 1.2 |
| Perkadox ® LW75 (g) (peranhydride) | | | | | | 7.5 | | 7.5 |
| Trigonox ® C 50D (g) (perester) | 14.5 | | 14.5 | | 14.5 | | 14.5 | |
| Cobalt Hex-Cem (g) | | 0.85 | | 0.85 | | 0.85 | | 0.85 |
| Amounts (units as described in the application) of certain components in the language of the invention | | | | | | | | |
| amount of perester and/or alkylperoxy carbonate | 155 | 0 | 155 | 0 | 155 | 0 | 155 | 0 |
| amount of peranhydride | 0 | 0 | 0 | 0 | 0 | 96 | 0 | 96 |
| amount of transition metal compound | 0 | 6 | 0 | 6 | 0 | 6 | 0 | 6 |
| amount of inhibitor | 500 | 500 | 500 | 500 | 500 | 500 | 500 | 500 |
| total amount of thermal radical initiator | | 77.5 | | 77.5 | | 125.5 | | 125.5 |
| Properties of the InvPCC & CompPCC | | | | | | | | |
| Extrudable | Yes | Yes | Yes | Yes | Yes | Yes | Yes | Yes |
| Physical storage stability (0-10, 10 = best) | | 6 | | 6 | | 6 | | 6 |
| Tg of PCC (° C.) | | 28 | | 28 | | 28 | | 28 |
| Properties of the InvPC & CompPC | | | | | | | | |
| Resistance to swelling (scale 0-48, 48 = best) | | 24 | | 24 | | 48 | | 48 |
| Smoothness (1-10 PCl, 10 = best) | | 3 | | 3 | | 3 | | 3 |
| Chemical resistance (0-5, 5 = best) | | 1 | | 1 | | 3 | | 3 |
| Gloss 60° | | 25 | | 25 | | 23 | | 24 |
| Yellowness (b*) | | n.a. | | n.a. | | n.a. | | n.a. |

TABLE 10

Composition and properties of: i) inventive thermosetting powder coating compositions InvPCC39-41 and of their corresponding powder coatings as well as of ii) comparative thermosetting powder coating composition CompPCC25 and of its corresponding powder coating.

| | CompPCC25 | | InvPCC39 | | InvPCC40 | | InvPCC41 | |
|---|---|---|---|---|---|---|---|---|
| | PA | PB | PA | PB | PA | PB | PA | PB |
| UR1 (g) | 127.9 | 127.9 | 127.9 | 127.9 | 127.9 | 127.9 | 127.9 | 127.9 |
| VFUR1 (g) | 46.5 | 46.5 | 46.5 | 46.5 | 46.5 | 46.5 | 46.5 | 46.5 |
| Daiso DAP ®-A | | | | | | | | |
| Kronos ® 2360 (g) | 52.3 | 52.3 | 52.3 | 52.3 | 52.3 | 52.3 | 52.3 | 52.3 |
| Martinal ® ON310 (g) | 69.8 | 69.8 | 69.8 | 69.8 | 69.8 | 69.8 | 69.8 | 69.8 |

TABLE 10-continued

Composition and properties of: i) inventive thermosetting powder coating compositions InvPCC39-41 and of their corresponding powder coatings as well as of ii) comparative thermosetting powder coating composition CompPCC25 and of its corresponding powder coating.

| | CompPCC25 | | InvPCC39 | | InvPCC40 | | InvPCC41 | |
|---|---|---|---|---|---|---|---|---|
| | PA | PB | PA | PB | PA | PB | PA | PB |
| Resiflow ® PV-5 (g) | 3.5 | 3.5 | 3.5 | 3.5 | 3.5 | 3.5 | 3.5 | 3.5 |
| t-butylhydroquinone (g) | 0.88 | 0.88 | 0.44 | 0.44 | 0.45 | 0.45 | 0.44 | 0.44 |
| Trigonox ® C 50D (g) (perester) | 6.8 | | 6.8 | | 6.8 | | 13.6 | |
| TC-R 3020 (g) (peranhydride) | | 11.9 | | 11.9 | | 11.9 | | 15.4 |
| Trigonox ® 17 (g) (perether) | | | | | 24.8 | 18.3 | | |
| Cobalt stearate (g) | | 0.54 | | 0.54 | | 0.54 | | 2.2 |
| Amounts (units as described in the application) of certain components in the language of the invention | | | | | | | | |
| amount of perester and/or alkylperoxy carbonate | 100 | 0 | 100 | 0 | 100 | 0 | 200 | 0 |
| amount of peranhydride | 0 | 157 | 0 | 157 | 0 | 157 | 0 | 203 |
| amount of transition metal compound | 0 | 5 | 0 | 5 | 0 | 5 | 0 | 20 |
| amount of inhibitor | 5061 | 5061 | 2538 | 2538 | 2595 | 2595 | 2538 | 2538 |
| total amount of thermal radical initiator | 128.5 | | 128.5 | | 303.7 | | 201.5 | |
| Properties of the InvPCC & CompPCC | | | | | | | | |
| Extrudable | Yes | Yes | Yes | Yes | Yes | Yes | Yes | Yes |
| Physical storage stabillity (0-10, 10 = best) | 7 | | 7 | | 5 | | 5 | |
| Tg of PCC (° C.) | 41 | | 41 | | 36 | | 34 | |
| Properties of the InvPC & CompPC | | | | | | | | |
| Resistance to swelling (scale 0-48, 48 = best) | 12 | | 48 | | 48 | | 48 | |
| Smoothness (1-10 PCl, 10 = best) | 7 | | 7 | | 6 | | 4 | |
| Chemical resistance (0-5, 5 = best) | 1 | | 3 | | 3 | | 4 | |
| Gloss 60° | 25 | | 25 | | 23 | | 36 | |
| Yellowness (b*) | 1.3 | | 1.2 | | 1.3 | | 1.9 | |

Only the Inventive Examples (thermosetting powder coating compositions according to the invention of claim 1) had in combination all features of claim 1.

It was surprisingly found (see results shown in Tables 3-10 that only the Inventive Examples were able to provide for a unique combination of very desired properties such as:
  i) each of the thermosetting powder coating compositions A and B, was extrudable; and
  ii) thermosetting powder coating compositions C were heat curable, and in particular they were heat curable at low temperatures; and
  iii) thermosetting powder coating compositions C had good physical storage stability; and
  iv) thermosetting powder coating compositions C provided powder coatings that had excellent resistance to swelling; and
  v) thermosetting powder coating compositions C provided powder coatings that had good smoothness; and
  vi) thermosetting powder coating compositions C provided powder coatings that had good chemical resistance; and
  vii) thermosetting powder coating compositions C provided powder coatings that had low gloss; actually all of them had very low gloss.

In addition to properties i)-vii), all Inventive Examples provided for a further desired property, that is:
  viii) thermosetting powder coating compositions C provided powder coatings that had low yellowness and certain compositions had very low yellowness.

None of the Comparative Examples had in combination all features of claim 1. In view of the results shown in Tables 3-10 related to the composition and properties of Comparative Examples, all Comparative Examples failed even to provide for properties i)-vi), let alone the combination of further [with respect to properties i)-vi)] properties such as properties vii) and viii).

The invention of claim 1 constitutes a noticeable progress over the prior art and it contributes a great deal to the advancement and progress of the technology of thermosetting powder coatings. The reason being the invention of claim 1 makes feasible the achievement of low temperature cure powders that are able at the same time to achieve a fantastic and unique array of very desirable properties as explained and shown in this application.

The invention claimed is:

1. A two component (2K) thermosetting powder coating composition C (PCC C) comprising a physical mixture of two different, separate and distinct thermosetting powder coating compositions A (PCC A) and B (PCC B), wherein the weight ratio R=weight PCC A/weight PCC B, is at least 0.01 and at most 99 and the total weight of the mixture of PCC A and PCC B in PCC C, is at least 10% w/w based on the total weight of PCC C, and wherein,
  i) PCC A comprises:
    A1: an unsaturated polyester resin comprising ethylenic unsaturations having a measured weight per ethylenic unsaturation (WPU) of at least 250 and at most 2200 g/mol;
    A2: a copolymerizable agent comprising reactive unsaturations that are different from and are capable of reacting with the ethylenic unsaturations of the unsaturated resin A1, wherein the copolymerizable agent A2 is selected from the group consisting of:
      a) a crystalline copolymerizable resin (CCR) having a WPU of at least 190 and at most 1500 g/mol and a $M_n$ equal to or higher than 350 Da, and b) a mixture of a crystalline copolymerizable resin (CCR) with an amorphous copolymerizable resin (ACR) wherein each of the CCR and ACR has a WPU of at least 190 and at most 1500 g/mol and a $M_n$ equal to or higher than 350 Da and wherein the mixture has a weight ratio M of weight ACR/ weight CCR of at most 1; wherein the total weight of A1 and A2 in PCC A, is at least 10% w/w based on the total weight of PCC A;

A3: an unsaturated monomer, in an amount of 0-0.9% w/w based on the total weight of PCC A;

A4: a thermal radical initiator in an amount of at least 1 and at most 500 mmol thermally labile groups/Kg of total weight of A1 and A2, said thermal radical initiator comprising:

A4-1: a peroxide selected from the group consisting of peresters, monopercarbonates and mixtures thereof, said peroxide is present in an amount of at least 1 and at most 245 mmol peroxy groups/Kg of total weight of A1 and A2;

A5: a transition metal substance in an amount of 0-4.5 mmol metal/Kg of total weight of A1 and A2, said transition metal substance is selected from the group consisting of Co, Mn, Cu, Fe, V, Ti, transition metal compounds of Co, transition metal compounds of Mn, transition metal compounds of Cu, transition metal compounds of Fe, transition metal compounds of V, transition metal compounds of Ti and mixtures thereof;

A6: an inhibitor in an amount of at least 13 and at most 5000 mg inhibitor/Kg of total weight of A1 and A2; and wherein ii) PCC B comprises:

B1: an unsaturated polyester resin comprising ethylenic unsaturations having a WPU of at least 250 and at most 2200 g/mol;

B2: copolymerizable agent comprising reactive unsaturations that are different from and are capable of reacting with the ethylenic unsaturations of the unsaturated resin B1, wherein the copolymerizable agent B2 is selected from the group consisting of:
a) a crystalline copolymerizable resin (CCR) having a WPU of at least 190 and at most 1500 g/mol and a $M_n$ equal to or higher than 350 Da, and
b) a mixture of a crystalline copolymerizable resin (CCR) with an amorphous copolymerizable resin (ACR) wherein each of the CCR and ACR has a WPU of at least 190 and at most 1500 g/mol and a $M_n$ equal to or higher than 350 Da and wherein the mixture has a weight ratio M of weight ACR/ weight CCR of at most 1; wherein the total weight of B1 and B2 in PCC B, is at least 10% w/w based on the total weight of PCC B;

B3: an unsaturated monomer, in an amount of 0-0.9% w/w based on the total weight of PCC B;

B4: a thermal radical initiator in an amount of at least 1 and at most 500 mmol thermally labile groups/Kg of total weight of B1 and B2, said thermal radical initiator comprising:

B4-1: a peranhydride in an amount of at least 0.5 and at most 300 mmol peroxy groups/Kg of total weight of B1 and B2;

B5: a transition metal substance in an amount of at least 0.5 and at most 50 mmol metal/Kg of total weight of B1 and B2, said transition metal substance is selected from the group consisting of Co, Mn, Cu, Fe, V, Ti, transition metal compounds of Co, transition metal compounds of Mn, transition metal compounds of Cu, transition metal compounds of Fe, transition metal compounds of V, transition metal compounds of Ti and mixtures thereof;

B6: an inhibitor in an amount of at least 16 and at most 5000 mg inhibitor/Kg of total weight of B1 and B2; and wherein iii) the total amount of unsaturated monomer in PCC C ranges from 0 up to 0.9% w/w based on the total weight of PCC C; and wherein iv) the total amount of thermal radical initiator in PCC C is at least 22 and at most 500 mmol thermally labile groups/kg of total weight of unsaturated resins and copolymerizable agent in PCC C; and wherein the thermally labile groups are selected from peroxy and azo groups, and wherein (v) a cured powder coating derived from PCC C on medium density fiberboard has a gloss at 60° equal to or lower than 45 as measured according to ASTM-D-523/70.

2. The PCC C according to claim 1, wherein PCC A further comprises:

A7: a thiol in an amount of 0-5 mmol thiol groups/Kg of total weight of A1 and A2; and/or A8: an acetoacetamide compound in an amount of 0-200 mmol acetoacetamide compound/Kg of total weight of A1 and A2; and/or A9: a 1,2,3 trihydroxy aryl compound in an amount of 0-10 mmol 1,2,3 trihydroxy aryl compound/Kg of total weight of A1 and A2, if the A5 comprises one or both of Cu and a transition metal compound of Cu.

3. The PCC C according to claim 1 wherein PCC A further comprises:

A10: a free amine in an amount such that a ratio L of mmol thermally labile groups/mmol free amine is at least 1.1, wherein the mmol thermally labile groups and the mmol free amine each refers to 1 Kg of total weight of A1 and A2.

4. The PCC C according to claim 1, wherein PCC B further comprises:

B7: a thiol in an amount of 0-5 mmol thiol groups/Kg of total weight of B1 and B2; and/or B8: an acetoacetamide compound in an amount of 0-5 mmol acetoacetamide compound/Kg of total weight of B1 and B2; and/or B9: a 1,2,3 trihydroxy aryl compound in an amount of 0-5 mmol 1,2,3 trihydroxy aryl compound/Kg of total weight of B1 and B2, if B5 comprises one or both of Cu and a transition metal compound of Cu.

5. The PCC C according to claim 1, wherein PCC B further comprises:

B10: a free amine in an amount such that a ratio L of mmol thermally labile groups/mmol free amine is at least 1.1, wherein the mmol thermally labile groups and the mmol free amine each refers to 1 Kg of total weight of B1 and B2.

6. The PCC C according to claim 1, wherein B4 further comprises:

B4-2 a: a hydroperoxide in an amount of 0-5 mmol h-peroxy groups/Kg of total weight of B1 and B2; and/or B4-2 b: a perester in an amount 0-25 mmol p-peroxy groups/Kg of total weight of B1 and B2; and/or B4-2 c: an alkylperoxy carbonate in an amount of 0-25 mmol ac-peroxy groups/Kg of total weight of B1 and B2.

7. The PCC C according to claim 1, wherein
vi) the total amount of transition metal substance in PCC C is at least 0.25 and at most 50 mmol metal/Kg of total weight of unsaturated resins and copolymerizable agent in PCC C;
vii) the total amount of inhibitor in PCC C is at least 13 and at most 5000 mg inhibitor/Kg of total weight of unsaturated resins and copolymerizable agent in PCC C.

8. The PCC C according to claim 1, wherein R is at least 0.1 and at most 9.

9. The PCC C according to claim 1, wherein R is at least 0.2 and at most 4.

10. The PCC C according to claim 1, wherein a molar ratio $K_A$ of mol of the reactive unsaturations in A2/mol of the ethylenic unsaturations in A1 is at least 0.90 and at most 1.10.

11. The PCC C according to claim 1, wherein a molar ratio $K_B$ of mol of the reactive unsaturations in B2/mol of the ethylenic unsaturations in B1 is at least 0.90 and at most 1.10.

12. The PCC C according to claim 1, wherein the unsaturated resin comprising ethylenic unsaturations in A1 is an unsaturated polyester resin comprising 2-butenedioic acid ethylenic unsaturations.

13. The PCC C according to claim 1, wherein the unsaturated resin comprising ethylenic unsaturations in B1 is an unsaturated polyester resin comprising 2-butenedioic acid ethylenic unsaturations.

14. The PCC C according to claim 1 wherein the crystalline copolymerizable resin in A2 is selected from the group consisting of vinyl ether resin, vinyl ester resin, vinyl(ether-ester) resin, vinyl functionalized urethane resin and mixtures thereof.

15. The PCC C according to claim 1 wherein the crystalline copolymerizable resin in B2 is selected from the group consisting of vinyl ether resin, vinyl ester resin, vinyl(ether-ester) resin, vinyl functionalized urethane resin and mixtures thereof.

16. The PCC C according to claim 1, wherein the ratio M of each of A2 and B2 is at most 0.3.

17. The PCC C according to claim 1, wherein
the total amount of transition metal substance in PCC C is at least 0.25 and at most 50 mmol metal/Kg of total weight of unsaturated resins and copolymerizable agent in PCC C;
the total amount of inhibitor in PCC C is at least 13 and at most 5000 mg inhibitor/Kg of total weight of unsaturated resins and copolymerizable agent in PCC C;
R is at least 0.2 and at most 4;
a molar ratio $K_A$ of mol of the reactive unsaturations in A2/mol of the ethylenic unsaturations in A1 is at least 0.90 and at most 1.10;
a molar ratio $K_B$ of mol of the reactive unsaturations in B2/mol of the ethylenic unsaturations in B1 is at least 0.90 and at most 1.10;
the crystalline copolymerizable resin in A2 is selected from the group consisting of vinyl ether resin, vinyl ester resin, vinyl(ether-ester) resin, vinyl functionalized urethane resin and mixtures thereof; and
the crystalline copolymerizable resin in B2 is selected from the group consisting of vinyl ether resin, vinyl ester resin, vinyl(ether-ester) resin, vinyl functionalized urethane resin and mixtures thereof.

18. The PCC C according to claim 1, wherein
the total amount of transition metal substance in PCC C is at least 0.25 and at most 50 mmol metal/Kg of total weight of unsaturated resins and copolymerizable agent in PCC C;
the total amount of inhibitor in PCC C is at least 13 and at most 5000 mg inhibitor/Kg of total weight of unsaturated resins and copolymerizable agent in PCC C;
R is at least 0.2 and at most 4;
a molar ratio $K_A$ of mol of the reactive unsaturations in A2/mol of the ethylenic unsaturations in A1 is at least 0.90 and at most 1.10;
a molar ratio $K_B$ of mol of the reactive unsaturations in B2/mol of the ethylenic unsaturations in B1 is at least 0.90 and at most 1.10;
the crystalline copolymerizable resin in A2 is selected from the group consisting of vinyl ether resin, vinyl ester resin, vinyl(ether-ester) resin, vinyl functionalized urethane resin and mixtures thereof;
the crystalline copolymerizable resin in B2 is selected from the group consisting of vinyl ether resin, vinyl ester resin, vinyl(ether-ester) resin, vinyl functionalized urethane resin and mixtures thereof; and
the ratio M of each of A2 and B2 is at most 0.3.

19. A process for making the thermosetting powder coating composition C (PCC C) as defined in claim 1 comprising the steps of:
(a) providing the thermosetting powder coating composition A (PCC-A) and the different, separate, distinct thermosetting powder coating composition B (PCC-B); and
(b) physically mixing the PCC A with the PCC B in a weight ratio R of weight PCC A/weight PCC B, that is at least 0.01 and at most 99, to obtain the PCC C.

20. A cured thermosetting powder coating composition (c-PCC C), wherein the c-PCC C is derived from the thermosetting powder coating composition C (PCC C) as defined in claim 1 which is cured to form the c-PCC C.

21. The cured thermosetting powder coating composition c-PCC C according to claim 20, wherein the cured thermosetting powder coating composition c-PCC C is a powder coating.

22. An article having a coating thereon of the thermosetting powder coating composition C (PCC-C) as defined in claim 1.

23. The article according to claim 22, wherein the article is selected from the group consisting of wood, low density fibre board, medium density fibreboard, high density fibreboard, plastic, thermoplastic composite, thermoset composite, fibre reinforced composites, sandwich materials, metal and combinations thereof.

24. An article having a cured coating thereon, wherein the cured coating is comprised of the c-PCC C as defined in claim 20.

25. The article according to claim 24, wherein
the total amount of transition metal substance in PCC C is at least 0.25 and at most 50 mmol metal/Kg of total weight of unsaturated resins and copolymerizable agent in PCC C;
the total amount of inhibitor in PCC C is at least 13 and at most 5000 mg inhibitor/Kg of total weight of unsaturated resins and copolymerizable agent in PCC C;
R is at least 0.2 and at most 4;
a molar ratio $K_A$ of mol of the reactive unsaturations in A2/mol of the ethylenic unsaturations in A1 is at least 0.90 and at most 1.10;

a molar ratio $K_B$ of mol of the reactive unsaturations in B2/mol of the ethylenic unsaturations in B1 is at least 0.90 and at most 1.10;

the crystalline copolymerizable resin in A2 is selected from the group consisting of vinyl ether resin, vinyl ester resin, vinyl(ether-ester) resin, vinyl functionalized urethane resin and mixtures thereof; and the crystalline copolymerizable resin in B2 is selected from the group consisting of vinyl ether resin, vinyl ester resin, vinyl(ether-ester) resin, vinyl functionalized urethane resin and mixtures thereof.

26. The article according to claim 24, wherein the total amount of transition metal substance in PCC C is at least 0.25 and at most 50 mmol metal/Kg of total weight of unsaturated resins and copolymerizable agent in PCC C;

the total amount of inhibitor in PCC C is at least 13 and at most 5000 mg inhibitor/Kg of total weight of unsaturated resins and copolymerizable agent in PCC C;

R is at least 0.2 and at most 4;

a molar ratio $K_A$ of mol of the reactive unsaturations in A2/mol of the ethylenic unsaturations in A1 is at least 0.90 and at most 1.10;

a molar ratio $K_B$ of mol of the reactive unsaturations in B2/mol of the ethylenic unsaturations in B1 is at least 0.90 and at most 1.10;

the crystalline copolymerizable resin in A2 is selected from the group consisting of vinyl ether resin, vinyl ester resin, vinyl(ether-ester) resin, vinyl functionalized urethane resin and mixtures thereof;

the crystalline copolymerizable resin in B2 is selected from the group consisting of vinyl ether resin, vinyl ester resin, vinyl(ether-ester) resin, vinyl functionalized urethane resin and mixtures thereof; and the ratio M of each of A2 and B2 is at most 0.3.

27. A process for making an article having a cured coating thereon of the thermosetting powder coating composition C (PCC C) as defined in claim 1, comprising the steps of:
(a) applying the thermosetting powder coating composition C (PCC C) to an article; and
(b) heating and/or radiating the PCC C for enough time and at a suitable temperature to cure the PCC C and obtain the article having the cured coating thereon.

* * * * *